(12) United States Patent
Volin

(10) Patent No.: US 11,505,962 B2
(45) Date of Patent: Nov. 22, 2022

(54) METHOD OF MANFACTURING AND USING FIVE-DEVICE-IN-ONE WATER-COLLECTING-AND-DECELERATING FRUIT-AND-NUT-COLLECTING-AND-DECELERATING WIND-DIFFUSING-AND-REDIRECTING MULTI-FUNCTION-TRANSVERSABLE-RIDGE-AND-SEAM MULTI-FUNCTION-TWIST-LOCKING-BASE CARAPACE

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 140 days.

(21) Appl. No.: 17/213,201

(22) Filed: Mar. 25, 2021

(65) Prior Publication Data

US 2021/0301550 A1  Sep. 30, 2021

Related U.S. Application Data

(60) Provisional application No. 62/994,844, filed on Mar. 26, 2020.

(51) Int. Cl.
*E04H 15/28* (2006.01)
*E03B 3/02* (2006.01)
(Continued)

(52) U.S. Cl.
CPC .............. *E04H 15/28* (2013.01); *E03B 3/02* (2013.01); *A01D 46/22* (2013.01); *A45B 2023/0006* (2013.01); *A45B 2023/0018* (2013.01)

(58) Field of Classification Search
CPC .................... E04H 15/28; A45B 2011/005
See application file for complete search history.

(56) References Cited

U.S. PATENT DOCUMENTS

| 2,039,987 A | 5/1936 | Goldman |
| 3,042,056 A | 7/1962 | Todorovic |
(Continued)

*Primary Examiner* — Noah Chandler Hawk

(57) ABSTRACT

A method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, which has at least one first three-hundred-and-sixty-degree-orientational-carapace panel, at least one second three-hundred-and-sixty-degree-orientational-carapace panel, a water-ejecting fruit-and-nut-discharging wind-diffusing crown-carapace nozzle, at least one breadth-wise carapace-panel-connecting seam, at least one mid-panel water-directing water-decelerating fruit-and-nut-decelerating wind-diffusing ridge seam, a upper hub, rib-hinging intersectors, arched carapace-supporting ribs, a three-hundred-sixty-degree-rotatably-locking center-support stanchion, an adjustable stanchion-supporting twist-locking base, a shuttle hub, and actuating-and-supporting ribs, comprises the steps of: sewing said at least one first three-hundred-and-sixty-degree-orientational-carapace panel and said at least one second three-hundred-and-sixty-degree-orientational-carapace panel together such that said at least one breadth-wise carapace-panels-connecting seam and said at least one mid-panel water-directing water-decelerating fruit-and-nut-decelerating wind-diffusing ridge seams are formed between said at least one first three-hundred-and-sixty-degree-orientational-carapace panel and said at least one second three-hundred-and-sixty-degree-orientational-carapace panel for converging rain water therein-to repeatedly change the direction of rain water to decelerate the flowing speed of rain water to reduce water splash to avoid damaging irrigated vegetables, for converging harvested fruits therein to repeatedly change the direction of harvested fruits to decelerate the rolling speed of (Continued)

harvested fruits to reduce fruit bruises to avoid throwing away bruised fruits, for converging harvested nuts therein to repeatedly change the direction of harvested nuts to decelerate the rolling speed of harvested nuts to reduce nut bruises to avoid throwing away bruised nuts, for converging catched balls therein to repeatedly change the direction of catched balls to decelerate the rolling speed of catched balls to reduce ball damages to avoid throwing away damaged balls, for directing rain water therealong, for directing harvested fruits therealong, for directing harvested nuts therealong, for directing game balls therealong, for forming a collecting cistern to collect rain water to irrigate garden, for forming a diverting gutter to collect rain water to discharge said rain water away from house balcony and foundation, for forming a collecting device to collect harvested fruits to save labor and time, for forming a collecting device to collect harvested nuts to save labor and time, for forming a collecting device to collect game balls to save labor and time, for forming a tonneau cover for a truck bed, for forming a shade cover, for forming a free-standing projector screen, for forming a hitch-mountable projector screen, and for forming a sports-ball blocking device, and such that said water-ejecting fruit-and-nut discharging wind-diffusing crown-carapace nozzle is formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel for ejecting collected-and-decelerated rainwater into containers, for discharging harvested-and-decelerated fruits and nuts into containers, for redirecting wind to power land-yachts, for diffusing wind to prevent wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace, for redirecting wind to cool users; attaching said at least one first three-hundred-and-sixty-degree-orientational-carapace panel to said arched carapace-supporting ribs; attaching said at least one second three-hundred-and-sixty-degree-orientational-carapace panel to arched carapace-supporting ribs; and twist-locking said adjustable stanchion-supporting twist-locking base to another adjustable stanchion-supporting twist-locking base for enabling said five-device-in-one carapace to increase volumes for collecting rainwater, or harvesting fruit, or harvesting nuts, for enabling said five-device-in-one carapace to provide versatility with arranging multiple five-device-in-one carapaces together, a wind-powered boat for enabling said five-device-in-one carapace to redirect wind to power said wind-powered boat, a wind-powered vehicle for enabling said five-device-in-one carapace to redirect wind to power said wind-powered vehicle, a wind-powered marine kayak for enabling said five-device-in-one carapace to redirect wind to power said wind-powered marine kayak, a wind-powered land-yacht for enabling said five-device-in-one carapace to redirect wind to power said wind-powered land-yacht, a utility hole of a truck for enabling said five-device-in-one carapace to function as a tonneau cover, a bumper of a truck for enabling said five-device-in-one carapace to function as a projector screen, or a hand rail of a balcony for enabling said five-device-in-one carapace to provide shade, wind protection, and rain protection.

20 Claims, 72 Drawing Sheets

(51) Int. Cl.
    *A45B 23/00*      (2006.01)
    *A01D 46/22*      (2006.01)

(56) References Cited

U.S. PATENT DOCUMENTS

| | | | |
|---|---|---|---|
| 3,464,431 A * | 9/1969 | Loeffler | A45B 11/00 |
| | | | 135/20.1 |
| 3,561,000 A | 2/1971 | Wignail | |
| 3,615,994 A | 10/1971 | MacLaine | |
| 3,788,199 A | 1/1974 | Sato | |
| 4,090,897 A | 5/1978 | Minick | |
| 4,095,622 A | 6/1978 | Wilbert | |
| 4,367,111 A | 1/1983 | Hirose | |
| 5,020,559 A | 6/1991 | Lai | |
| 5,076,185 A * | 12/1991 | Tarng | B63B 1/041 |
| | | | 440/31 |
| 5,218,981 A | 6/1993 | Lai | |
| 5,441,064 A * | 8/1995 | Becker | A45B 25/18 |
| | | | 2/22 |
| 5,464,488 A | 11/1995 | Servin | |
| 5,488,966 A | 2/1996 | Baldwin | |
| 5,682,618 A | 11/1997 | Johnson | |
| 5,769,131 A | 6/1998 | Whitlock | |
| 5,806,546 A | 9/1998 | Ni | |
| 6,079,343 A | 6/2000 | Wong | |
| 6,517,651 B2 | 2/2003 | Azulay | |
| 6,717,285 B2 * | 4/2004 | Ferraro | F03D 1/04 |
| | | | 290/55 |
| 6,729,254 B2 | 5/2004 | Mamiya | |
| 6,792,883 B2 | 9/2004 | Ashton | |
| 6,797,088 B2 | 9/2004 | Solinski | |
| 7,434,272 B2 | 10/2008 | Hannon | |
| 7,490,651 B2 | 2/2009 | Cartabbia | |
| 7,838,096 B2 | 11/2010 | Hayes, II | |
| 8,127,701 B2 | 3/2012 | Harward | |
| 8,739,713 B2 | 6/2014 | Ishii | |
| 8,955,447 B1 | 2/2015 | Miksch | |
| 9,051,753 B1 * | 6/2015 | Zamirpour | E04H 15/58 |
| 9,334,594 B2 | 5/2016 | Torigoe | |
| 9,610,875 B2 | 4/2017 | Tabata | |
| 9,822,545 B1 * | 11/2017 | Kapur | A45B 25/143 |
| 10,309,046 B2 | 6/2019 | Konno | |
| 10,815,594 B2 | 10/2020 | Goto | |
| 10,895,030 B1 | 1/2021 | Baker | |
| 2002/0174933 A1 | 11/2002 | Solinski | |
| 2008/0196136 A1 | 8/2008 | Fellouhe | |
| 2009/0199970 A1 | 8/2009 | Cartabbia | |
| 2010/0215889 A1 | 8/2010 | Cienski | |

* cited by examiner

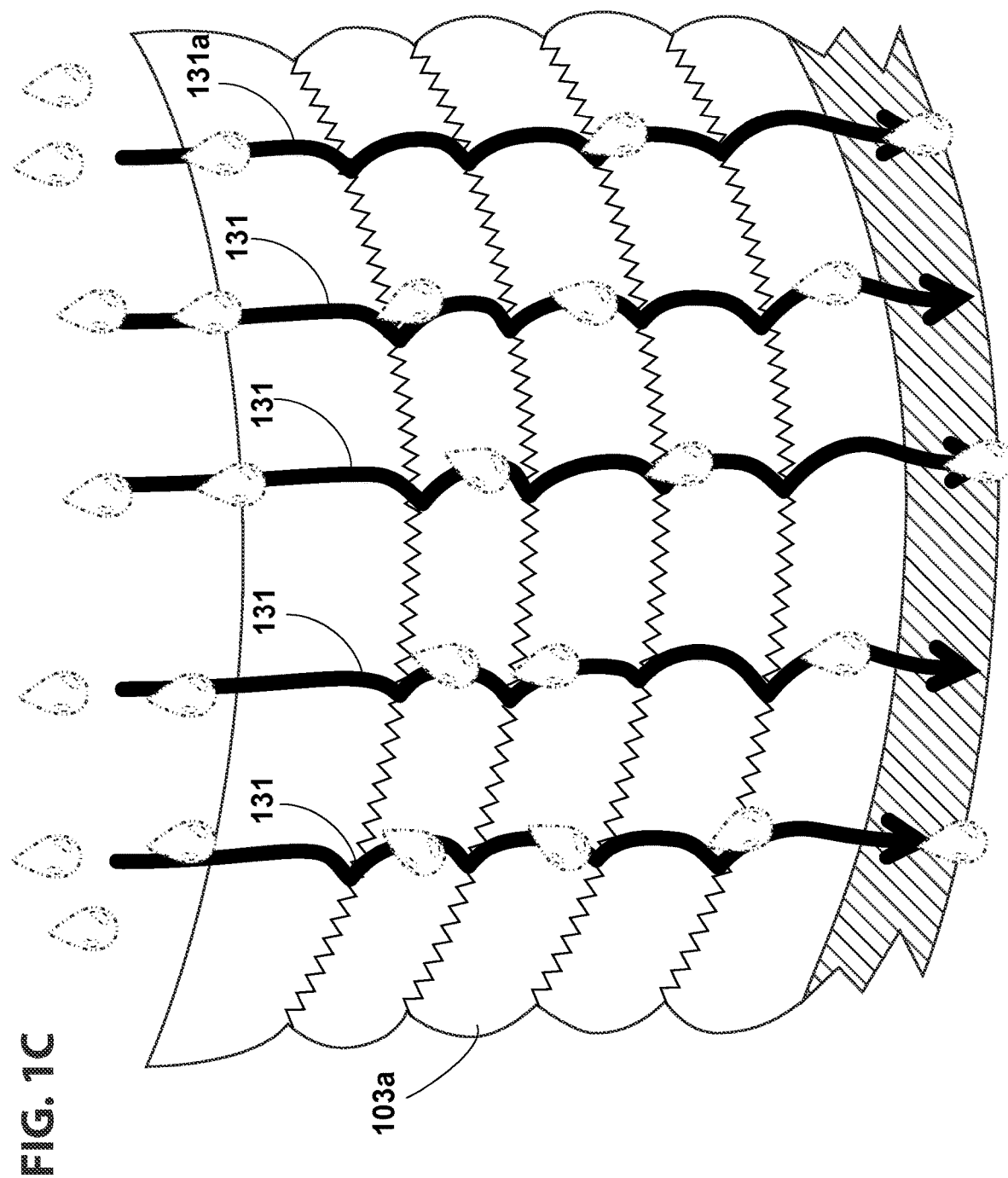

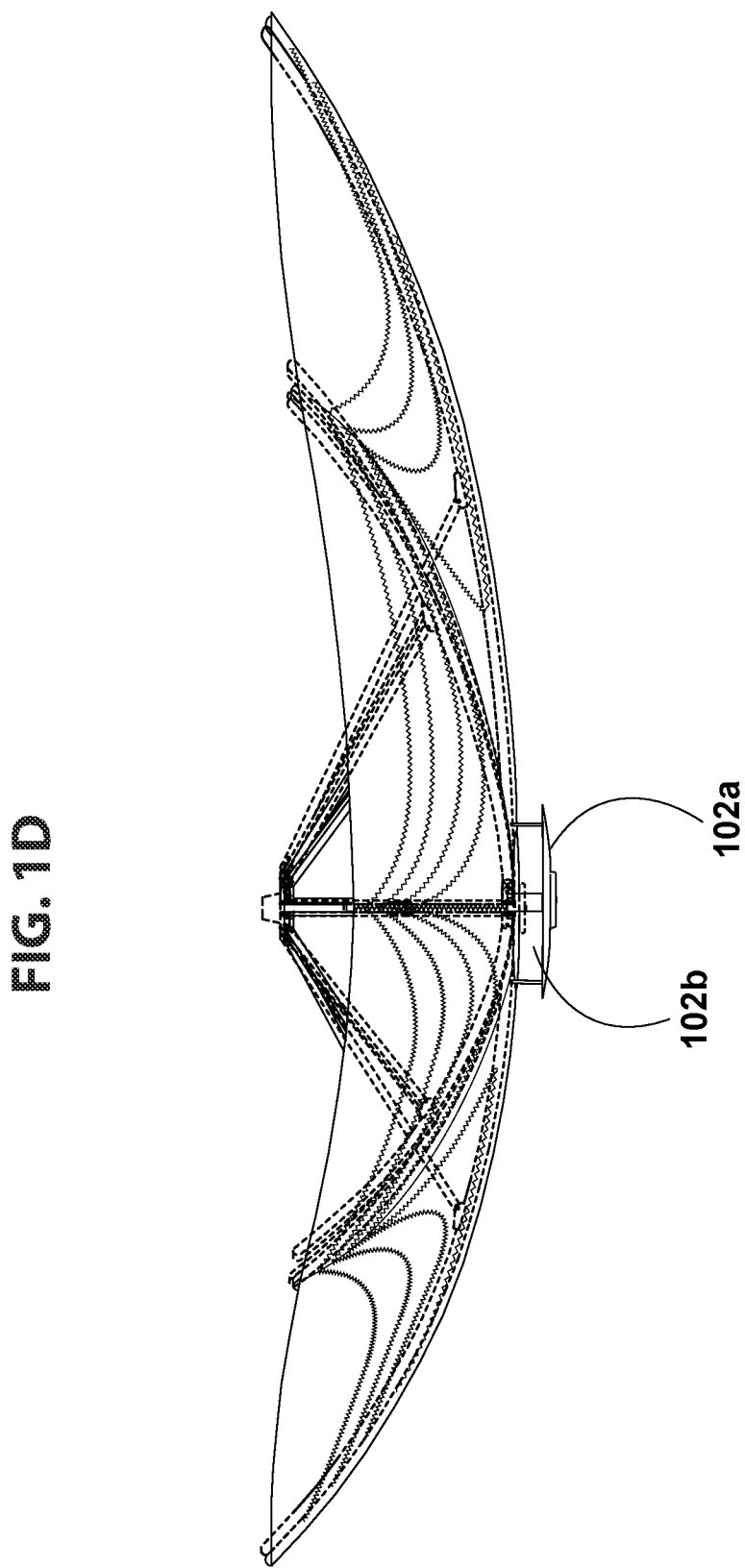

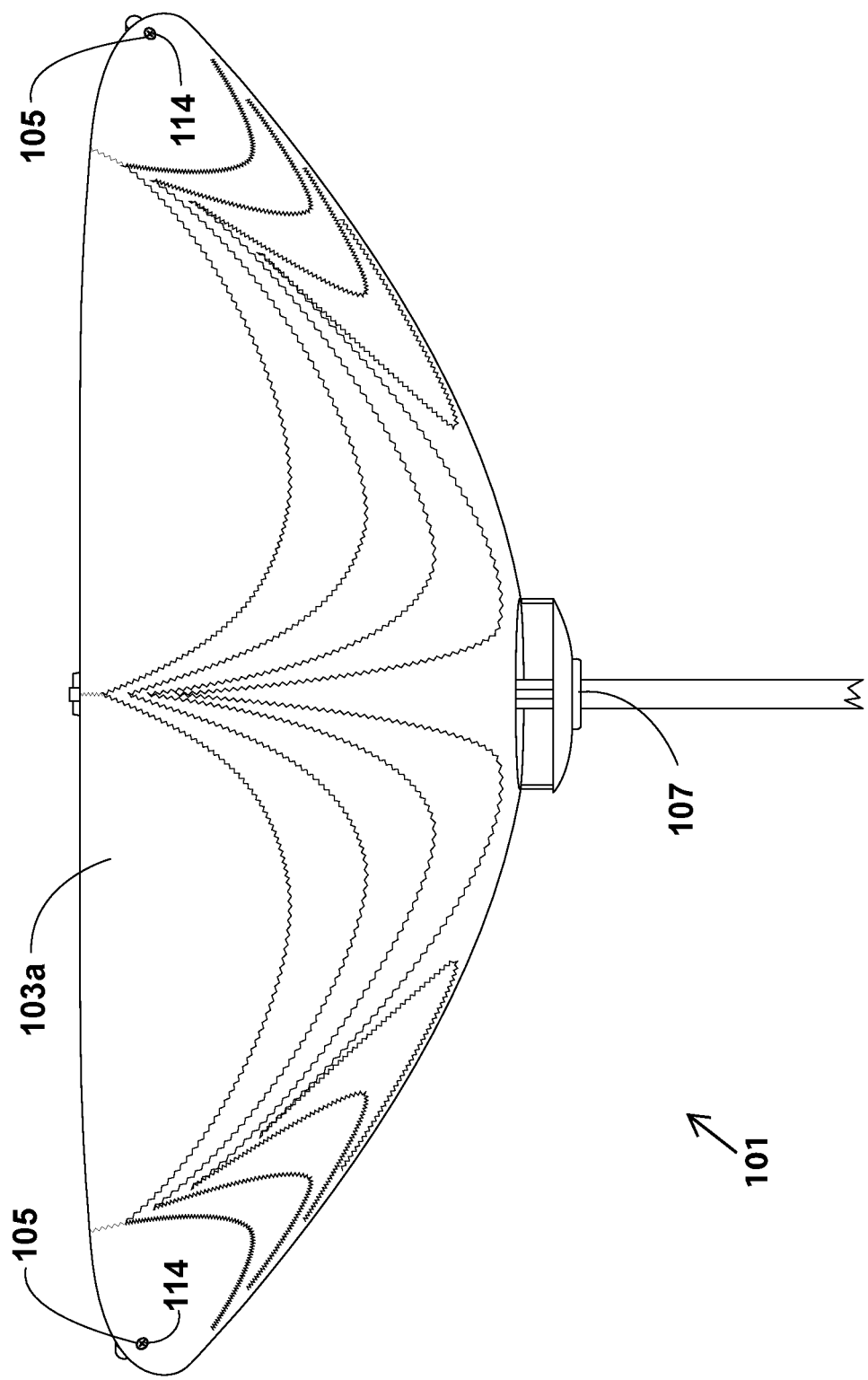

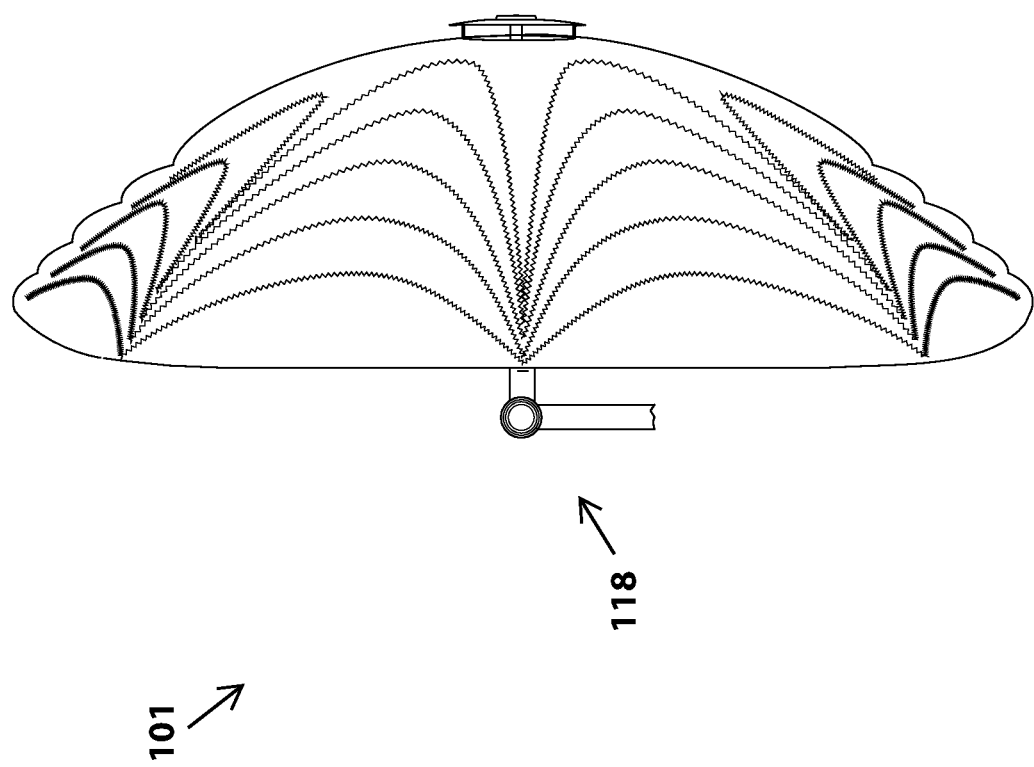

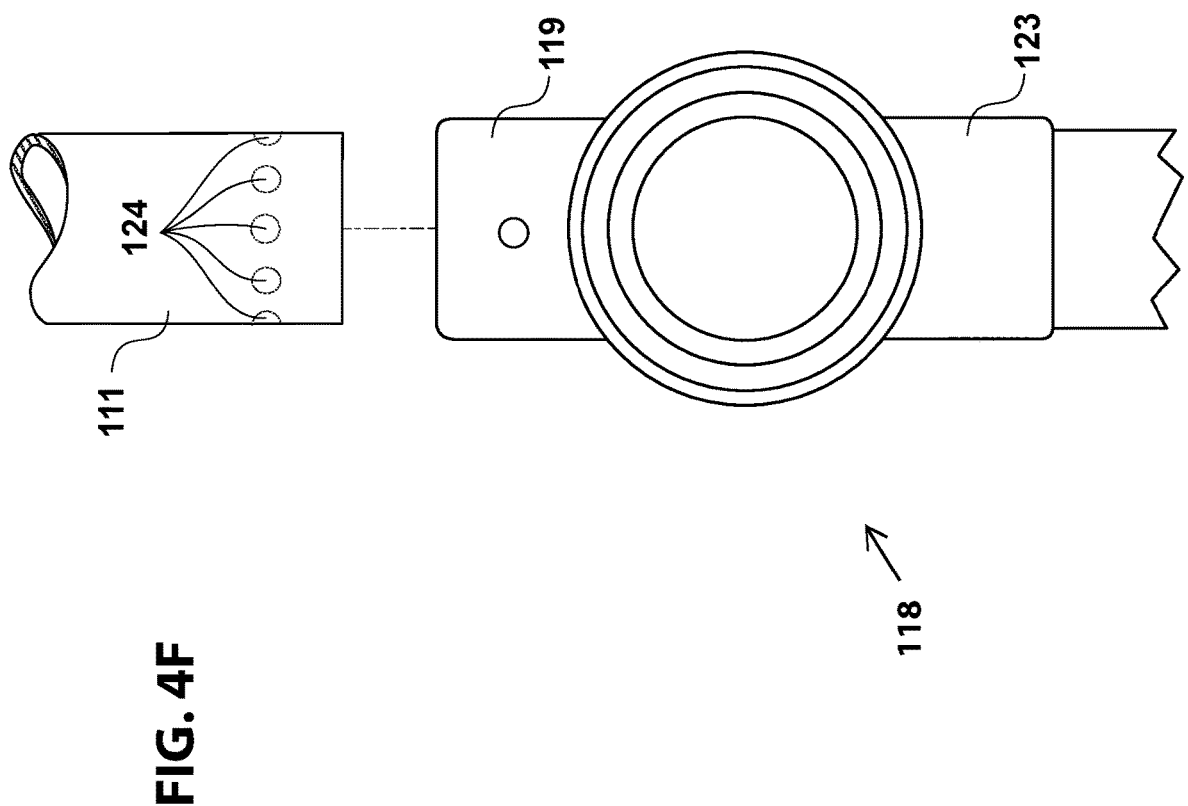

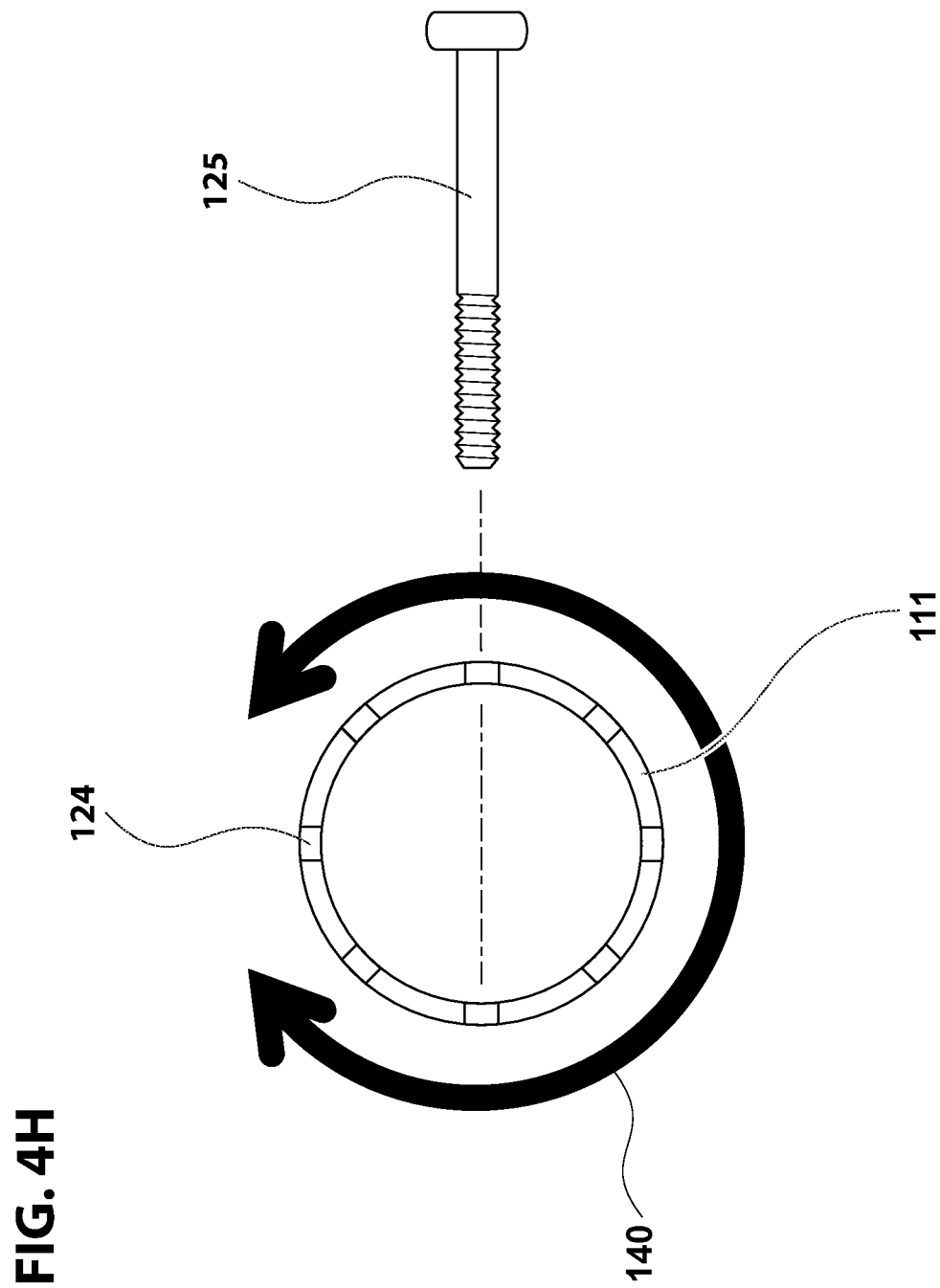

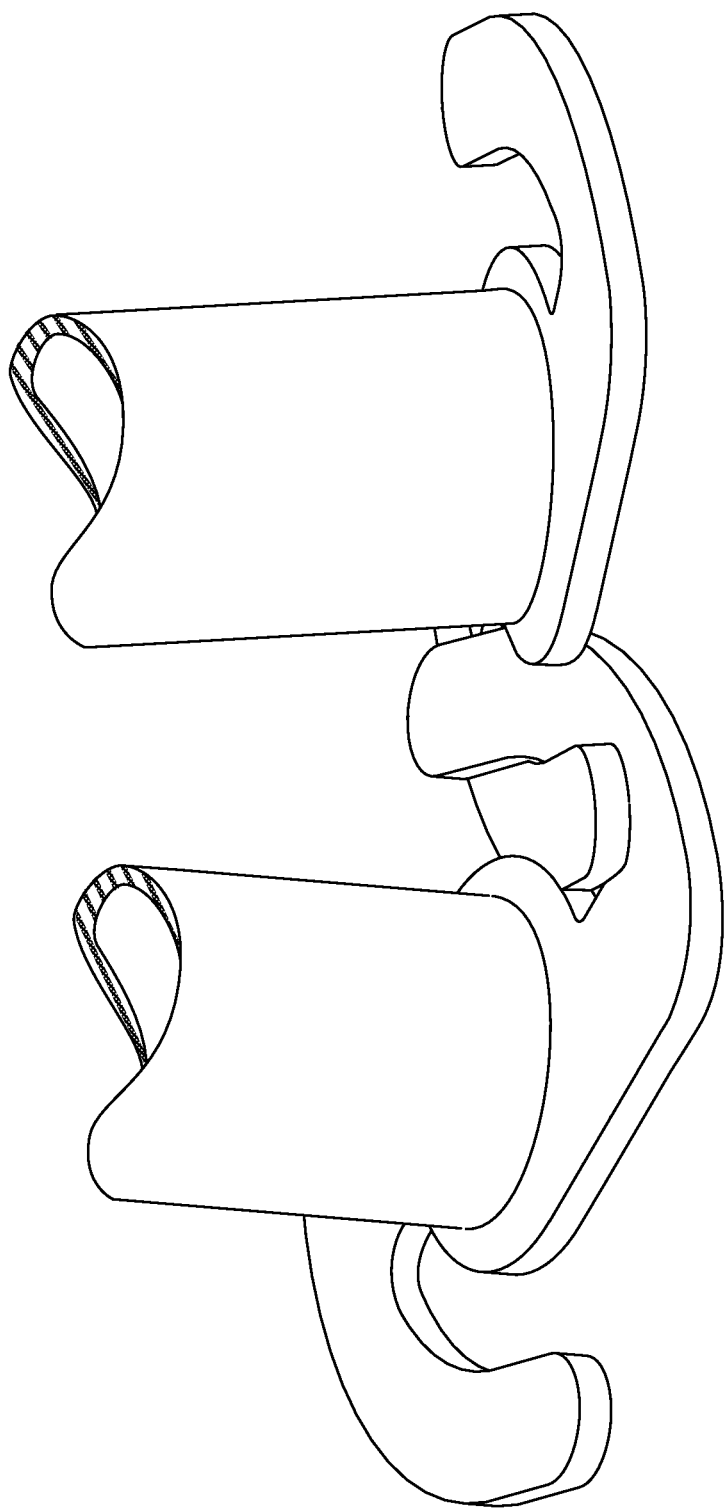

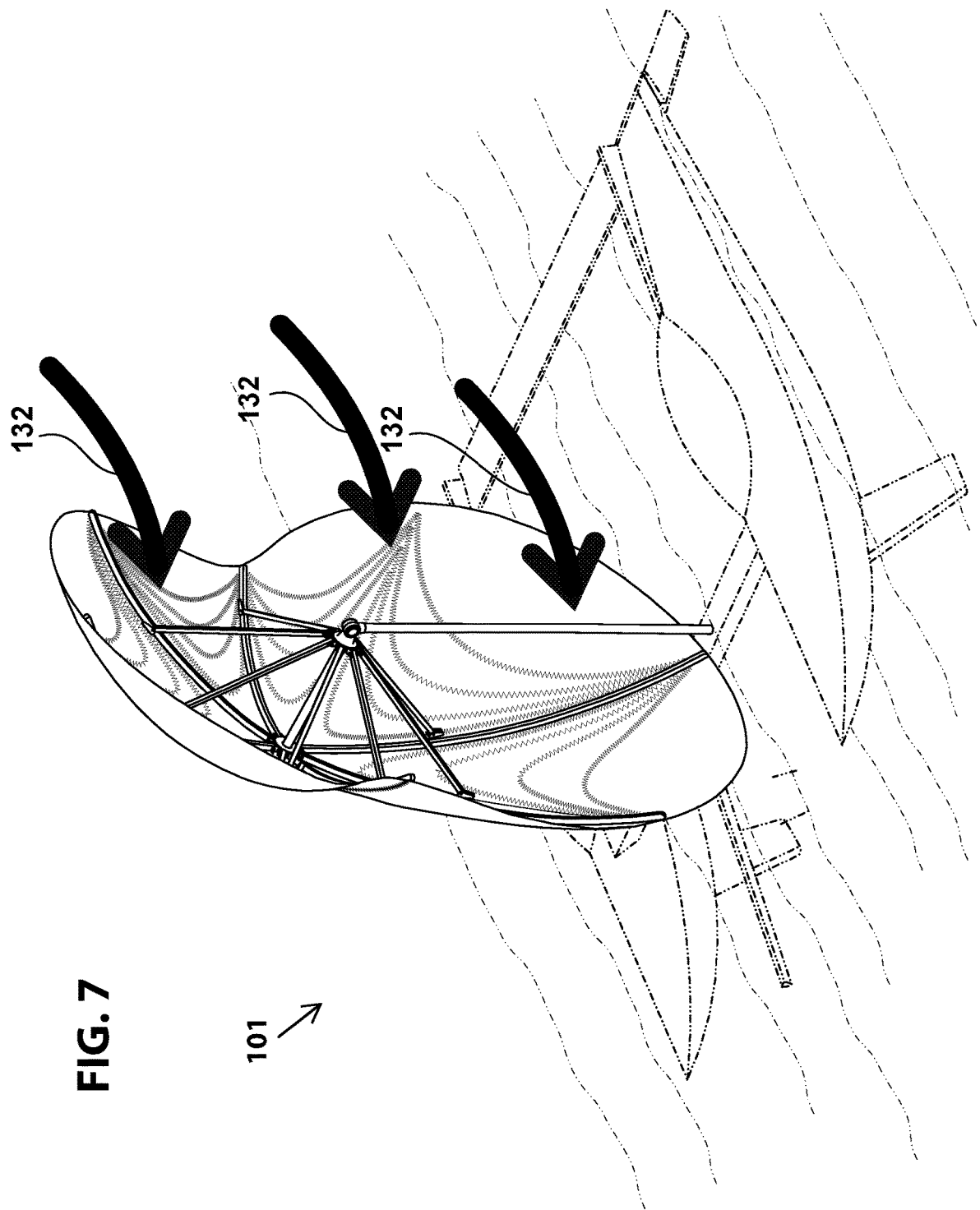

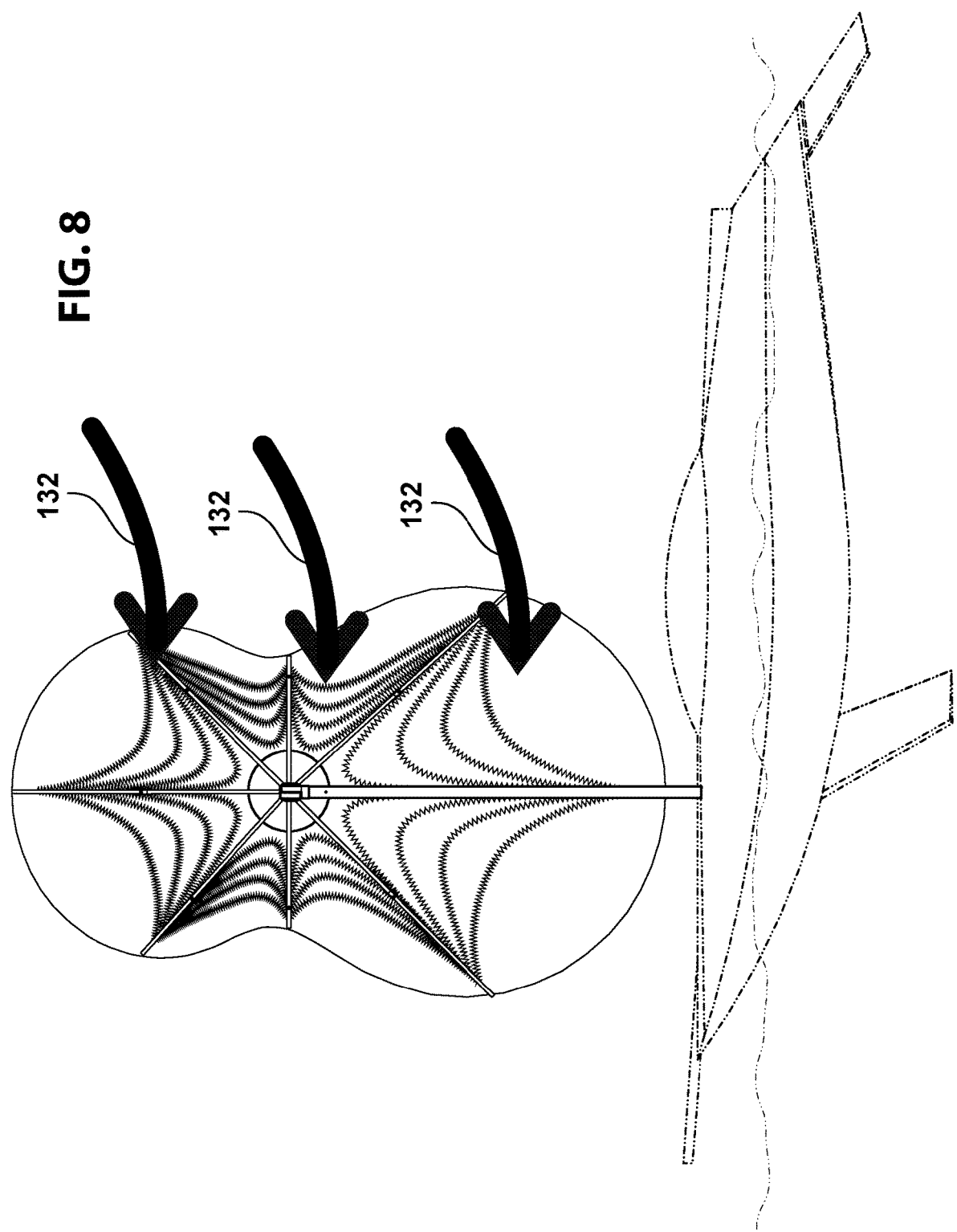

METHOD OF MANFACTURING AND USING FIVE-DEVICE-IN-ONE WATER-COLLECTING-AND-DECELERATING FRUIT-AND-NUT-COLLECTING-AND-DECELERATING WIND-DIFFUSING-AND-REDIRECTING MULTI-FUNCTION-TRANSVERSABLE-RIDGE-AND-SEAM MULTI-FUNCTION-TWIST-LOCKING-BASE CARAPACE

1. FIELD OF THE INVENTION

The present invention relates to a method of carapace manufacturing, which is cheap to produce, is easy to ship as one unit, requires no assembly, and can quickly and easily be unfolded. Particularly, the present invention relates to a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, which comprises:

1) Three-hundred-and-sixty-degree-orientational water-collecting-and-decelerating fruit-nut-harvesting-and-decelerating wind-diffusing-and-redirecting discharging-nozzle carapace system,
2) Three-hundred-and-sixty-degree-orientational carapace-supporting-and-securing system,
3) Carapace-multi-orientating snap-locking pivoting-elbow system, and
4) Multi-function carapace-supporting-stanchion twist-locking-base system.

2. DESCRIPTION OF THE PRIOR ART

A number of methods of manufacturing carapace have been introduced.

U.S. Pat. No. 2,039,987 issued 1936 May 5, to Harry Goldman, demonstrates an umbrella having radial ribs, a covering therefor made up of triangular sections of material each having a base extending between the tips of the adjacent ribs and connected by seams with adjacent sections substantially in the line with the ribs, the covering being formed of the textile material in whose structure are comprised two sets of relatively inelastic fibrous closely adjacent strands disposed in groups which are relatively widely space there being a translucent relatively elastic composition applied to the strand fibers and extending between them and the intervening meshes in the foam of a web and covering over the fibers on all sides to provide for the textile material a protecting film on each of its opposite surfaces, the two sets of fibrous strands being interwoven with each other, one set being disposed parallel to the base of each triangular section of the covering and the other set being disposed perpendicular thereto in each section whereby each covering section is rendered elastic along its bias, so as to elastically yield lengthwise along its seams only and flex inwardly transversely between the ribs where resistance to stretch is greatest when stretched taut by said ribs.

U.S. Pat. No. 3,042,056 issued 1962 Jul. 3, to Bogdan N. Todorovic, demonstrates techniques of draining water from a roof or cover or shelter of any type regardless of whether it is permanent, temporary, movable or stationary.

U.S. Pat. No. 3,561,000 1971-02-02, to Harry Wignall, demonstrates a novel garment which is produced by knitting a body encircling tubular member having selected enlarged areas, slitting the tubular member from one end to a point proximate the enlarged areas to define half-courses in the sections on both sides of the slit and then seaming the two sections along the silt line to define limb encircling portions.

U.S. Pat. No. 3,615,994 issued 1971 Oct. 26, to Ian A. MacLaine, demonstrates a composite sheet vinyl strips which are joined together by applying an adhesive to the edges to be joined, and maintaining the edges in contact underpressure until the adhesive is cured. The adhesive, which may be an elastomeric urethane or an epoxy resin, is applied as a continuous bead, without solvent; its viscosity is between 5,000 and 80,000 centipoises at 73.degree. F. In a particular embodiment of the invention the vinyl wear layers of the strips are first bonded by solvent welding.

U.S. Pat. No. 3,788,199 issued 1974 Jan. 29, to Wasuke Sato, demonstrates a method for manufacturing heavy duty bags wherein stretched tapes made of synthetic resin such as high density polyethylene or polypropylene are spirally wound in opposite directions in a manner to intersect each other to form a plurality of superposed cylindrical bodies. The superposed portions of the intersecting stretched tapes forming said cylindrical bodies are bonded together to form a cylindrical network, one end of which is sealed to provide a bottom.

U.S. Pat. No. 4,090,897 issued 1978 May 23, to David G. Minick, demonstrates a method and apparatus for patching or seaming thermoplastic mesh fabrics, such as used in the papermaking industry by means of an ultrasonic welding tool. The tool is provided with one or more tips having raised surface portions or projections adapted for contacting the plastic mesh at a plurality of spaced points whereby ultrasonic welding is accomplished without substantial disruption or dimunition of the generally uniform porosity inherent to the mesh fabric. The method modifications involve the use of templates for guiding the positioning and movement of the ultrasonic welding tips for both butt seaming and overlap seaming of the opposed edges of thermoplastic mesh fabric. In the butt seaming technique, the outermost weft filaments of the opposed edges of the plastic fabric are replaced by one heat stabilized filament and the picket ends of the fabric are interdigitated about this stable filament preparatory to the welding step.

U.S. Pat. No. 4,095,622 issued 1978 Jun. 20, to Donald George MacBean, demonstrates a woven fabric and a method of forming a seam therein comprising a woven fabric as used for supporting a paper web on a paper making machine. The fabric has interwoven weft and warp strands with the strands in the machine direction being flexible strands incapable of retaining a stable crimp. The improvement in the fabric comprises a plurality of spaced apart replacement monofilament strands having stable crimp characteristics extending in the machine direction and in a seam area for interconnecting opposed ends of the fabric to form an endless belt having a seam which is substantially flat. The replacement strands have crimps of the same configuration as crimps in the machine direction strands of the fabric.

U.S. Pat. No. 4,367,111 issued 1983 Jan. 4, to Tokuzo Hirose, demonstrates a sewing method. Staples or tacks having the function of a sewing thread are first penetrated successively through a work placed on a bed. The staples or tacks are supplied and fed successively from a feeder which is provided over the work. The extremities of the staples or tacks are then transformed so as not to be removed from the work. The penetrating and transforming operations are performed simultaneously at a plurality of points or successively from point to point, whereby seams or patterned seams adjacent to each other are accomplished to sew the work.

U.S. Pat. No. 5,020,559 issued 1991 Jun. 4 Chenmin Lai, demonstrates the construction of an umbrella cover which is provided wherein the periphery of the umbrella cover cloth is arranged to provide straight meshes. The umbrella cover construction can accommodate umbrella ribs which are arranged in either equal or unequal intervals therebetween. The construction of the cover cloth is arranged with the radially extending umbrella ribs disposed on the bias of the cloth and coupled to peripheral portions thereof, having straight edges extending therefrom which are substantially either parallel or orthogonal to the warp or weft of the cloth. Thus, the umbrella cover can be formed of a single piece of material, upon which a decorative pattern can easily be printed thereon, while still allowing the umbrella cover to be stretched, when the umbrella is opened, to form a curved surface.

U.S. Pat. No. 5,218,981 issued 1993 Jun. 15, to Chen M. Lai, demonstrates an umbrella which is provided devoid of an axis connecting line. The umbrella includes a primary blank member on which a pattern can be printed without consideration of the arrangement of the meshes and several triangular supplementary blank members attached about the periphery of the primary blank member. The meshes of the supplementary blank members are arranged to be perpendicular to or parallel to the outer periphery of the completed umbrella cover for providing structural integrity to the umbrella construction.

U.S. Pat. No. 5,464,488 issued 1995 Nov. 7, to Randall F. Servin, demonstrates a method for forming a strong and flexible bond between two plastic fabric layers which requires the controlled use of an ultrasonic welding apparatus. Control of the time ultrasonic energy is delivered to the two overlapped plastic fabric layers, and of the pressure placed upon those layers during that time, is exercised to ensure that no melting of the yarns from which the two fabric layers are woven occurs. Rather, the yarns are softened by the application of ultrasonic energy, and are compressed together between the horn and an anvil to force them to adhere to one another. After the ultrasonic energy is turned off, compression is maintained while the overlapped plastic fabric layers cool and harden. A strong, flexible bond, suitable for operation as a seam for an endless belt, is obtained. Because the yarns do not melt during the application of the ultrasonic energy, the bond obtained by the practice of the invention is not brittle, and consequently is not susceptible to the cracking and breakage observed in the bonds produced by ultrasonic welding in the prior art.

U.S. Pat. No. 5,488,966 issued 1996 Feb. 6, to Blair F. Baldwin, demonstrates an umbrella carapace which includes a single sheet of web material formed in a closed configuration and having a periphery, said single sheet of web material having a bowed configuration, said single sheet of web material having at least one radially oriented tuck therein which applies a circumferential force on said single sheet of web material to form said single sheet of web material into said bowed configuration, each said tuck extending radially outwardly to said periphery.

U.S. Pat. No. 5,682,618 issued 1997 Nov. 4, to Mark V. Johnson, demonstrates a reinforced viral resistant seam for an article of protective apparel constructed by arranging first and second thermoplastic webs and at least one reinforcing strip thermally bondable with the webs along a common seam edge. An ultrasonic welding wheel having a cutting edge immediately adjacent to the welding surface is used to form a vital resistant, comfortable, high tensile strength seam suitable for articles of protective apparel.

U.S. Pat. No. 5,769,131 issued 1998 Jun. 23, to Sharon K. Whitlock, demonstrates an on-machine-seamable papermakers' fabric having a smooth surface and a prolonged life which includes flat machine-direction yarns which define the upper and lower surfaces thereof. The fabric has two layers of cross-machine direction yarns, each of which is interwoven with the flat machine-direction yarns. Other machine-direction yarns, of round cross section, weave with the cross-machine-direction yarns in the two layers to bind the two layers together. The knuckles of these round machine-direction yarns are within the fabric with respect to the planes defined by the flat machine-direction yarns, and, and a consequence, are less susceptible to degradation by heat and abrasion. The papermakers' fabric is seamed into endless form during installation on a paper machine. At one of the two ends of the fabric, seaming loops are formed by the round machine-direction yarns. At the other of the two ends, seaming loops are formed by the flat machine-direction yarns. The seaming loops are interdigitated with one another when the two ends of the fabric are brought together during installation on the paper machine, defining a passage through which a seaming pin or pintle may be directed to join the two ends to one another.

U.S. Pat. No. 5,806,546 issued 1998 Sep. 15, to Fong-Ming Ni, demonstrates a method of eliminating corrugation in central umbrella cover, being made of a plain weave cloth, in which the weft has no stretchability, while the warp has a slight stretchability; before the umbrella cloth being cut into an umbrella cover, the umbrella cover and the main rib are set a different angle of ten degrees; the tail end of the main ribs and the sewing points of the umbrella cloth are not fallen on the parallel line of the warp or the weft; from the sewing points to the central part of the ribs, there are different length so as to balance the tension of various stretch points; the edge of the umbrella cover is cut out and sewed properly so as to provide suitable corrugation-proof. When the umbrella is opened, the central portion of the umbrella cover would not have corrugation and looseness because of the main ribs having a slight curvature, and the oblique weave mesh able to balance the stretched tension.

U.S. Pat. No. 6,079,343 issued 2000 Jun. 27, to John Wong, demonstrates a pucker free garment seam providing a garment with a tailored and wrinkle free appearance. The pucker free seam and method for production utilizes a bonding strip which contains at least a thermal adhesive component which is inserted between first and second garment components sewn together along the seam. A sufficient amount of heat and pressure is applied to the seam which causes the adhesive of the bonding strip to flow onto the surfaces of the garment components and into interstices thereby creating a seam and permanently bonding the first and second garment components together along the seam to eliminate puckering associated with shrinkage of the sewing thread.

U.S. Pat. No. 6,517,651 issued 2003 Feb. 11, to Meir Azulay, demonstrates an apparatus and method for joining together two or more fabric components without thread, the components including at least one ultrasonically bondable component. The apparatus comprises an ultrasonic horn operable to emit ultrasonic energy through a fabric-engaging end face thereof, and a rotatable anvil support having an outer peripheral surface on which one or a plurality of anvil supports are formed. The anvil support and the horn are arranged so as to define a nip between the respective fabric-engaging surfaces thereof for receiving the components to be joined. The anvil support rotates about an axis thereof as the components pass through the nip such that the outer peripheral surface of the anvil support defining the anvil structures is stationary relative to the components passing through the nip. The horn emits ultrasonic energy and the anvil structures focus the ultrasonic energy on one or more regions of the at least one ultrasonically bondable component contacted by the anvil structure(s) so as to locally heat and bond the one or more regions.

U.S. Pat. No. 6,729,254 issued 2004 May 4, to Toshiyuki Mamiya, demonstrates a sewing apparatus which performs sewing operation on a work piece that moves along an X-Y plane perpendicular to an axial direction of a hollow needle having an inclined opening that is formed by angular cutting a portion of an end portion of the hollow needle that penetrates the work piece with respect to the axial direction of the hollow needle, by reciprocating the hollow needle in a penetrating direction, using a thread threaded in the hollow needle. In the sewing apparatus, Tatami stitches are formed on the work cloth with a plurality of stitches. First, a plurality of stitches are formed in a first stitching direction along a line angled between 20.degree. and 160.degree. with respect to a needle tip opening direction. Then, by controlling direction of movement of the work cloth so that the stitches in a second stitching direction proceed to an area opposite to the needle tip opening direction, a plurality of stitches are formed in a second stitching direction opposite to the first stitching direction, following and in parallel with the stitches formed in the first stitching direction.

U.S. Pat. No. 6,792,883 issued 2004 Sep. 23, to Ronald Ashton, demonstrates an article and an apparatus and method for making the article. The article including a first piece of material having a margin extending inwardly from an edge of the material. The margin has an inner edge spaced from the material edge. A second piece of material having a margin extending inwardly from an edge of the second material is joined to the first piece of material along inner edges of the margins. A third piece of material is fixed over the margins, and has a first edge fixed to the first piece of material and a second edge fixed to the second piece of material.

U.S. Pat. No. 6,797,088 issued 2004 Sep. 28, to Knut Georg Solinski, demonstrates a method for the connection of pieces of textile fabric, a textile band and a method for producing same. In order to provide a textile band or continuous textile product which is suitable for continuous processing, it is proposed that, for the connection of pieces of textile fabric, a cut edge, at which the threads are essentially bound at the edge, is first formed. The textile pieces are then laid one on the other with an overlap, and are pressed one onto the other between a sonotrode and an anvil, where the anvil and/or the sonotrode have a surface profile with a number of elevations, The textile pieces are connected to each other by introducing an ultrasonic oscillation into the sonotrode, thus welding the textile pieces to one another ultrasonically.

U.S. Pat. No. 7,434,272 issued 2008 Oct. 14, to Gregory E. Hannon, demonstrates liquid proof seams which are formed between laminates, most preferably those having a complex textile structure on the sealing side of the laminate, where at least a portion of the complex textile in the sealing region is removed, such as by skiving, to reduce the thickness in the seam, or sealing region, prior to the creation of a durably sealed liquidproof seam.

U.S. Pat. No. 7,490,651 issued 2009 Feb. 17, to Giovanni Cartabbia, demonstrates an apparatus for finishing the edge of a garment fabric and the like, including, on a bearing framework, a guide element for guiding an adhesive strip, leading to a top wheel and a bottom wheel. Said top and bottom wheels operate, at a base defining a working surface, on an edge portion of a fabric to apply the adhesive strip thereto. Heating means for heating the adhesive strip and cooling means for cooling the made piece are moreover provided.

U.S. Pat. No. 7,838,096 issued 2010 Nov. 23, to Graham E. Hayes, II, demonstrates a reinforced seam/inlay and method for forming such seam/inlay to join pieces of synthetic turf material together are disclosed. The reinforced seam/inlay structure comprises abutted edges of first and second synthetic turf pieces having a backing joined together; a seaming cloth/tape material coated with an adhesive/glue, volatile solvent or heat activated material applied is positioned beneath the abutted edges of synthetic turf pieces wherein said abutted edges are adhered to said seaming cloth/tape material; and reinforcement fastener elements inserted through both the backing of the synthetic turf material, through the adhesive and the seaming cloth/tape material; or seam/inlay structure comprises of overlapping edges of first and second synthetic turf pieces having a backing joined together; the backing without seaming cloth/tape material can be coated with an adhesive/glue, volatile solvent or heat activated material or not and reinforcement fastener elements inserted through both the backing of the synthetic turf material.

U.S. Pat. No. 8,127,701 issued 2012 Mar. 6, to Randy Harward, demonstrates a fabric joining method and system for attaching a first piece of fabric having synthetic content to a second piece of fabric having synthetic content. The method includes welding the first piece of fabric to the second piece of fabric at a seam and sewing the first piece of fabric to the second piece of fabric using a stitch that crosses the welded seam. An example method includes ultrasonically welding a first piece of fleece fabric to a second piece of fleece fabric followed by stitching along and across the welded seam completely through the fabric layers using a zig-zag stitch. The system includes a first piece of fabric, a second piece of fabric fused to the first piece of fabric at a welded seam, and a thread stitched across the welded seam.

U.S. Pat. No. 8,739,713 issued 2014 Jun. 3, to Atsushi Ishii, demonstrates a sewing machine which is provided with a sensor member, and a feed rate of cover pieces is changed after detecting a conductive thread that is arranged in front, in a direction of travel, of a sewing needle. A position through which the sewing needle will pass is changed to a position other than a position where the conductive thread is arranged, which is different from an initially set position.

U.S. Pat. No. 8,955,447 issued 2015 Feb. 17, to Linda Susan Miksch, demonstrates improved methods for joining two pieces of fabric along a seam (e.g., curved seam) to form a fabric pattern piece (e.g., quilting block unit) using an embroidery machine. A digitized file instructs an embroidery machine to stitch a perforated guide-line in a stabilizer material secured inside an embroidery hoop for forming an opening having a desired shape in the stabilizing material. A first fabric is temporarily affixed to one side of the stabilizer material, and an opening with a seam allowance margin is cut in the fabric along the desired seam defined by the opening/shape in the stabilizing material. The seam allowance margin is folded through the opening/shape to the reverse side, and a second piece of fabric is affixed to the folded margin. The digitized file instructs the machine to stitch a hidden seam along the desired seam providing esthetic, geometrically precise fabric pattern pieces.

U.S. Pat. No. 9,334,594 issued 2016 May 10, to Noriko Torigoe, demonstrates a sewn product in which one material edge and the other material edge are stitched together in an abutted state. The one material edge and the other material edge are stitched together with one bobbin thread and a plurality of needle threads, the plurality of needle threads being interlocked with the one bobbin thread to form a plurality of rows of zigzag stitched seams.

U.S. Pat. No. 9,610,875 issued 2017 Apr. 4, to Tsuyoshi Tabata, demonstrates a trim cover assembly of extremely soft property which comprises a surface cover element, a wadding cover, and a thick foam wadding sandwiched therebetween, wherein the thick foam wadding has a compressed thin end surface region sewn with the surface cover element and wadding cover. Sewing method for forming such trim cover assembly involves: pressing and collapsing an end surface of the thick foam wadding in downwardly slantwise direction to provide a compressed thin area, thereby allowing direct access thereto of a conventional sewing machine; operating the sewing machine to sew the compressed thin area with the surface cover element, thereby producing a sewn trim cover having a compressed thin end region therein; and thereafter sewing the wadding cover with such sewn trim cover in correspondence with the compressed thin end region. As such, a trim cover assembly having the thick foam wadding is easily formed by the conventional sewing machine.

U.S. Pat. No. 10,309,046 issued 2019 Jun. 4, to Hiroki Konno, demonstrates a seam structure for fabric and a sewing method which are aesthetically superior and by which pieces of fabric can be sewn together smoothly, without a sewn-on portion protruding at the reverse surface of a garment that comes in contact with the skin, and without fabric edges being exposed at the front surface of the garment. On the upper face of one piece of fabric 2, there extends, along an edge 2a of the fabric, a stitch 5 that is formed as a result of a part of a needle thread 6 passing through the fabric to reach a lower face thereof through stitch holes 4 that are provided at regular intervals; on an upper face of another piece of fabric 3, there are arrayed, along an edge 3a of the fabric, a plurality of rings 7 that are formed as a result of protrusion of an annular leading end of the needle thread 6 having passed through the stitch holes 4 of the one piece of fabric 2 and through the lower faces of the two pieces of fabric; and a first looper thread 8, which runs in a zigzagging manner on the fabric upper faces towards the other piece of fabric 3 so as to entwine two needle threads that pass through the stitch holes 4 of the one piece of fabric 2, and the rings 7 that protrude beyond the other piece of fabric 3, are linked by a second looper thread 9, to yield a seam structure for fabric in which the two pieces of fabric are joined in a state where respective edges thereof are connected to each other.

U.S. Pat. No. 10,815,594 issued 2020 Oct. 27, to Hidetaka Goto, demonstrates a sewing device which can precisely and evenly carry out a great variety of sewing works further with a good productivity. The sewing device has a sewing machine (2), and a dual-arm robot (7) having a first arm (5) and a second arm (6) which can operate an object to be sewn (4) supplied to a sewing motion portion (3) of the sewing machine. The duel-arm robot is provided with a camera which can image the sewing motion portion. Further, the sewing device is provided with an image processing portion which processes an image information acquired by the camera, and a command transmitting portion which transmits commands to an arm control portion controlling the first arm and the second arm on the basis of a processing result of the image processing portion.

U.S. Pat. No. 10,895,030 issued 2021 Jan. 19, to Michael Baker, demonstrates various examples which are provided related to transporting and sewing material in, e.g., automation of sewing robots. Multiple pieces of layered materials can be transported on a flat planar surface while maintaining the material layer's position and orientation relative to one another during a sewing procedure of these materials along any arbitrary seam shape. In one example, among others, a method includes positioning a second piece of material on a first piece of material located on a sewing plane, positioning a material holding apparatus over the pieces of material to secure position and orientation between the pieces of material, locating the pieces of material with respect to an automated sewing machine by repositioning the material holding apparatus, and sewing the second piece of material to the first piece of material. The methods can eliminate the need of custom-made templates for sewing arbitrarily shaped seams with an automated sewing machine.

U.S. Publication No 20020174933 issued 2002 Nov. 28, to Knut Georg Solinski, demonstrates a method for the connection of pieces of textile fabric, a textile band and a method for producing same. In order to provide a textile band or continuous textile product which is suitable for continuous processing, it is proposed that, for the connection of pieces of textile fabric, a cut edge, at which the threads are essentially bound at the edge, is first formed. The textile pieces are then laid one on the other with an overlap, and are pressed one onto the other between a sonotrode and an anvil, where the anvil and/or the sonotrode have a surface profile with a number of elevations, The textile pieces are connected to each other by introducing an ultrasonic oscillation into the sonotrode, thus welding the textile pieces to one another ultrasonically.

U.S. Publication No 20080196136 issued 2008 Aug. 21, to Catherine Fellouhe, demonstrates laminated fabric panels and a method of assembling such panels. A garment, for example, is made of first and second parts assembled to one another by superimposing the first part and the second part so that their inner surfaces face one another; welding the two parts along a weld line; flattening the two parts, the weld line being arranged on the outer side; applying a reinforcement strip to the welding line on the outer side of the garment.

U.S. Publication No 20090199970 issued 2009 Aug. 13, to Giovanni Cartabbia, demonstrates a modular apparatus for adhesively assembling two fabric pieces either within or without further taping operations or for performing only a taping operation on pre-seamed or ultrasound joined fabric pieces, characterized in that said apparatus comprises a base construction to which a plurality of either fixed or separable complementary operating modules are coupled, said operating modules being designed for performing, either individually or in combination with one another, a plurality of different fabric pieces processing operations.

U.S. Publication No 20100215889 issued 2010 Aug. 26, to Nick Cienski, demonstrates a method of joining laminate panels which includes providing at least two laminate panels and joining together the seam areas of the at least two laminate panels by forming at least one seam. Each laminate panel includes at least one layer of textile material having a first thickness in a non-seam area and a second thickness in a seam area. The second thickness is less than the first thickness. An article of manufacture includes at least two laminate panels joined together at the seam areas of the at least two laminate panels by forming at least one seam. Each laminate panel includes at least one layer of textile material having a first thickness in a non-seam area and a second thickness in a seam area.

DISADVANTAGES OF THE PRIOR ART

The prior art have failed to solve many problems associated with method of carapace manufacturing, as follows:
1) No prior art mention or disclose any method of carapace manufacturing, having
   water-ejecting fruit-and-nut discharging wind-diffusing crown carapace 102a.
   Therefore, the prior art of method of carapace manufacturing:
   a) Not capable of diverting rainwater out water-ejecting fruit-and-nut-discharging wind-diffusing crown-carapace nozzle 102b
      in the direction of arrow 131
      (see FIG. 1B and FIG. 1C);
   b) Not capable of decelerating rainwater flow to prevent splashing
      in the direction of arrow 131
      (see FIG. 1B and FIG. 1C);
   c) Not capable of diffusing wind when acting as a carapace;
   d) Not capable of diffusing and preventing wind from lifting a carapace; and
   e) Not capable of redirecting wind
      to cool users.
2) No prior art mention or disclose any method of carapace manufacturing, having
   water-ejecting fruit-and-nut-discharging wind-diffusing crown-carapace nozzle 102b.
   Therefore, the prior art of method of carapace manufacturing:
   a) Not capable of ejecting collected-and-decelerated rainwater into containers
      in the direction of arrow 131
      (see FIG. 1B and FIG. 1C);
   b) Not capable of discharging harvested-and-decelerated fruits and nuts into containers;
   c) Not capable of redirecting wind to power marine kayaks
      in the direction of arrow 132
      (see FIG. 3A and FIG. 3B);
   d) Not capable of redirecting wind to power land-yachts
      in the direction of arrow 133
      (see FIG. 3C and FIG. 3D);
   e) Not capable of diffusing and preventing wind from lifting a carapace; and
   f) Not capable of redirecting wind
      to cool users.
3) No prior art mention or disclose any method of carapace manufacturing, having
   at least one first three-hundred-and-sixty-degree-orientational-carapace panel 103a.
   Therefore, the prior art of method of carapace manufacturing:
   a) Not capable of being cut from a single piece of fabric;
   b) Not capable of being sewn to at least one second three-hundred-and-sixty-degree-orientational-carapace panel 103b by at least one breadth-wise carapace-panel-connecting seam 104a;
   c) Not capable of acting as a water-collecting apparatus;
   d) Not capable of acting as a projector screen;
   e) Not capable of acting a shade when attached to a pickup truck;
   f) Not capable of acting as tonneau cover for a pickup truck;
   g) Not capable of acting as a privacy screen;
   h) Not capable of acting as a shade for multiple areas when attached to a patio table; and
   i) Not capable of acting as a pool shade.
4) No prior art mention or disclose any method of carapace manufacturing, having
   at least one second three-hundred-and-sixty-degree-orientational-carapace panel 103b.
   Therefore, the prior art of method of carapace manufacturing:
   a) Not capable of being cut from a single piece of fabric;
   b) Not capable of being sewn to at least one second three-hundred-and-sixty-degree-orientational-carapace panel 103b by at least one breadth-wise carapace-panel-connecting seam 104a;
   c) Not capable of acting as a water-collecting apparatus;
   d) Not capable of acting as a projector screen;
   e) Not capable of acting a shade when attached to a pickup truck;
   f) Not capable of acting as tonneau cover for a pickup truck;
   g) Not capable of acting as a privacy screen;
   h) Not capable of acting as a shade for multiple areas when attached to a patio table; and
   i) Not capable of acting as a pool shade.
5) No prior art mention or disclose any method of carapace manufacturing, having
   at least one breadth-wise carapace-panel-connecting seam 104a.
   Therefore, the prior art of method of carapace manufacturing:
   a) Not capable of sewingly connecting at least one first three-hundred-and-sixty-degree-orientational-carapace panel 103a and at least one second three-hundred-and-sixty-degree-orientational-carapace panel 103b; and
   b) Not capable of lockingly attaching at least one first three-hundred-and-sixty-degree-orientational-carapace panel 103a and at least one second three-hundred-and-sixty-degree-orientational-carapace panel 103b to each other in a single seam.
6) No prior art mention or disclose any method of carapace manufacturing, having
   at least one mid-panel water-directing water-decelerating fruit-and-nut-decelerating wind-diffusing ridge seam 104b.
   Therefore, the prior art of method of carapace manufacturing:
   a) Not capable of directing water along the surface of at least one first three-hundred-and-sixty-degree-orientational-carapace panel 103a and at least one second three-hundred-and-sixty-degree-orientational-carapace panel 103b to exit out water-ejecting fruit-and-nut discharging wind-diffusing crown-carapace nozzle 102b;
   b) Not capable of decelerating rainwater flow
      to prevent splashing;
   c) Not capable of decelerating fruits or nuts when harvesting each
      to prevent damage to fruits and nuts;

d) Not capable of diffusing wind when acting as a wind screen; and
e) Not capable of diffusing wind when acting as a carapace.

7) No prior art mention or disclose any method of carapace manufacturing, having
adjustable stanchion-supporting twist-locking base 128.
Therefore, the prior art of method of carapace manufacturing:
 a) Not capable of twist-locking with an additional adjustable stanchion-supporting twist-locking base 128 from an additional carapace
  to enable increased volumes for collecting rainwater, or harvesting fruit, or harvesting nuts;
 b) Not capable of twist-locking with an additional adjustable stanchion-supporting twist-locking base 128 from an additional carapace
  to provide versatility with arranging multiple five-device-in-one single-seam three-hundred-and-sixty-degree-orientational spline-interchanging carapaces together;
 c) Not capable of attaching to a wind-powered boat or other wind-powered vehicle
  to allow a carapace to act as a carapace;
 d) Not capable of attaching to a truck bed
  to allow a carapace to collect water, or harvest fruits or harvest nuts;
 e) Not capable of attaching to a truck bed to act as a tonneau cover
  to allow a carapace to provide protection to bed contents;
 f) Not capable of attaching to a bumper
  to allow a carapace to provide shade, wind protection, and rain protection;
 g) Not capable of attaching to a bumper
  to allow a carapace to provide a projector screen;
 h) Not capable of attaching to a balcony
  to allow a carapace to provide shade, wind protection, and rain protection;
 i) Not capable of securing adjustable carapace stanchion 127 to stabilizing foot 130;
 j) Not capable of attaching to a marine-kayak chassis
  to redirect wind to power marine kayaks; and
 k) Not capable of attaching to a land-yacht chassis
  to redirect wind to power land-yachts.

OBJECTS AND ADVANTAGES OF THE INVENTION

The present invention substantially departs from the conventional concepts and methods of the prior art. In doing so, the present invention provides a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having many unique and significant features, functions, and advantages, which overcome all the disadvantages of the prior art, as follows:

1) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
water-ejecting fruit-and-nut discharging wind-diffusing crown carapace 102*a*.
Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
 a) Capable of diverting rainwater out water-ejecting fruit-and-nut-discharging wind-diffusing crown-carapace nozzle 102*b*
  in the direction of arrow 131
  (see FIG. 1B and FIG. 1C);
 b) Capable of decelerating rainwater flow to prevent splashing
  in the direction of arrow 131
  (see FIG. 1B and FIG. 1C);
 c) Capable of diffusing wind when acting as a carapace;
 d) Capable of diffusing and preventing wind from lifting a five-device-in-one water-collecting-and-decelerating fruit-and-nut-collecting-and-decelerating wind-diffusing-and-redirecting multi-function-transversable-ridge-and-seam multi-function-twist-locking-base carapace; and
 e) Capable of redirecting wind
  to cool users.

2) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
water-ejecting fruit-and-nut-discharging wind-diffusing crown-carapace nozzle 102*b*.
Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
 a) Capable of ejecting collected-and-decelerated rainwater into containers
  in the direction of arrow 131
  (see FIG. 1B and FIG. 1C);
 b) Capable of discharging harvested-and-decelerated fruits and nuts into containers;
 c) Capable of diffusing redirecting wind to power marine kayaks
  in the direction of arrow 132
  (see FIG. 3A and FIG. 3B);
 d) Capable of redirecting wind to power land-yachts
  in the direction of arrow 133
  (see FIG. 3C and FIG. 3D);
 e) Capable of diffusing and preventing wind from lifting a five-device-in-one water-collecting-and-decelerating fruit-and-nut-collecting-and-decelerating wind-diffusing-and-redirecting multi-function-transversable-ridge-and-seam multi-function-twist-locking-base carapace; and
 f) Capable of redirecting wind
  to cool users.

3) It is an object of the new invention to provide a method of manufacturing and using five-device-in-one water-collecting-and-decelerating fruit-and-nut-collecting-and-decelerating wind-diffusing-and-redirecting multi-function-transversable-ridge-and-seam multi-function-twist-locking-base carapace, having
at least one first three-hundred-and-sixty-degree-orientational-carapace panel 103*a*.

Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
  a) Capable of being cut from a single piece of fabric;
  b) Capable of being sewn to at least one second three-hundred-and-sixty-degree-orientational-carapace panel 103b by at least one breadth-wise carapace-panel-connecting seam 104a;
  c) Capable of acting as a water-collecting apparatus;
  d) Capable of acting as a projector screen;
  e) Capable of acting a shade when attached to a pickup truck;
  f) Capable of acting as tonneau cover for a pickup truck;
  g) Capable of acting as a privacy screen;
  h) Capable of acting as a shade for multiple areas when attached to a patio table; and
  i) Capable of acting as a pool shade.
4) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
  at least one second three-hundred-and-sixty-degree-orientational-carapace panel 103b.
  Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
    a) Capable of being cut from a single piece of fabric;
    b) Capable of being sewn to at least one second three-hundred-and-sixty-degree-orientational-carapace panel 103b by at least one breadth-wise carapace-panel-connecting seam 104a;
    c) Capable of acting as a water-collecting apparatus;
    d) Capable of acting as a projector screen;
    e) Capable of acting a shade when attached to a pickup truck;
    f) Capable of acting as tonneau cover for a pickup truck;
    g) Capable of acting as a privacy screen;
    h) Capable of acting as a shade for multiple areas when attached to a patio table; and
    i) Capable of acting as a pool shade.
5) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
  at least one breadth-wise carapace-panel-connecting seam 104a.
  Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
    a) Capable of sewingly connecting at least one first three-hundred-and-sixty-degree-orientational-carapace panel 103a and at least one second three-hundred-and-sixty-degree-orientational-carapace panel 103b; and
    c) Capable of lockingly attaching at least one first three-hundred-and-sixty-degree-orientational-carapace panel 103a and at least one second three-hundred-and-sixty-degree-orientational-carapace panel 103b to each other in a single seam.
6) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
  at least one mid-panel water-directing water-decelerating fruit-and-nut-decelerating wind-diffusing ridge seam 104b.
  Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
    a) Capable of directing water along the surface of at least one first three-hundred-and-sixty-degree-orientational-carapace panel 103a and at least one second three-hundred-and-sixty-degree-orientational-carapace panel 103b to exit out water-ejecting fruit-and-nut discharging wind-diffusing crown-carapace nozzle 102b;
    b) Capable of decelerating rainwater flow
      to prevent splashing;
    c) Capable of decelerating fruits or nuts when harvesting each
      to prevent damage to fruits and nuts;
    d) Capable of diffusing wind when acting as a wind screen; and
    e) Capable of diffusing wind when acting as a carapace.
7) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
  adjustable stanchion-supporting twist-locking base 128.
  Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
    a) Capable of twist-locking with an additional adjustable stanchion-supporting twist-locking base 128 from an additional five-device-in-one water-collecting-and-decelerating fruit-and-nut-collecting-and-decelerating wind-diffusing-and-redirecting multi-function-transversable-ridge-and-seam multi-function-twist-locking-base carapace
      to enable increased volumes for collecting rainwater, or harvesting fruit, or harvesting nuts;
    b) Capable of twist-locking with an additional adjustable stanchion-supporting twist-locking base 128 from an additional five-device-in-one water-collecting-and-decelerating fruit-and-nut-collecting-and-decelerating wind-diffusing-and-redirecting multi-function-transversable-ridge-and-seam multi-function-twist-locking-base carapace to provide versatility with arranging multiple five-device-in-one single-seam three-hundred-and-sixty-degree-orientational spline-interchanging carapaces together;
c) Capable of attaching to a wind-powered boat or other wind-powered vehicle
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to act as a carapace;
d) Capable of attaching to a truck bed
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to collect water, or harvest fruits or harvest nuts;
e) Capable of attaching to a truck bed to act as a tonneau cover
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide protection to bed contents;
f) Capable of attaching to a bumper
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide shade, wind protection, and rain protection;
g) Capable of attaching to a bumper
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide a projector screen;
h) Capable of attaching to a balcony
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide shade, wind protection, and rain protection;
i) Capable of securing adjustable carapace stanchion 127 to stabilizing foot 130;
j) Capable of attaching to a marine-kayak chassis
to redirect wind to power marine kayaks; and
k) Capable of attaching to a land-yacht chassis
to redirect wind to power land-yachts.

Other objects and advantages of the present invention will become apparent from a consideration of the accompanying drawings and ensuing description.

SUMMARY OF THE INVENTION

A method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, which has at least one first three-hundred-and-sixty-degree-orientational-carapace panel, at least one second three-hundred-and-sixty-degree-orientational-carapace panel, a water-ejecting fruit-and-nut-discharging wind-diffusing crown-carapace nozzle, at least one breadth-wise carapace-panel-connecting seam, at least one mid-panel water-directing water-decelerating fruit-and-nut-decelerating wind-diffusing ridge seam, a upper hub, rib-hinging intersectors, arched carapace-supporting ribs, a three-hundred-sixty-degree-rotatably-locking center-support stanchion, an adjustable stanchion-supporting twist-locking base, a shuttle hub, and actuating-and-supporting ribs, comprises the steps of: sewing said at least one first three-hundred-and-sixty-degree-orientational-carapace panel and said at least one second three-hundred-and-sixty-degree-orientational-carapace panel together such that said at least one breadth-wise carapace-panels-connecting seam and said at least one mid-panel water-directing water-decelerating fruit-and-nut-decelerating wind-diffusing ridge seams are formed between said at least one first three-hundred-and-sixty-degree-orientational-carapace panel and said at least one second three-hundred-and-sixty-degree-orientational-carapace panel for converging rain water therein-to repeatedly change the direction of rain water to decelerate the flowing speed of rain water to reduce water splash to avoid damaging irrigated vegetables, for converging harvested fruits therein to repeatedly change the direction of harvested fruits to decelerate the rolling speed of harvested fruits to reduce fruit bruises to avoid throwing away bruised fruits, for converging harvested nuts therein to repeatedly change the direction of harvested nuts to decelerate the rolling speed of harvested nuts to reduce nut bruises to avoid throwing away bruised nuts, for converging catched balls therein to repeatedly change the direction of catched balls to decelerate the rolling speed of catched balls to reduce ball damages to avoid throwing away damaged balls, for directing rain water therealong, for directing harvested fruits therealong, for directing harvested nuts therealong, for directing game balls therealong, for forming a collecting cistern to collect rain water to irrigate garden, for forming a diverting gutter to collect rain water to discharge said rain water away from house balcony and foundation, for forming a collecting device to collect harvested fruits to save labor and time, for forming a collecting device to collect harvested nuts to save labor and time, for forming a collecting device to collect game balls to save labor and time, for forming a tonneau cover for a truck bed, for forming a shade cover, for forming a free-standing projector screen, for forming a hitch-mountable projector screen, and for forming a sports-ball blocking device, and such that said water-ejecting fruit-and-nut discharging wind-diffusing crown-carapace nozzle is formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel for ejecting collected-and-decelerated rainwater into containers, for discharging harvested-and-decelerated fruits and nuts into containers, for redirecting wind to power land-yachts, for diffusing wind to prevent wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace, for redirecting wind to cool users; attaching said at least one first three-hundred-and-sixty-degree-orientational-carapace panel to said arched carapace-supporting ribs; attaching said at least one second three-hundred-and-sixty-degree-orientational-carapace panel to arched carapace-supporting ribs; and twist-locking said adjustable stanchion-supporting twist-locking base to another adjustable stanchion-supporting twist-locking base for enabling said five-device-in-one carapace to increase volumes for collecting rainwater, or harvesting fruit, or harvesting nuts, for enabling said five-device-in-one carapace to provide versatility with arranging multiple five-device-in-one carapaces together, a wind-powered boat for enabling said five-device-in-one carapace to redirect wind to power said wind-powered boat, a wind-powered vehicle for enabling said five-device-in-one carapace to redirect wind to power said wind-powered vehicle, a wind-powered marine kayak for enabling said five-device-in-one carapace to redirect wind to power said wind-powered marine kayak, a wind-powered land-yacht for enabling said five-device-in-one carapace to redirect wind to power said wind-powered land-yacht, a utility hole of a truck for enabling said five-device-in-one carapace to function as a tonneau cover, a bumper of a truck for enabling said five-device-in-one carapace to function as a projector screen, or a hand rail of a balcony for enabling said five-device-in-one carapace to provide shade, wind protection, and rain protection.

BRIEF DESCRIPTION OF THE DRAWINGS

FIG. 1A, FIG. 1B, FIG. 1C, FIG. 1D, FIG. 1E, FIG. 1F, FIG. 1G, FIG. 1H, FIG. 1I, and FIG. 1J illustrate perspective, side, top and bottom views depicting three-hundred-and-sixty-degree-orientational water-collecting-and-decelerating fruit-nut-harvesting-and-decelerating wind-diffusing-and-redirecting discharging-nozzle carapace system 101 and three-hundred-and-sixty-degree-orientational carapace-supporting-and-securing system 106.

FIG. 2A, FIG. 2B, and FIG. 2C illustrate perspective, and side views depicting three-hundred-and-sixty-degree-orientational water-collecting-and-decelerating fruit-nut-harvesting-and-decelerating wind-diffusing-and-redirecting discharging-nozzle carapace system 101 and three-hundred-and-sixty-degree-orientational carapace-supporting-and-securing system 106.

FIG. 3A, FIG. 3B, FIG. 3C, FIG. 3D, FIG. 3E, FIG. 3F, FIG. 3G, FIG. 3H, FIG. 3I, FIG. 3J, FIG. 3K, and FIG. 3L illustrate perspective, front, and side views depicting the various functions of the five-device-in-one water-collecting-and-decelerating fruit-and-nut-collecting-and-decelerating wind-diffusing-and-redirecting multi-function-transversable-ridge-and-seam multi-function-twist-locking-base carapace.

FIG. 4A, FIG. 4B, FIG. 4C, FIG. 4D, FIG. 4E, FIG. 4F, FIG. 4G, FIG. 4H, and FIG. 4I illustrate front, side, and top views depicting carapace-multi-orienting snap-locking pivoting-elbow system 118.

FIG. 5A, FIG. 5B, FIG. 5C, and FIG. 5D illustrate perspective, front, and side views depicting multi-function carapace-supporting-stanchion twist-locking-base system 126.

FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, and FIG. 28 illustrate perspective views depicting the various functions of the five-device-in-one water-collecting-and-decelerating fruit-and-nut-collecting-and-decelerating wind-diffusing-and-redirecting multi-function-transversable-ridge-and-seam multi-function-twist-locking-base carapace.

DETAILED DESCRIPTION OF THE INVENTION

Figure 1A:
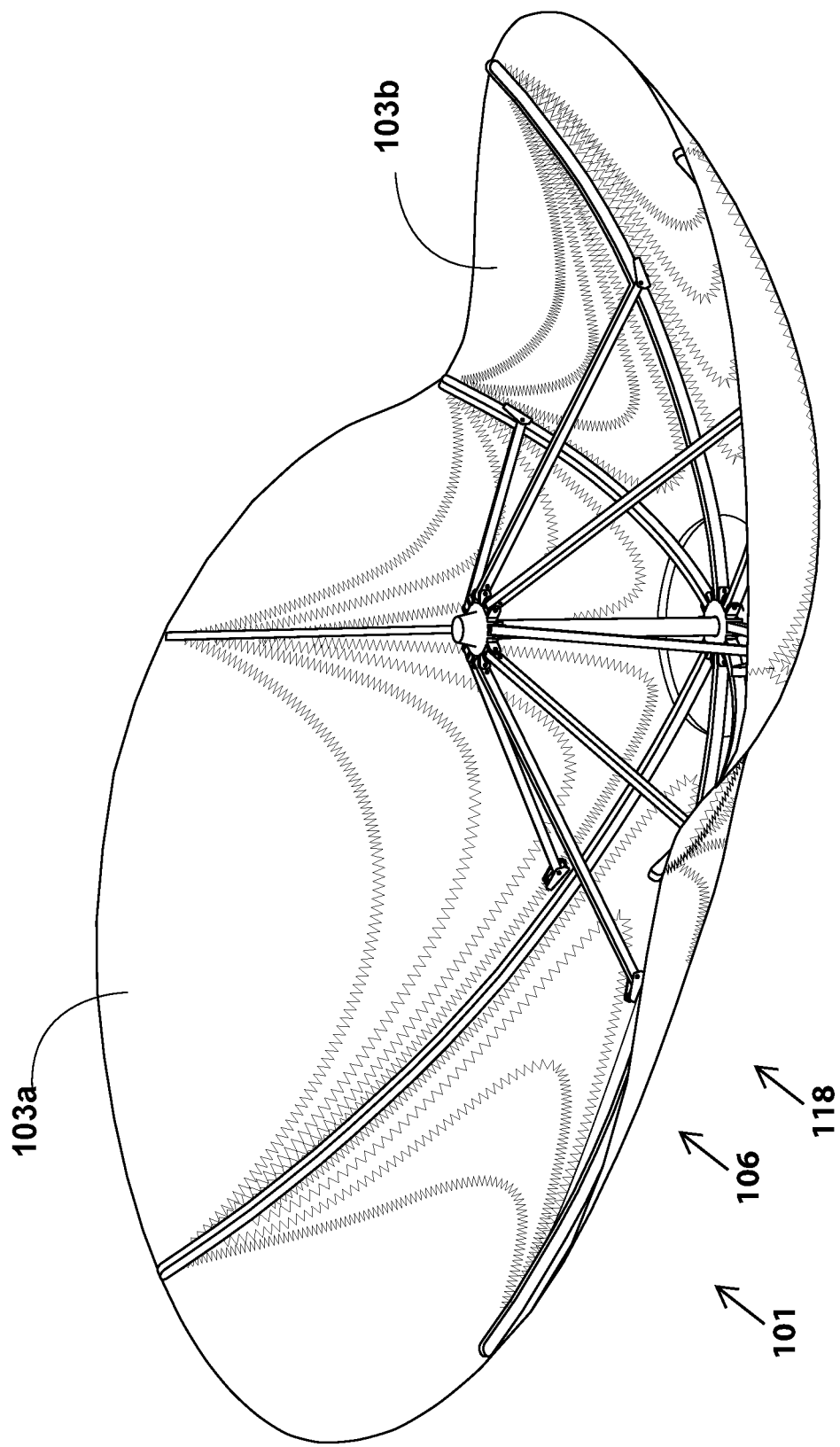
Figure 1B:
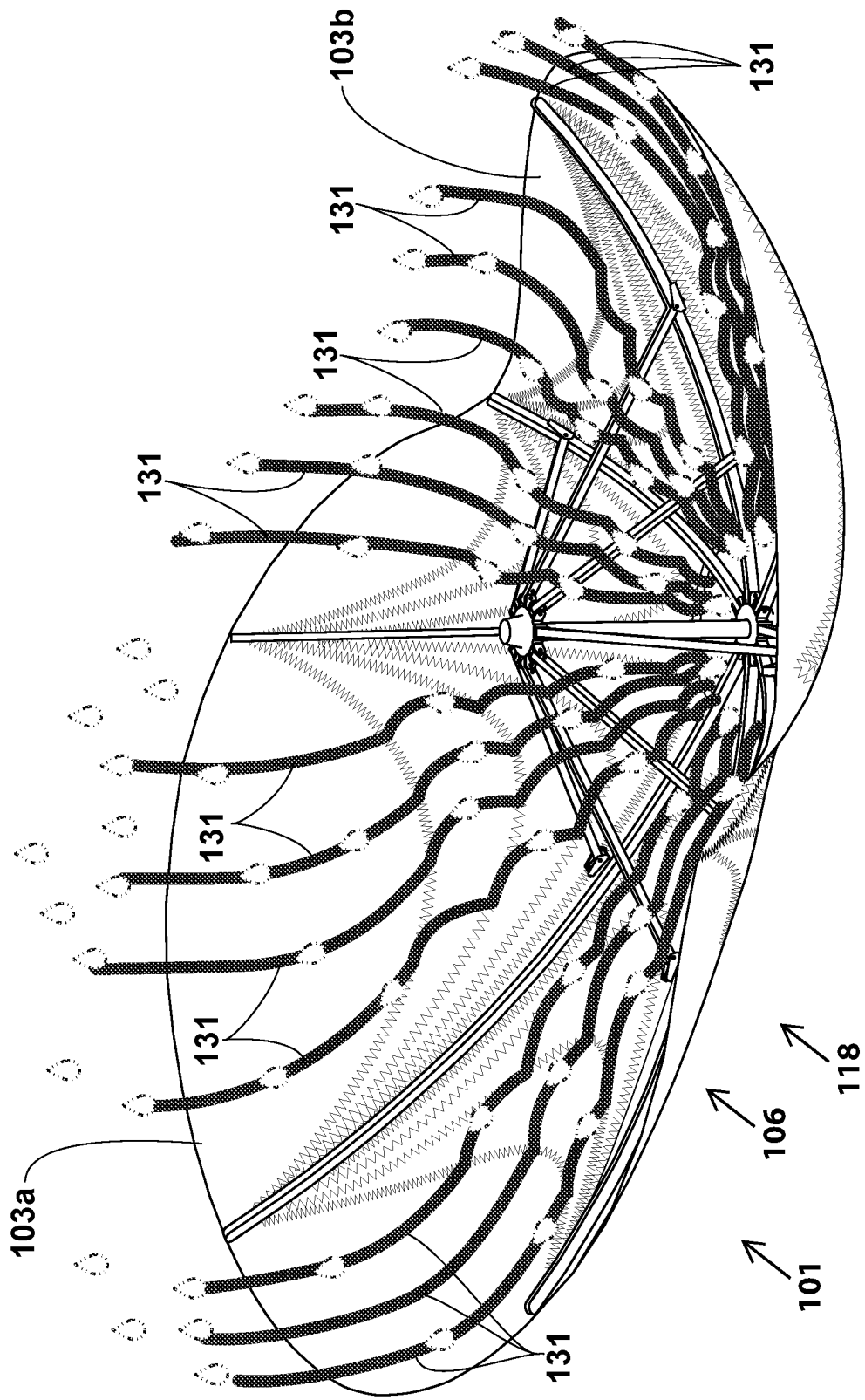
Figure 1E:
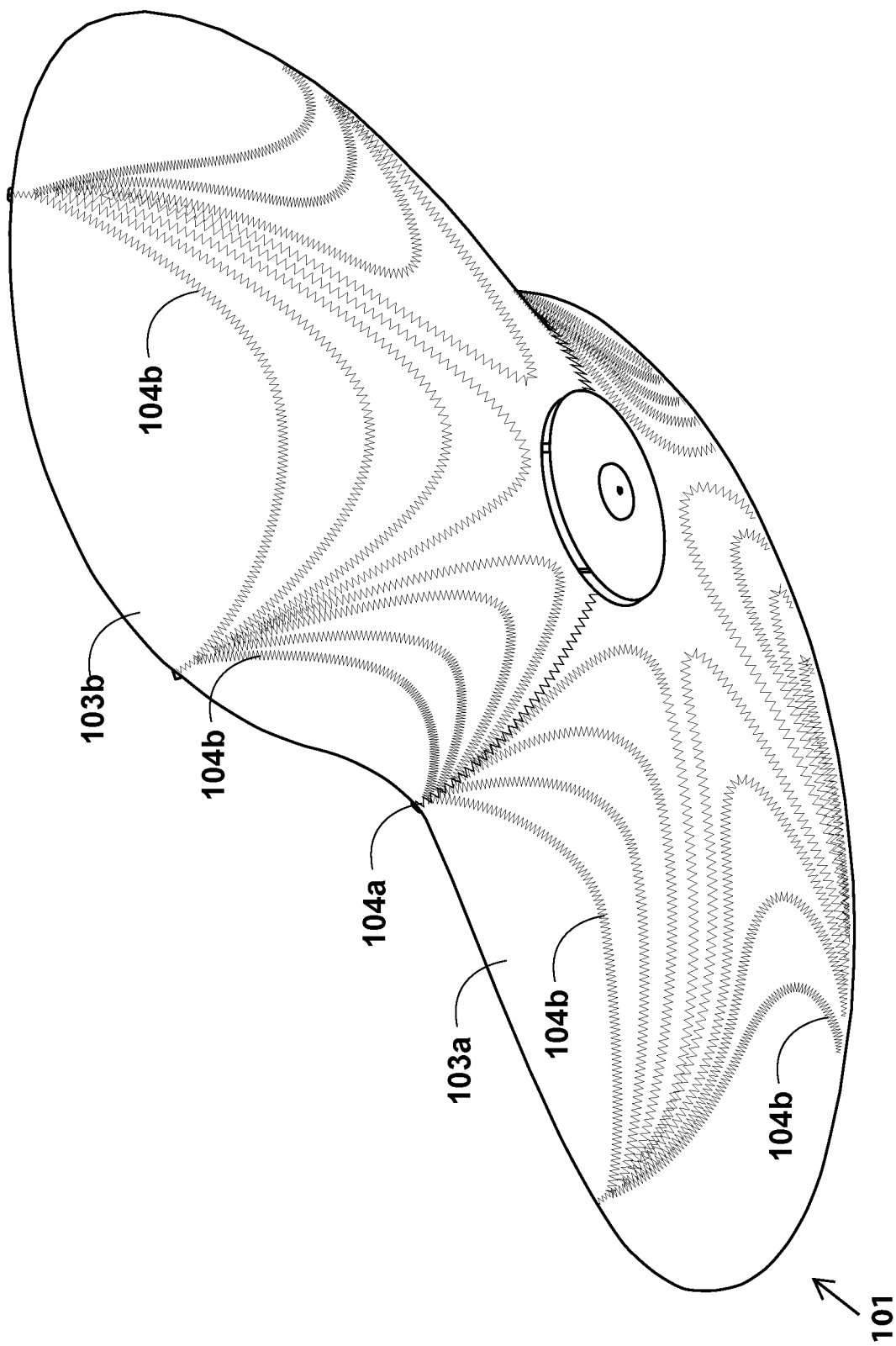
Figure 1F:
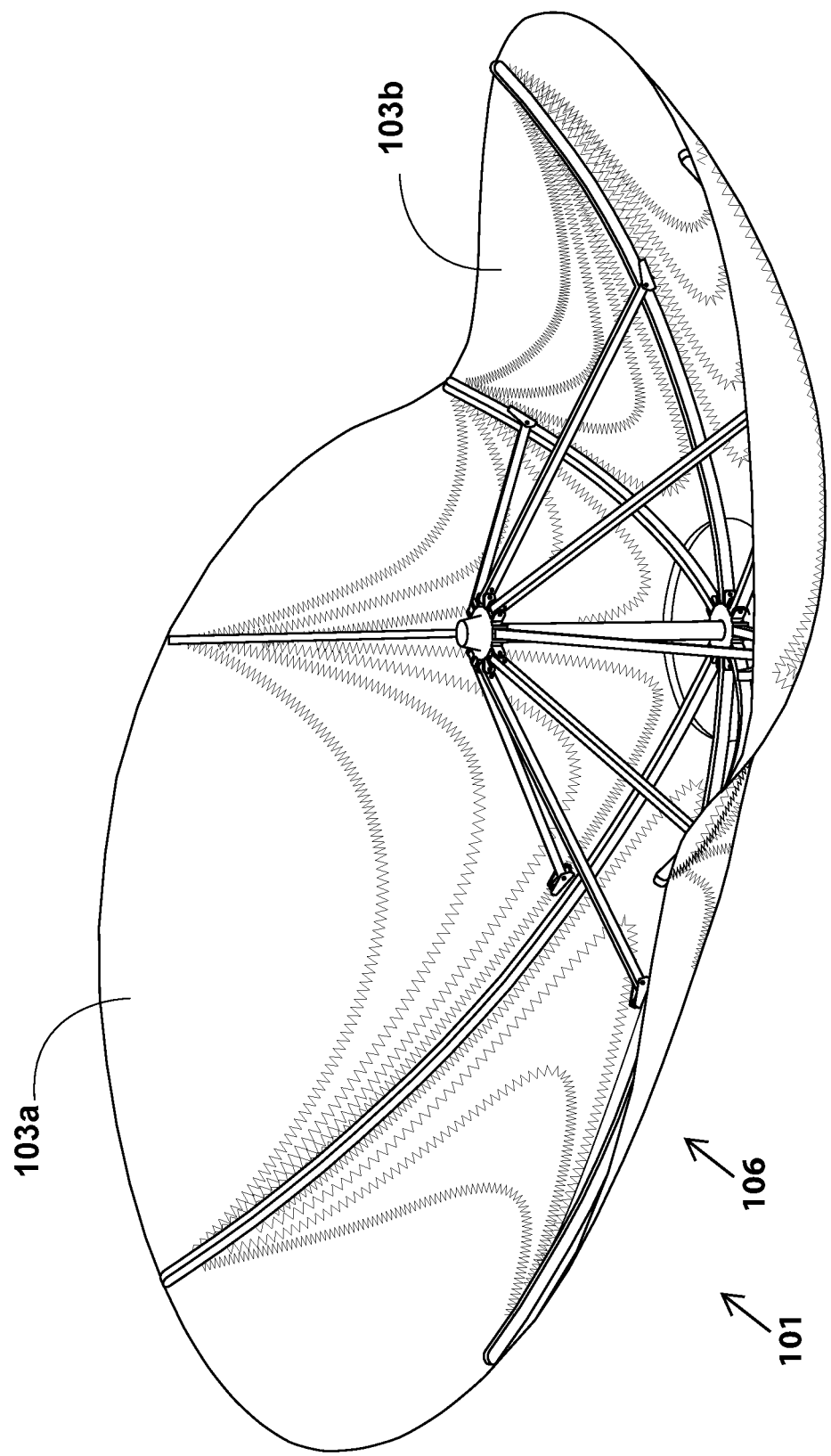
Figure 1G:
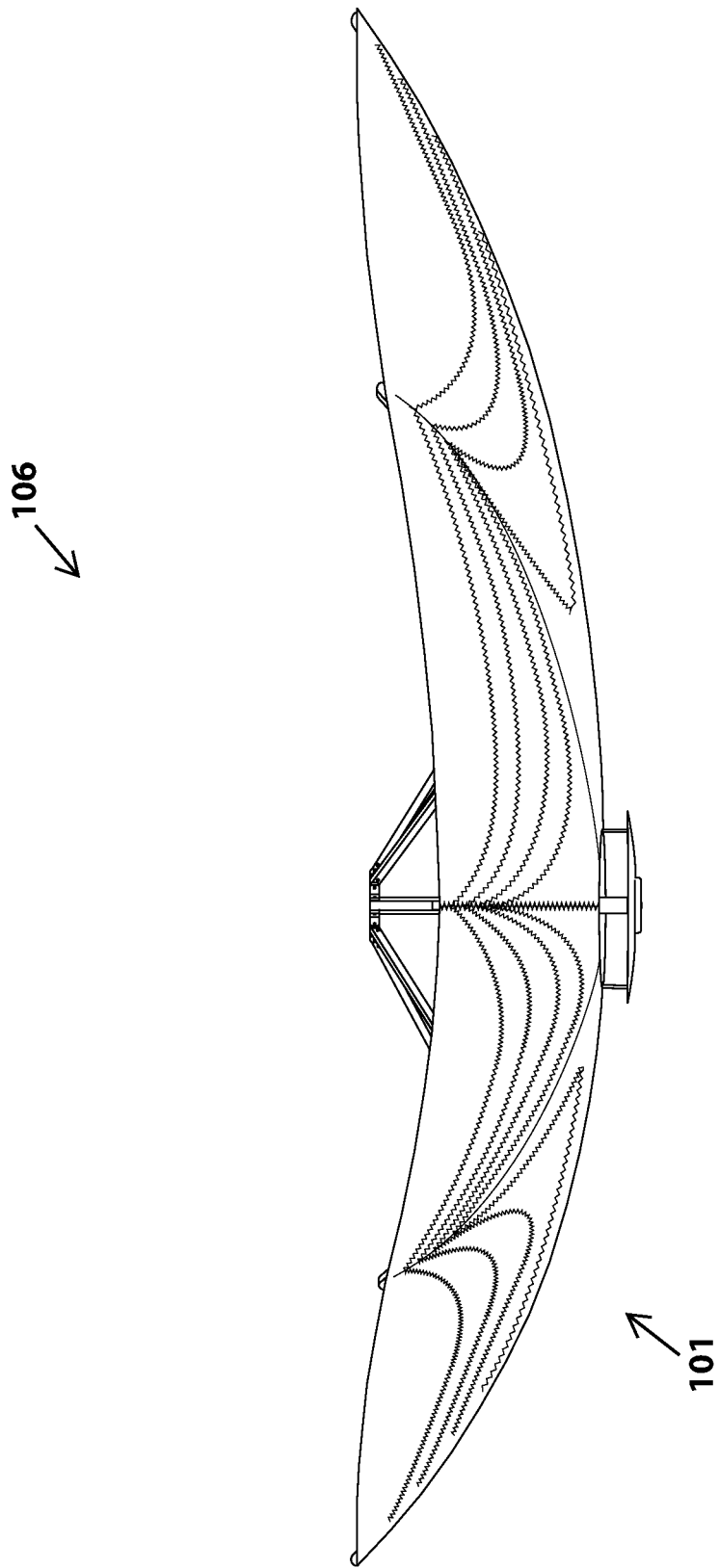
Figure 1H:
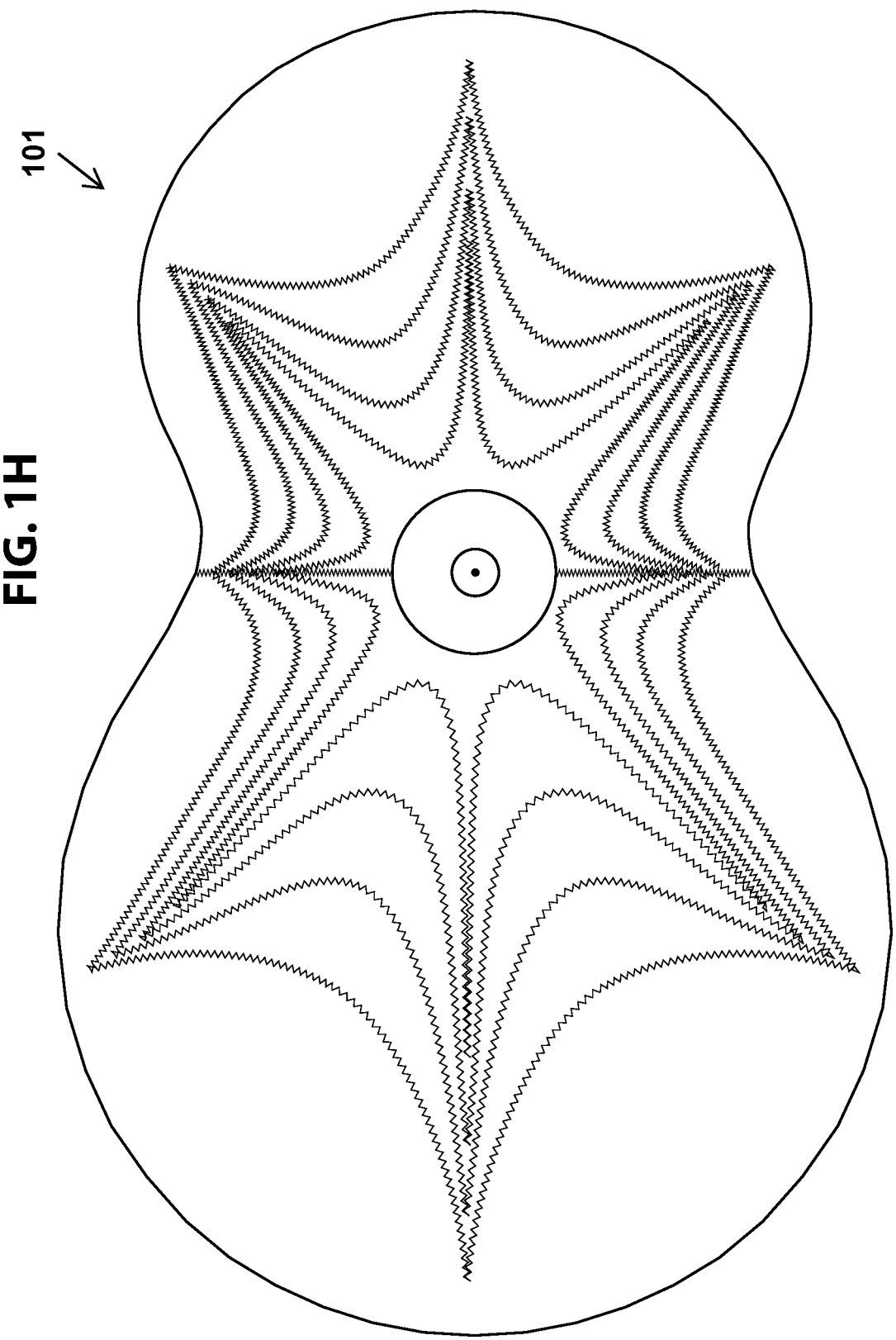
Figure 1I:
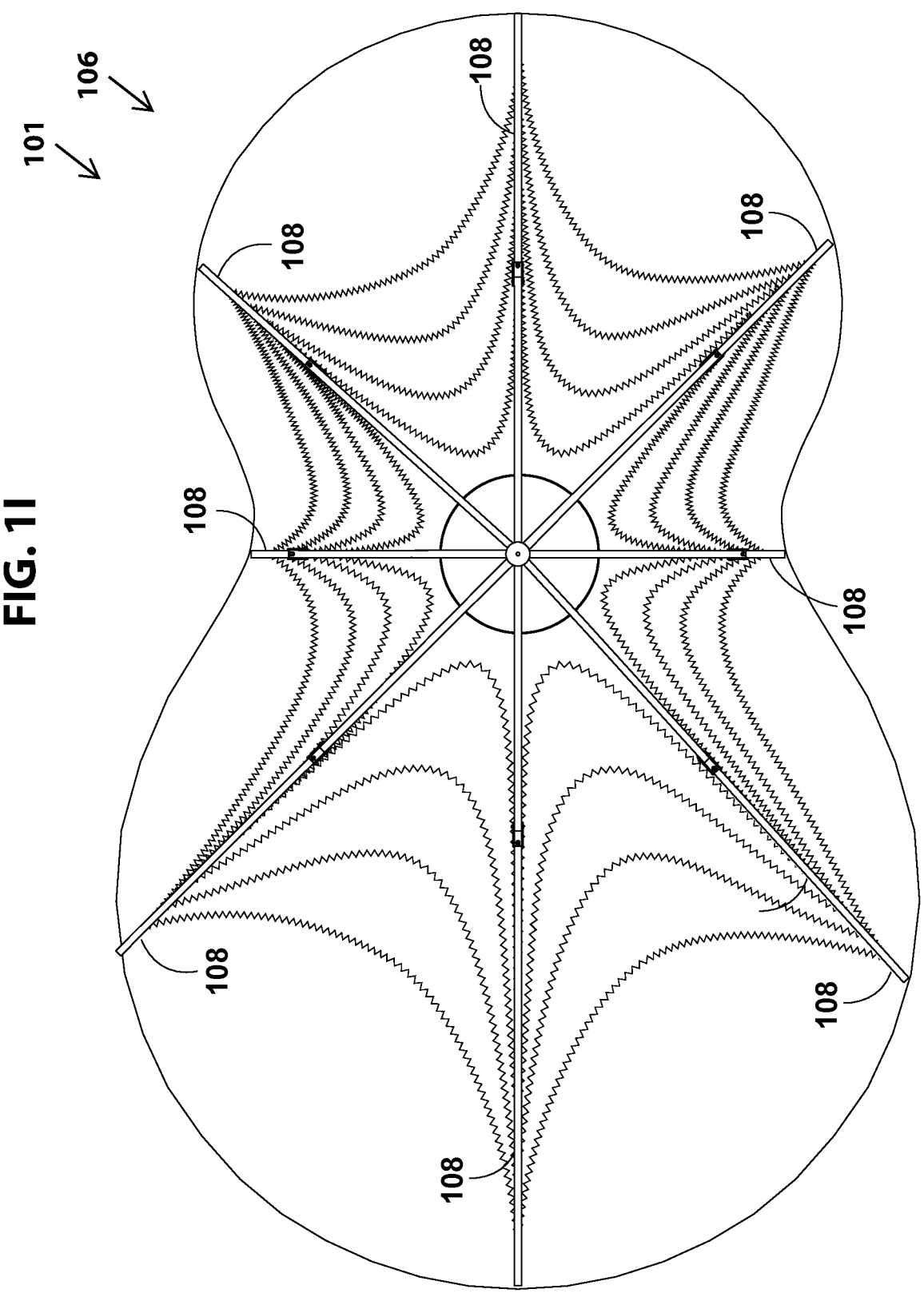
Figure 2A:
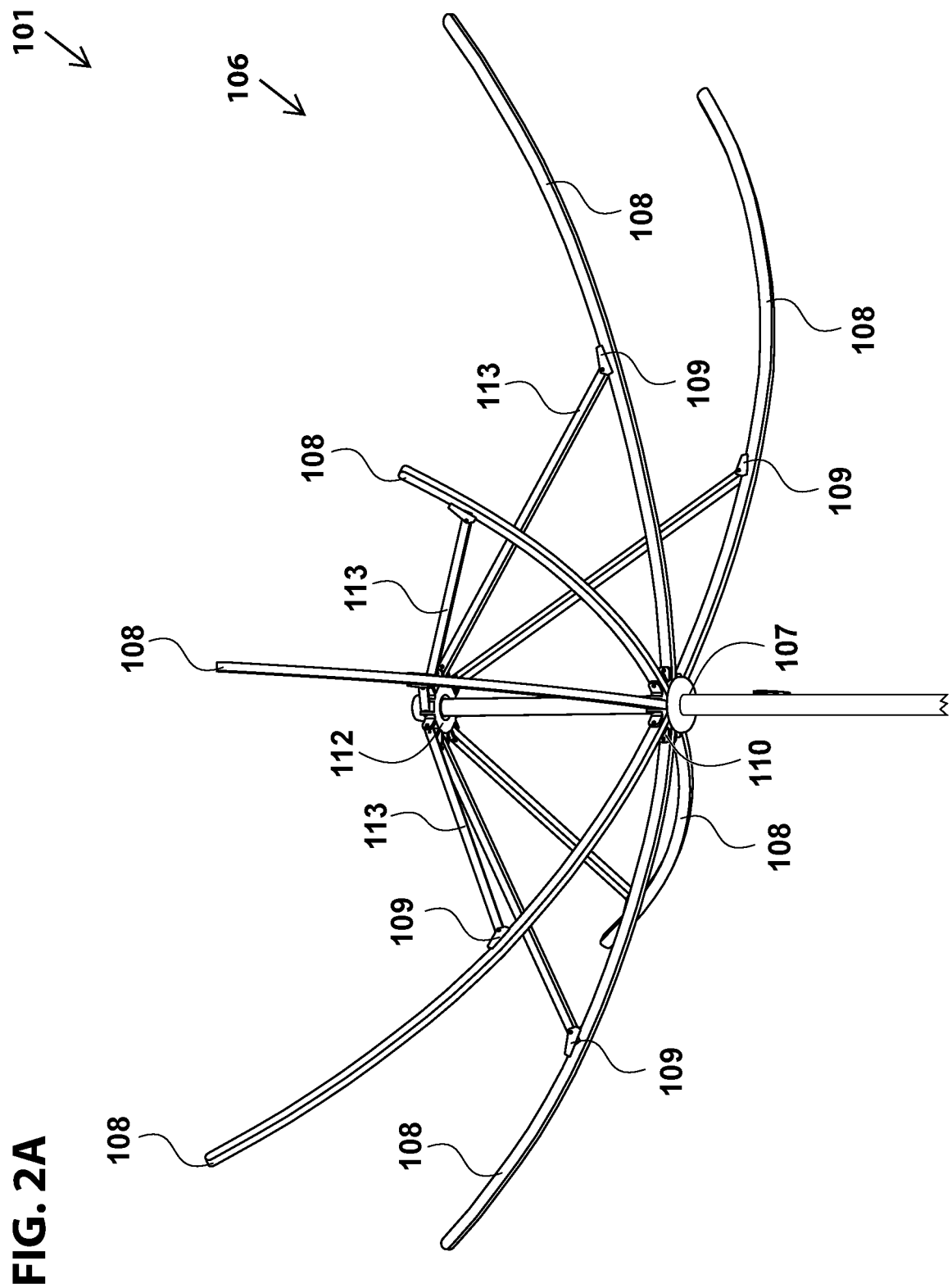
Figure 2B:
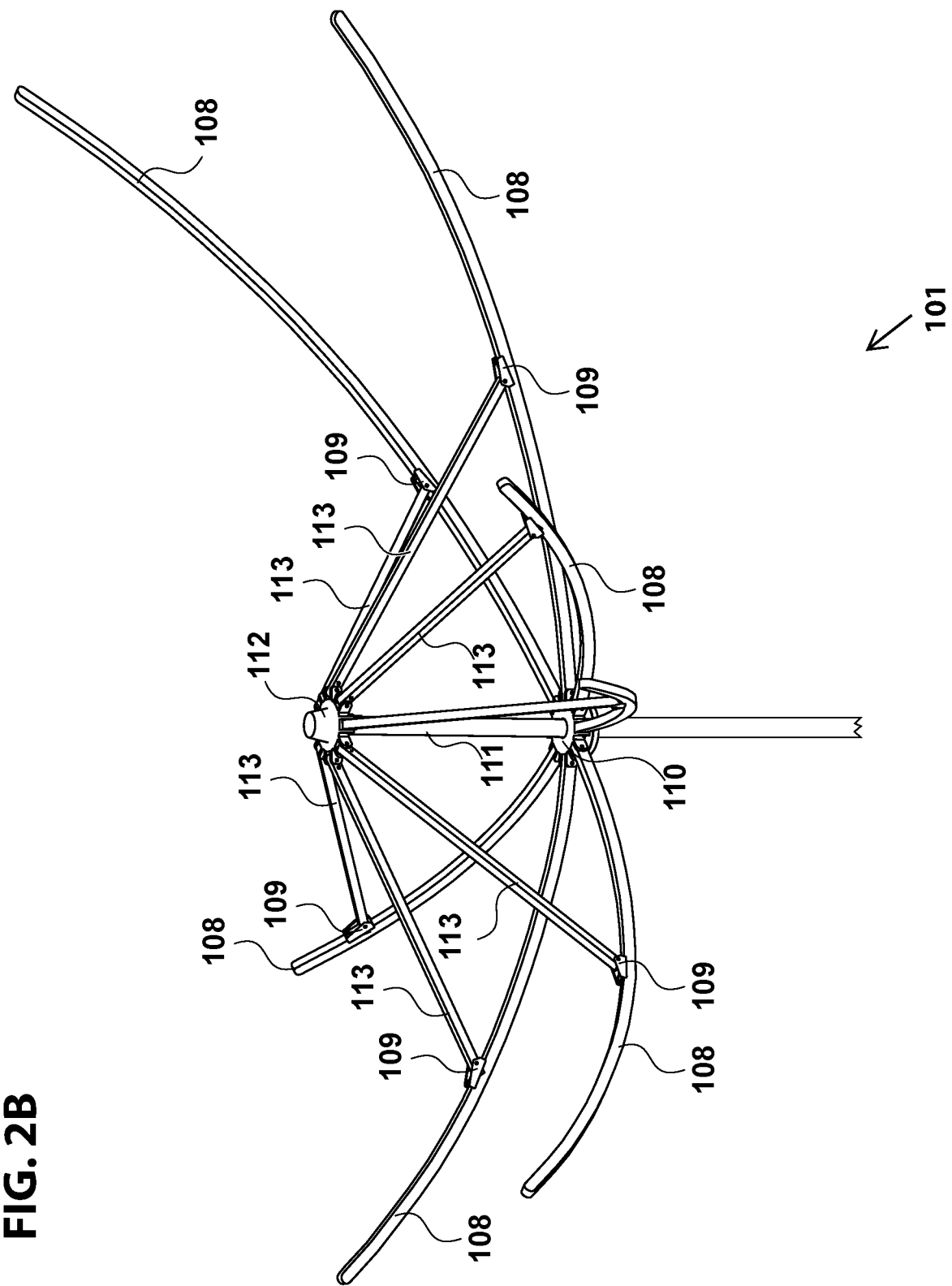
Figure 3A:
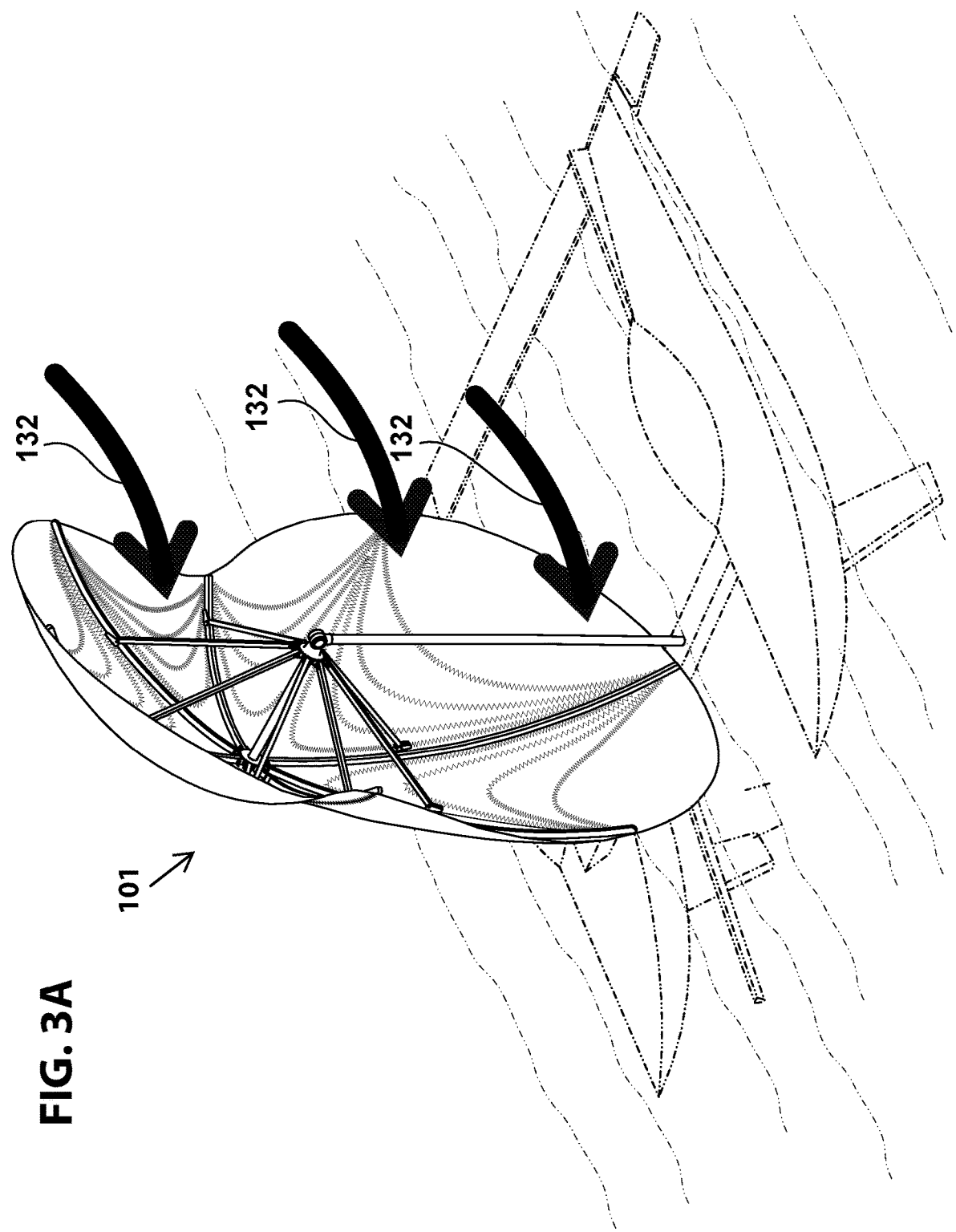
Figure 3B:
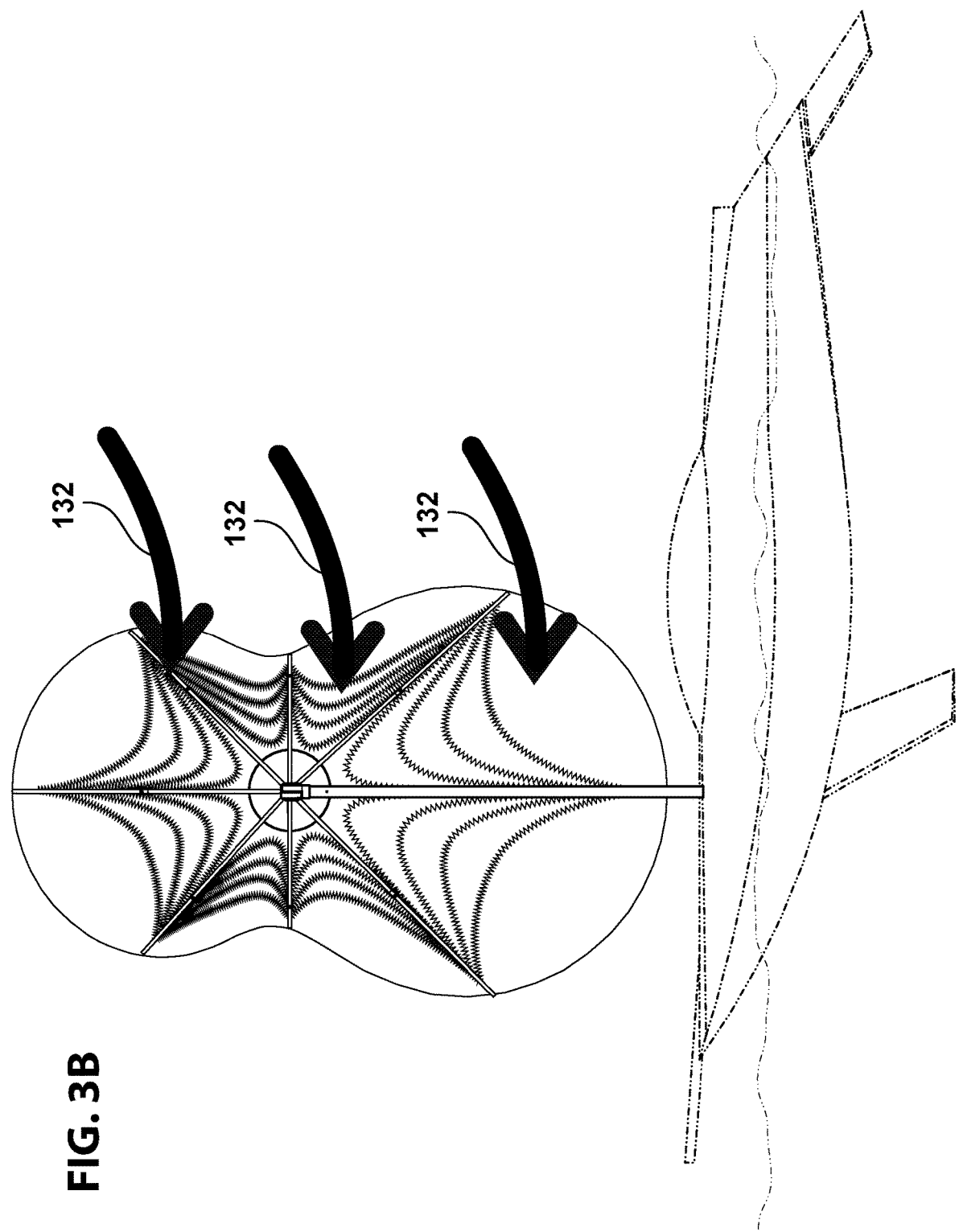
Figure 3C:
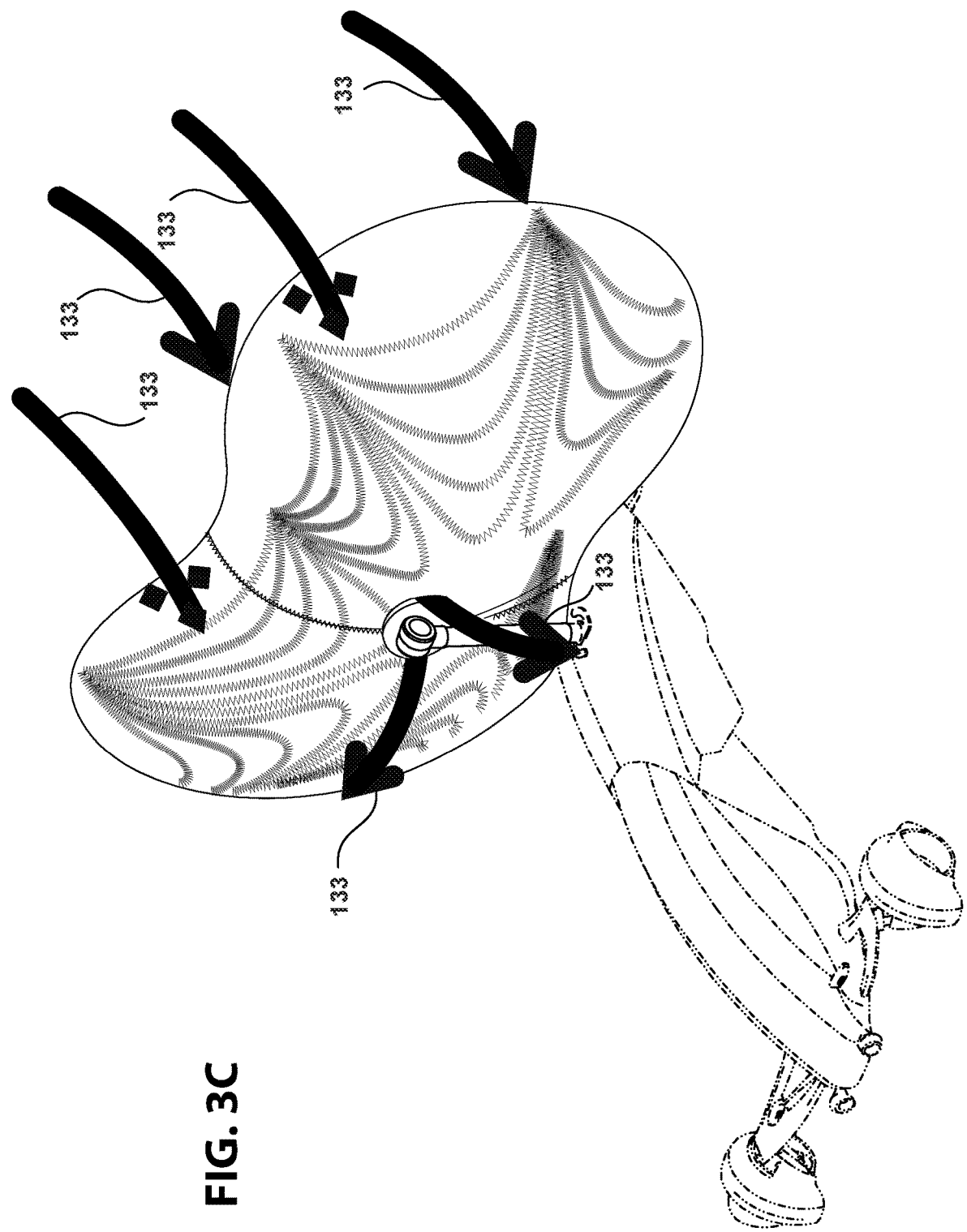
Figure 3D:
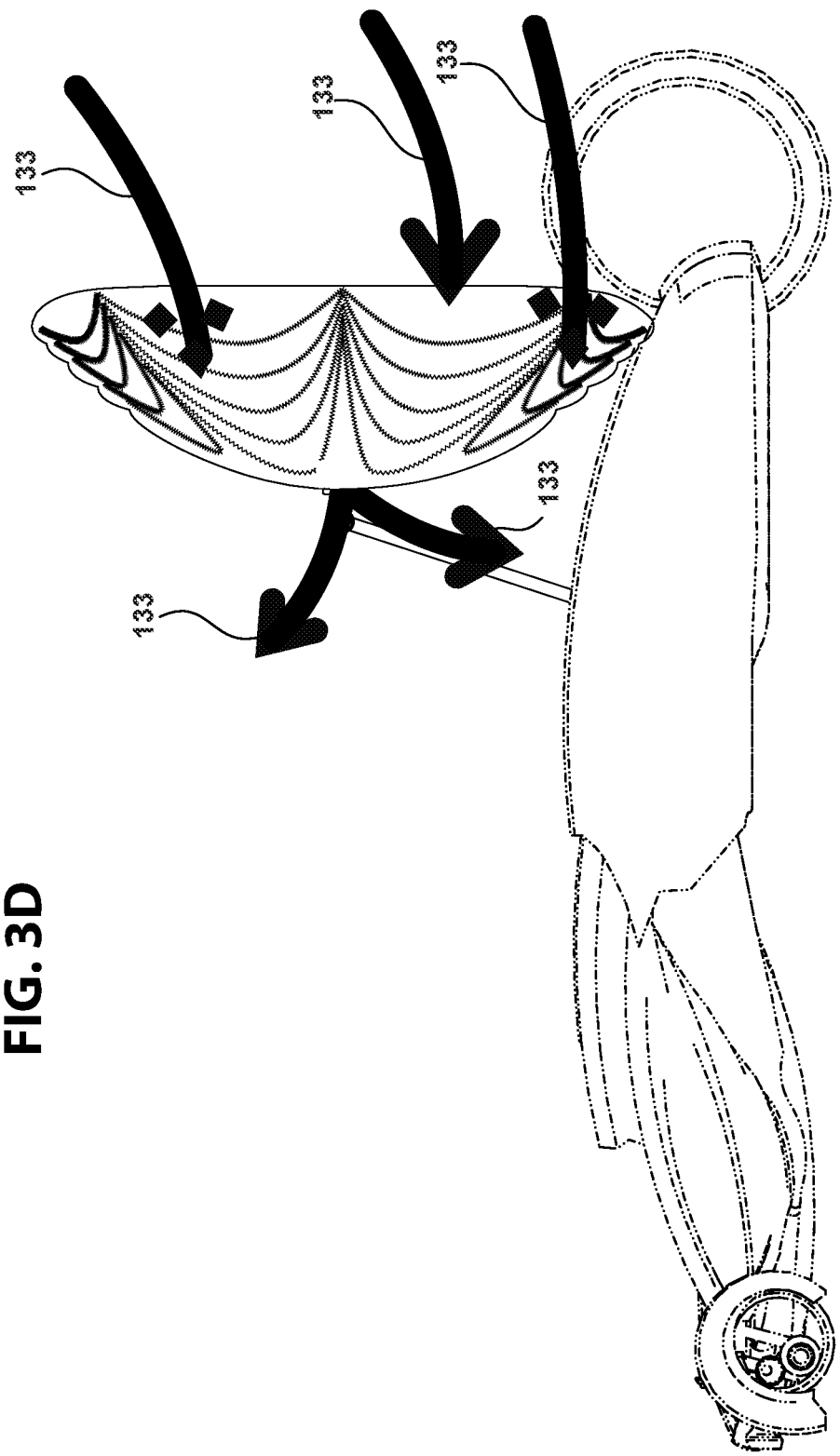
Figure 3E:
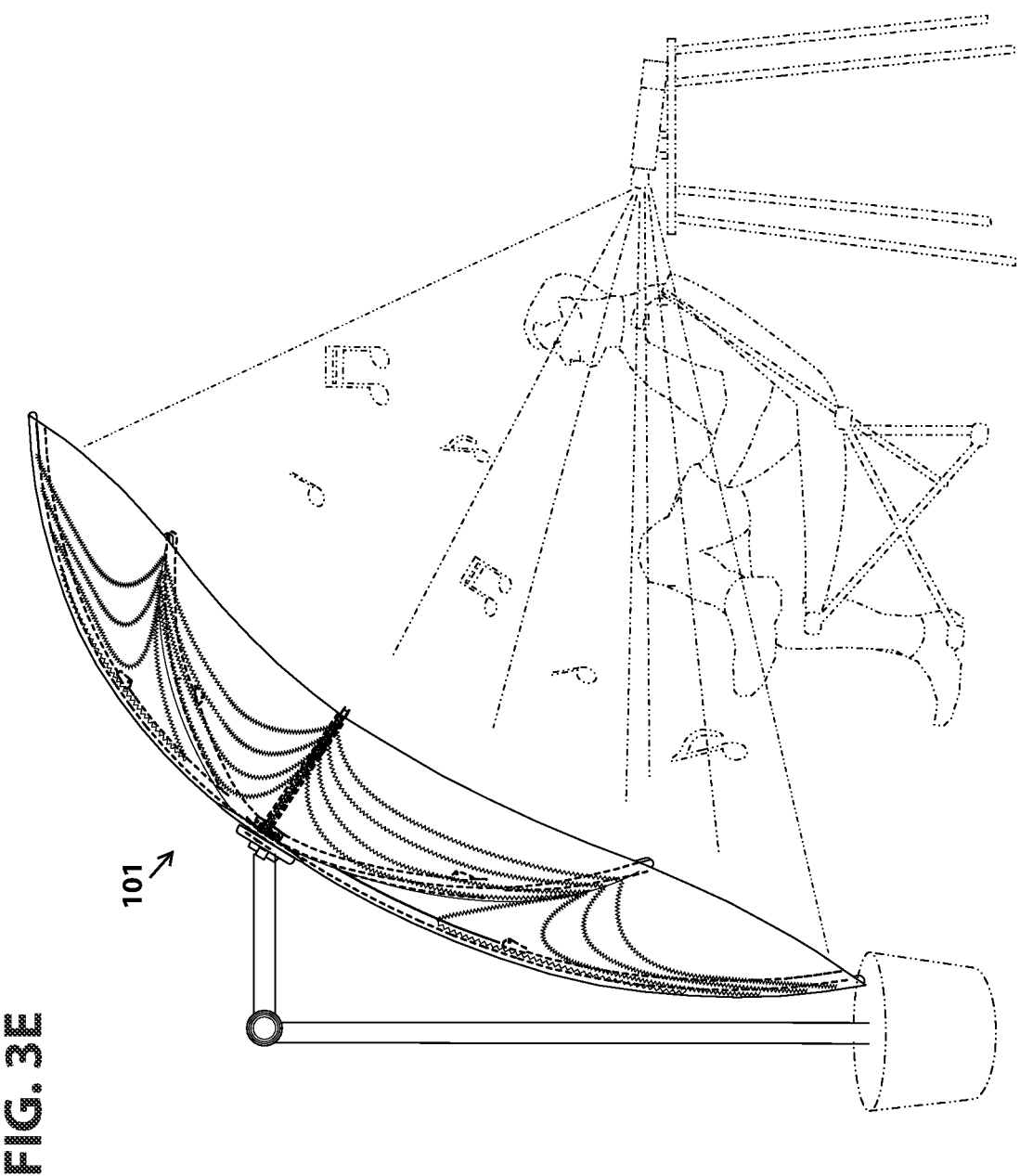
Figure 3F:
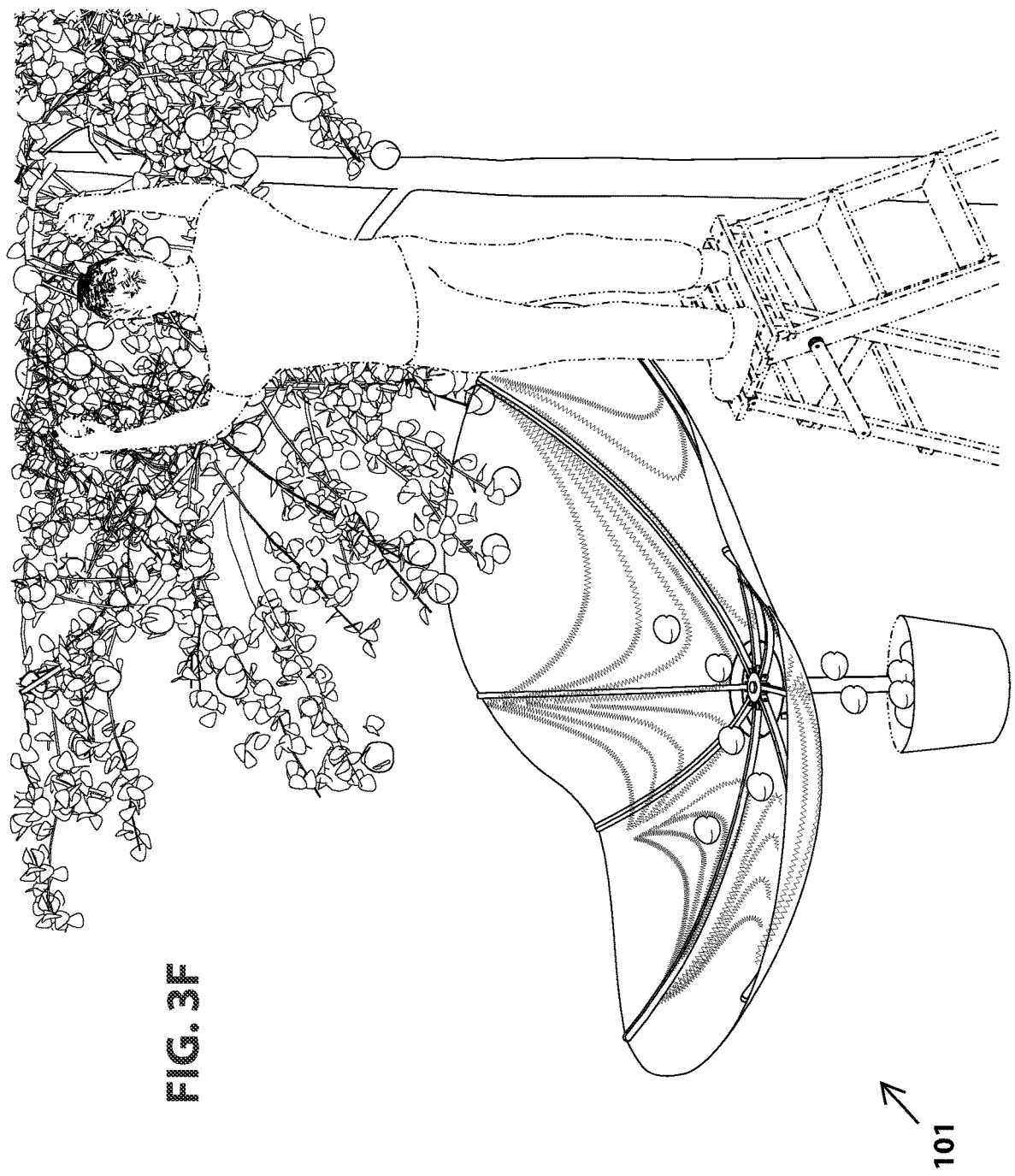
Figure 3G:
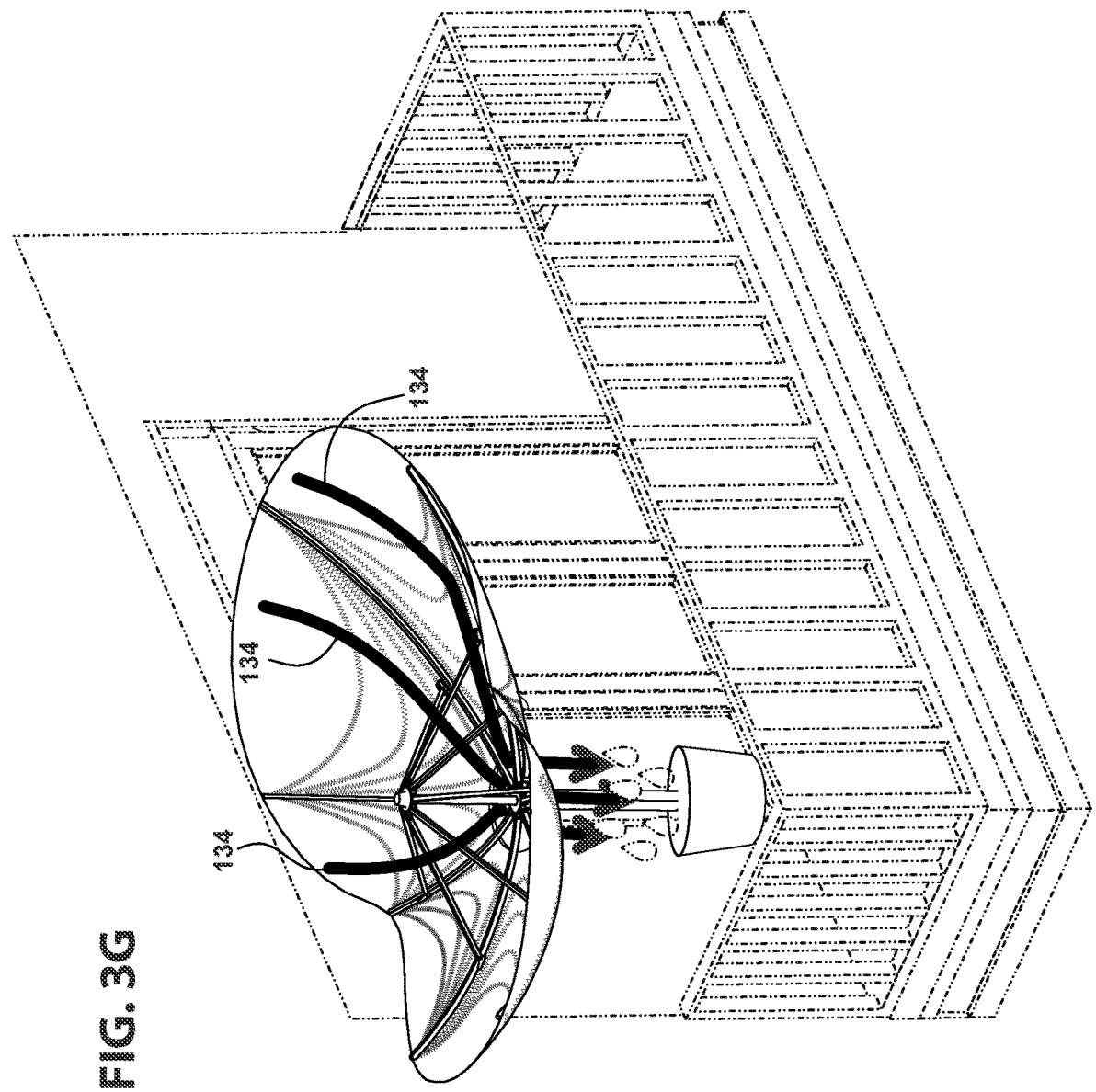
Figure 3H:
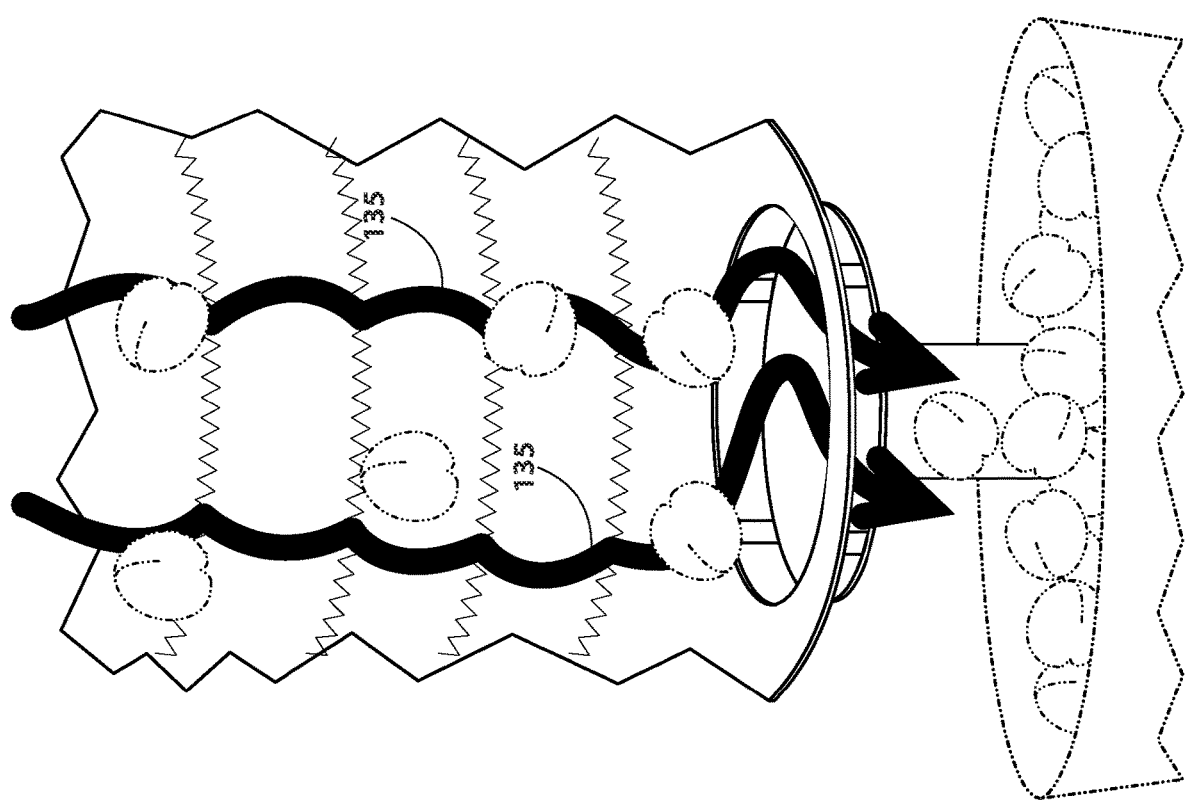
Figure 31:
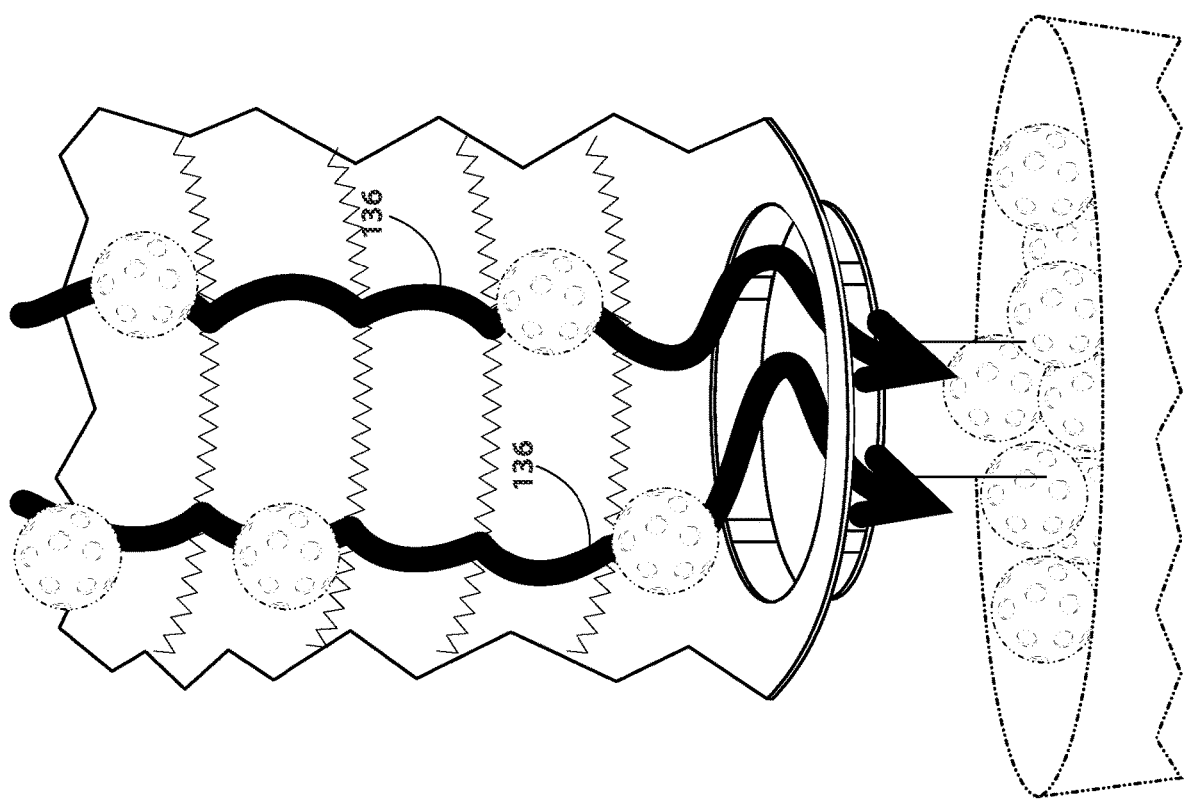
FIG. 29, FIG. 30, FIG. 31, and FIG. 32 illustrate perspective views depicting equivalent variations of the five-device-in-one water-collecting-and-decelerating fruit-and-nut-collecting-and-decelerating wind-diffusing-and-redirecting multi-function-transversable-ridge-and-seam multi-function-twist-locking-base carapace.
Figure 3J:
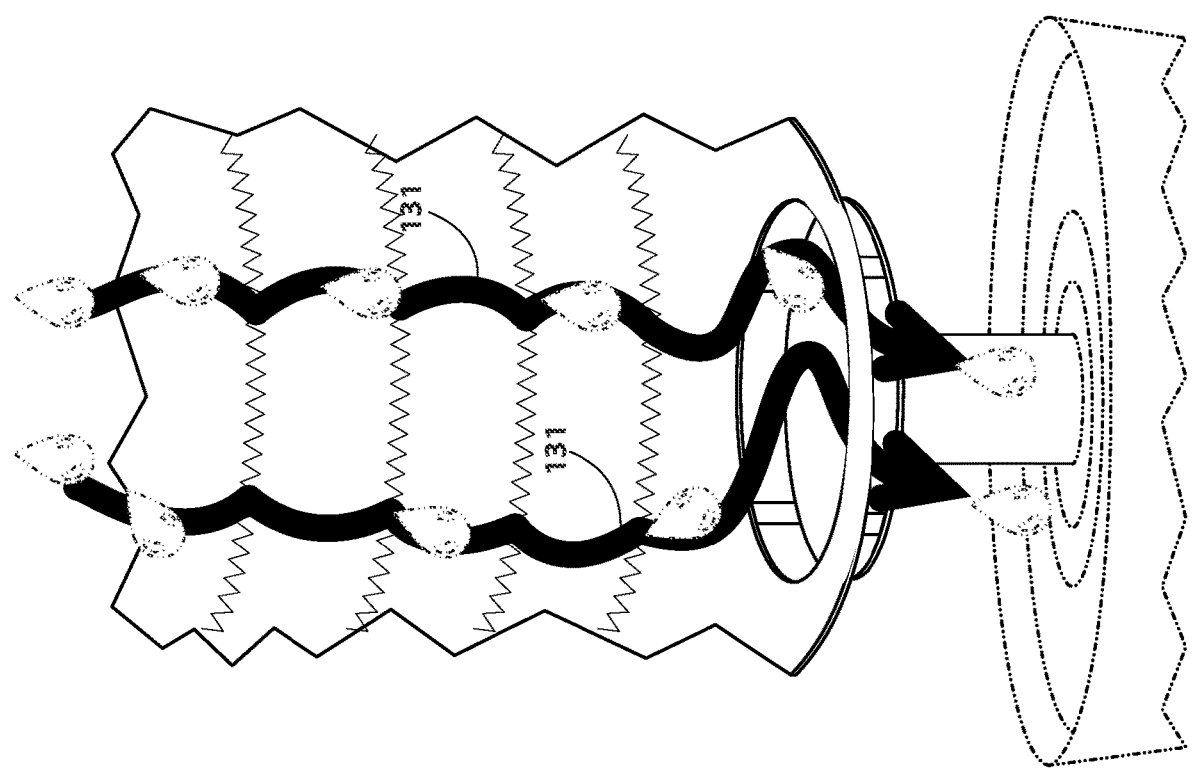
Figure 3K:
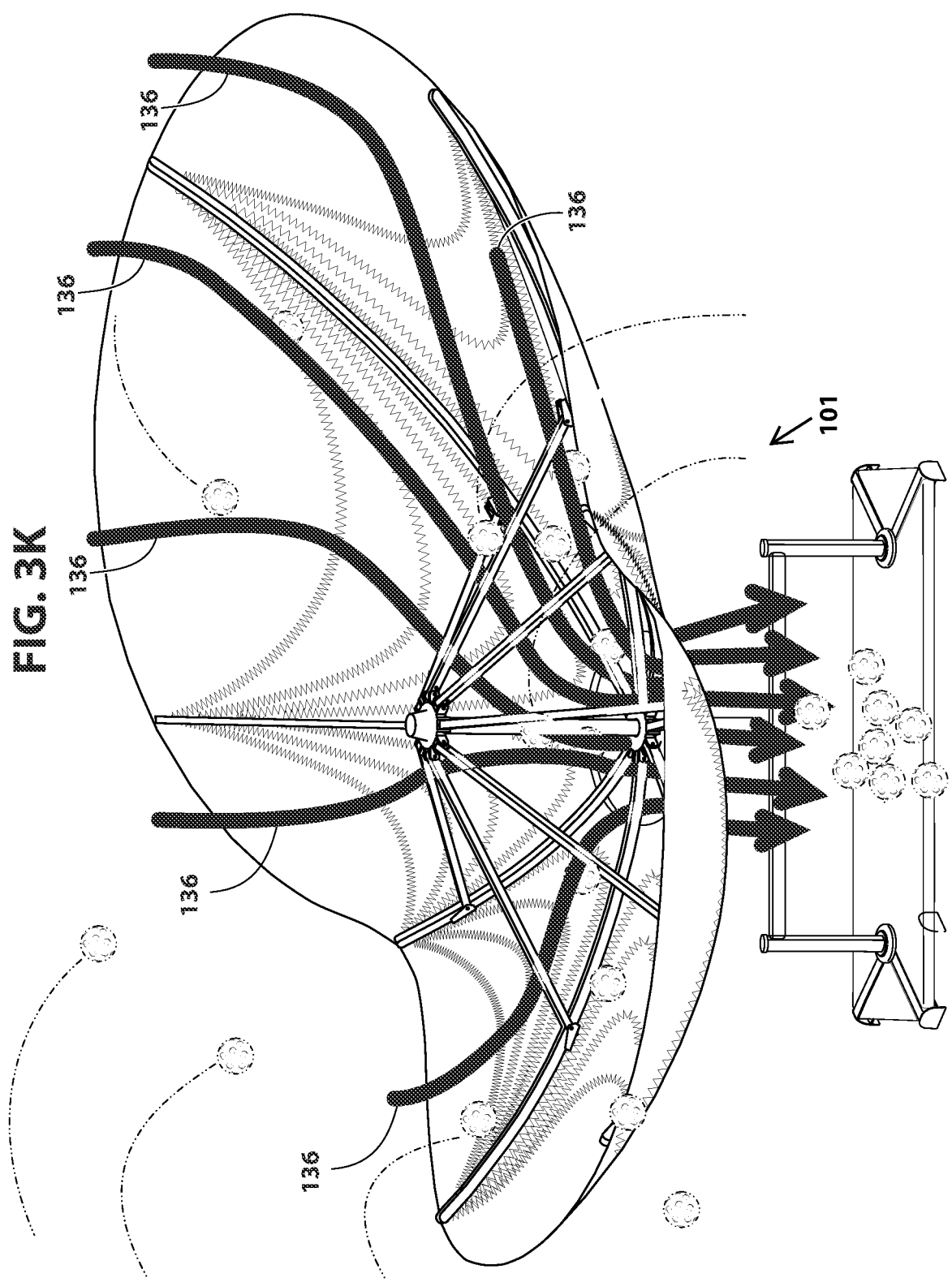
Figure 3L:
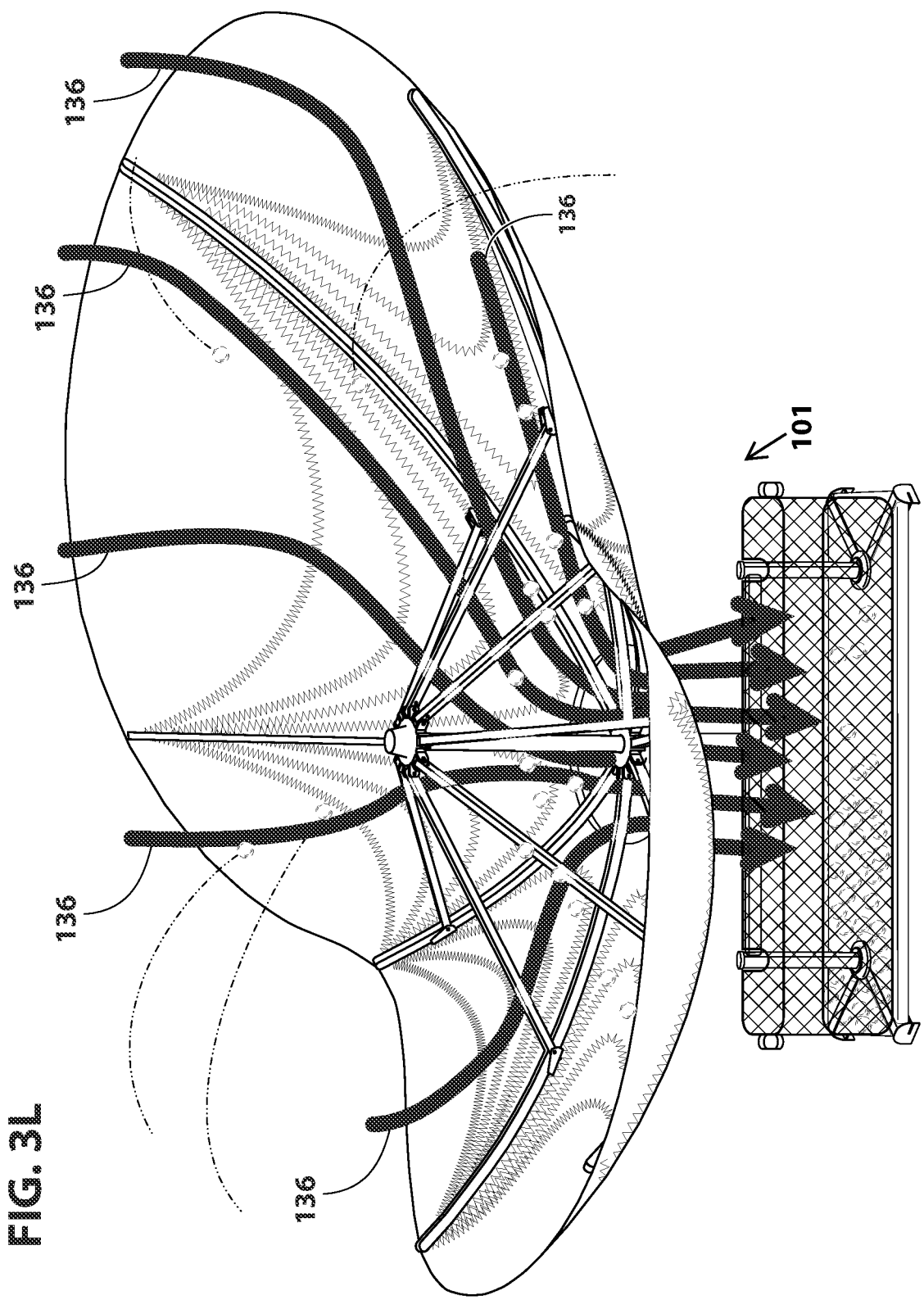
Figure 4A:
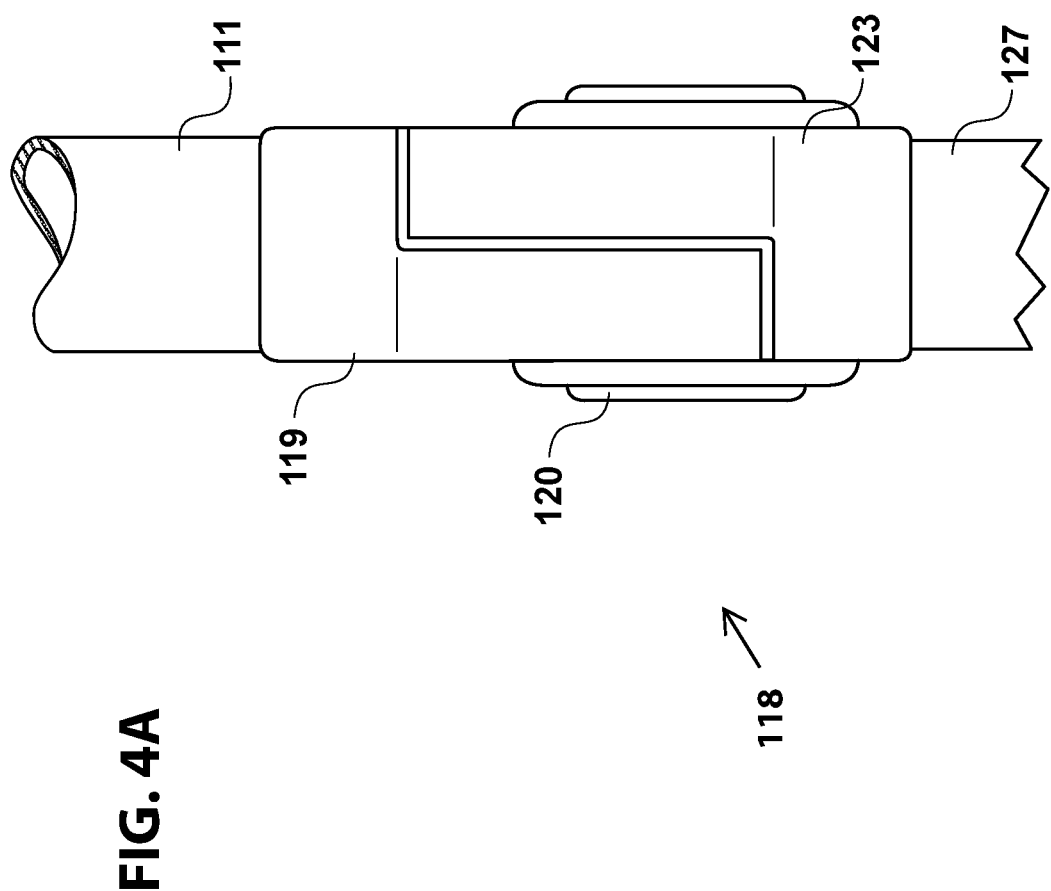
Figure 4B:
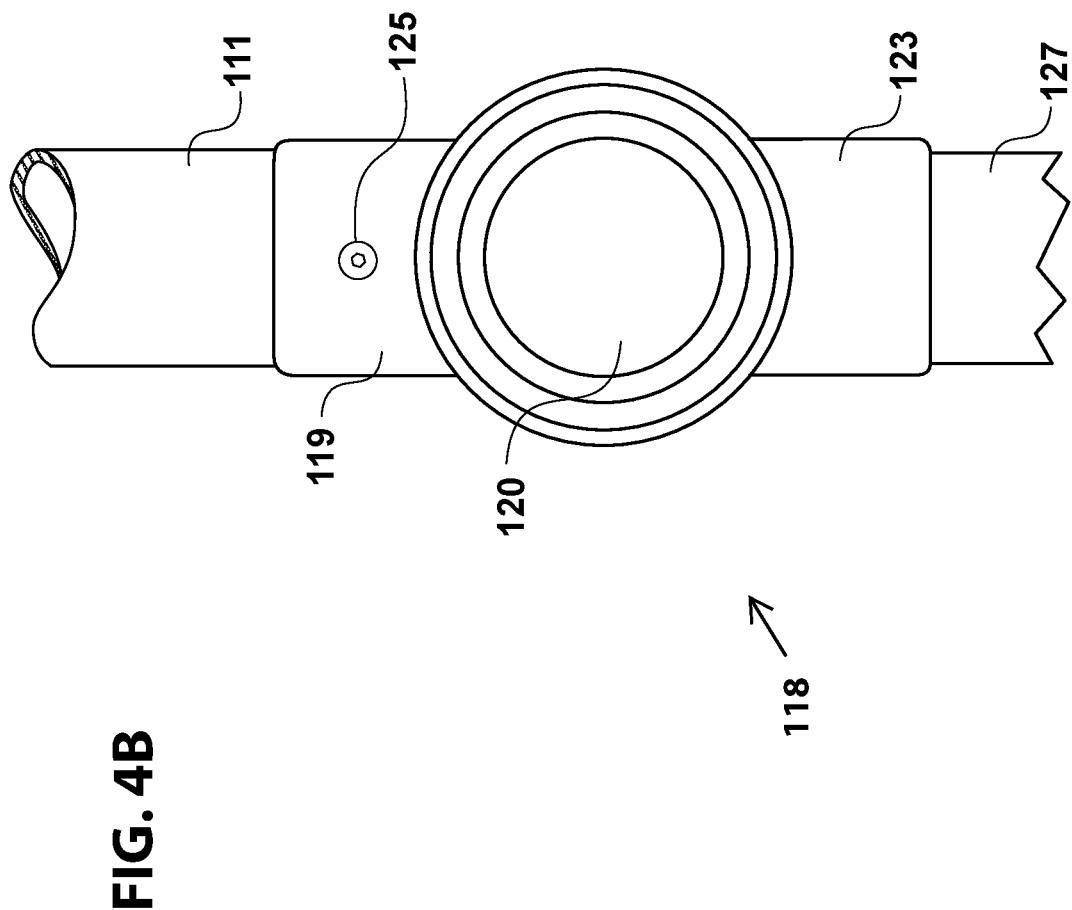
Figure 4C:
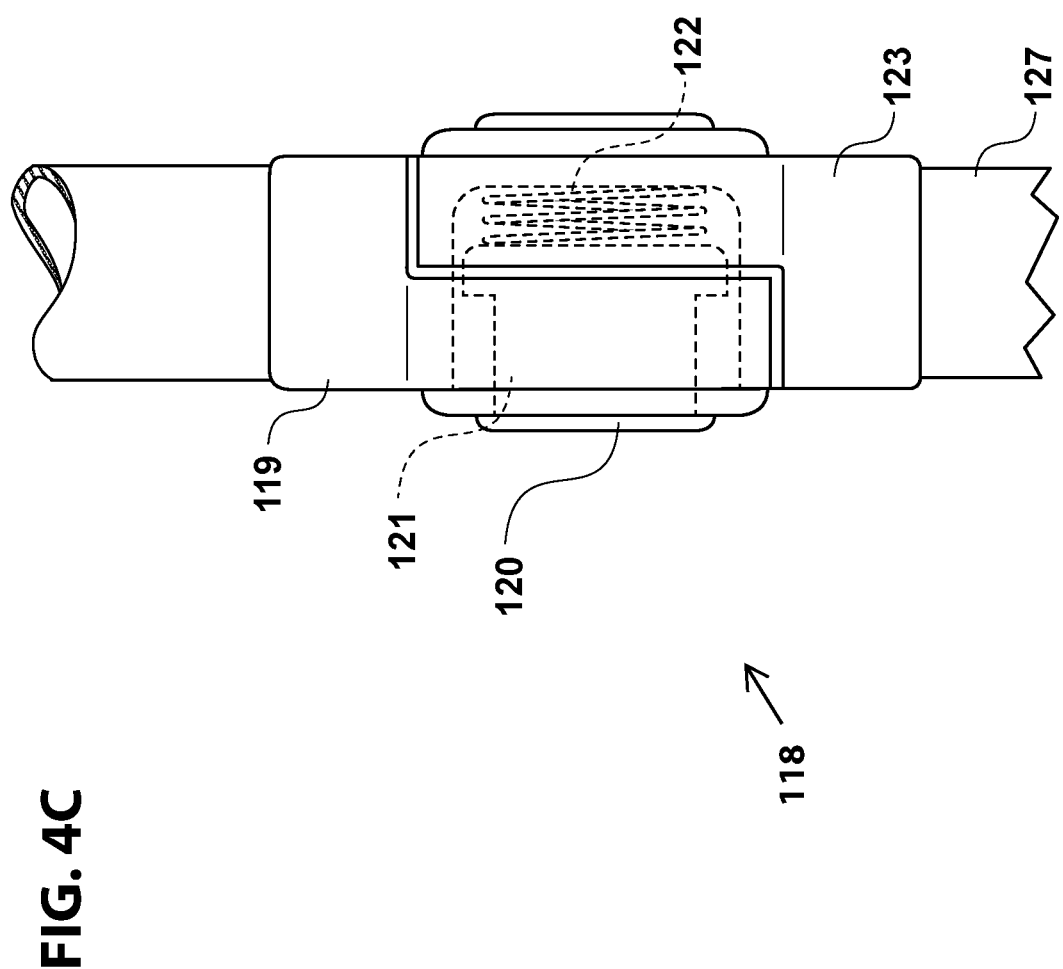
Figure 4D:
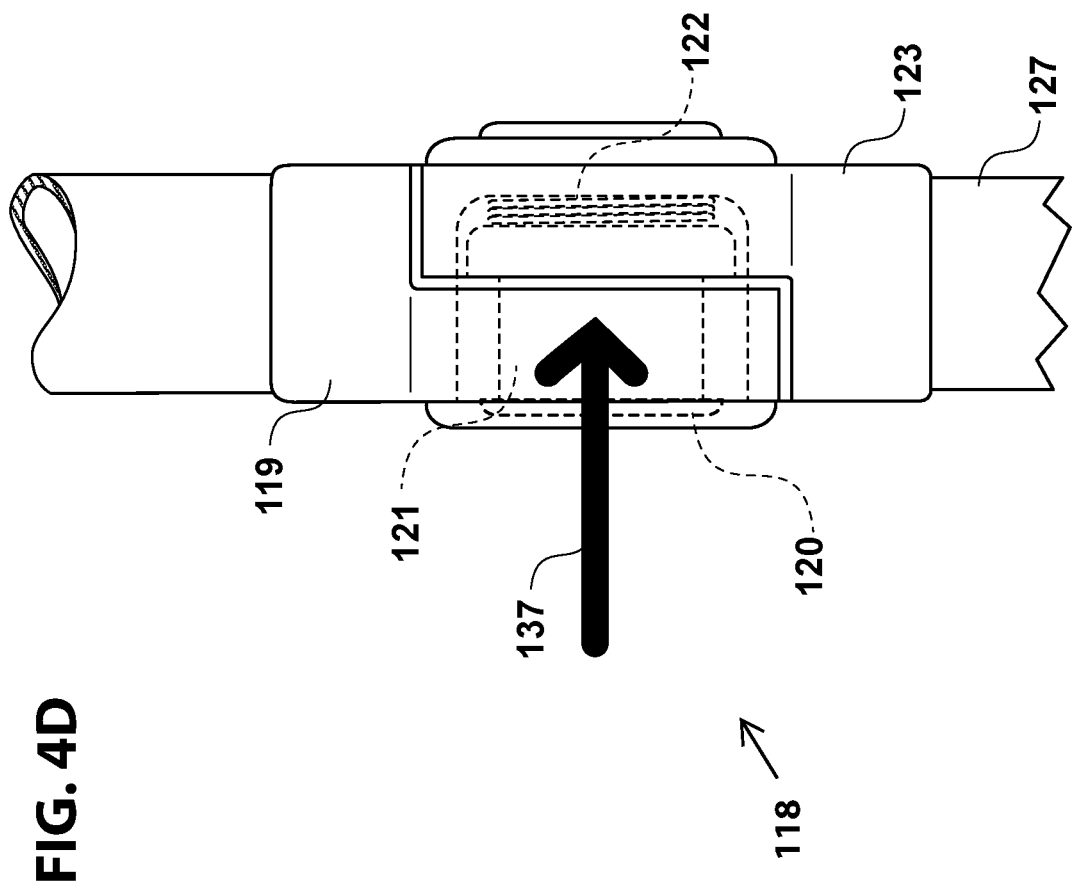
Figure 4E:
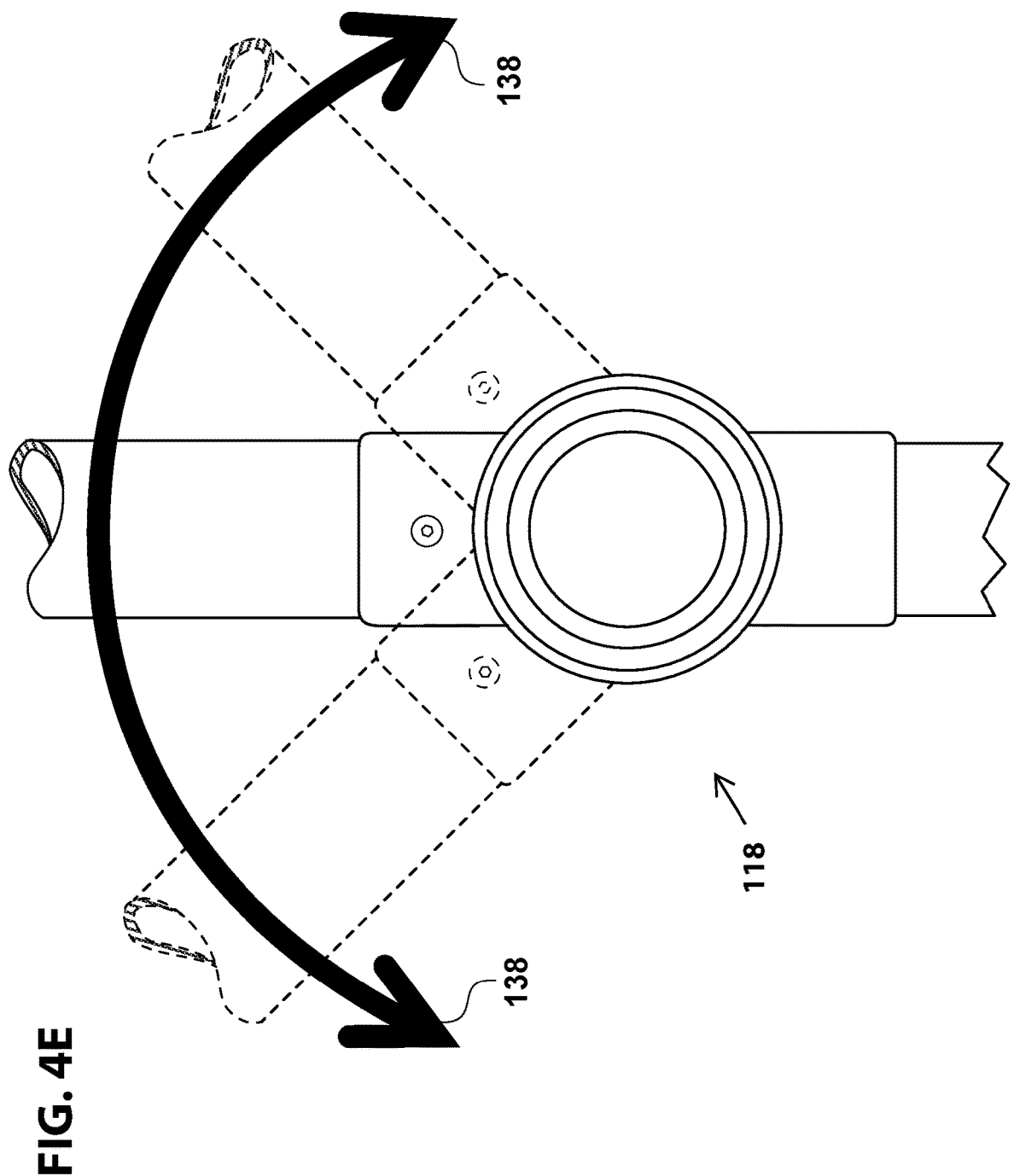
Figure 4G:
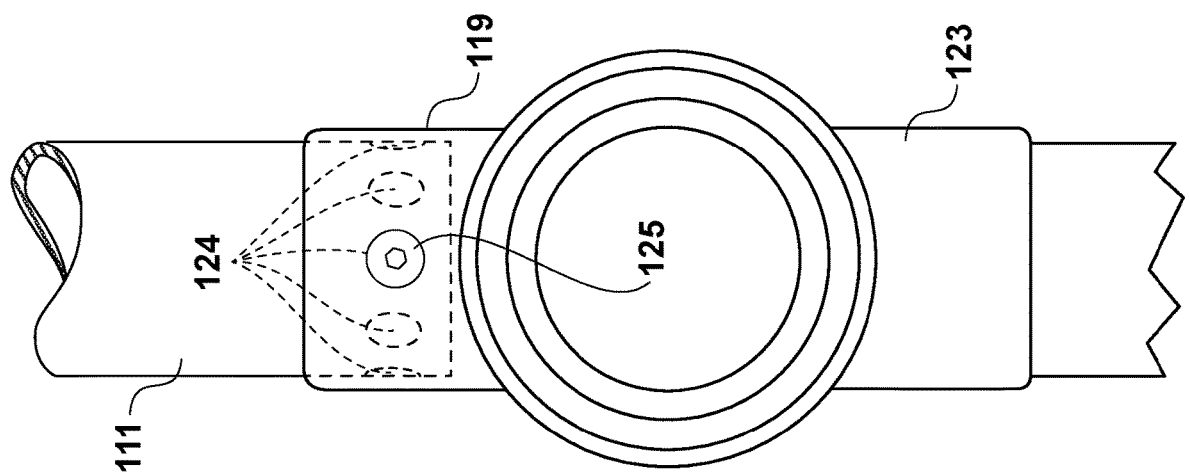
Figure 4I:
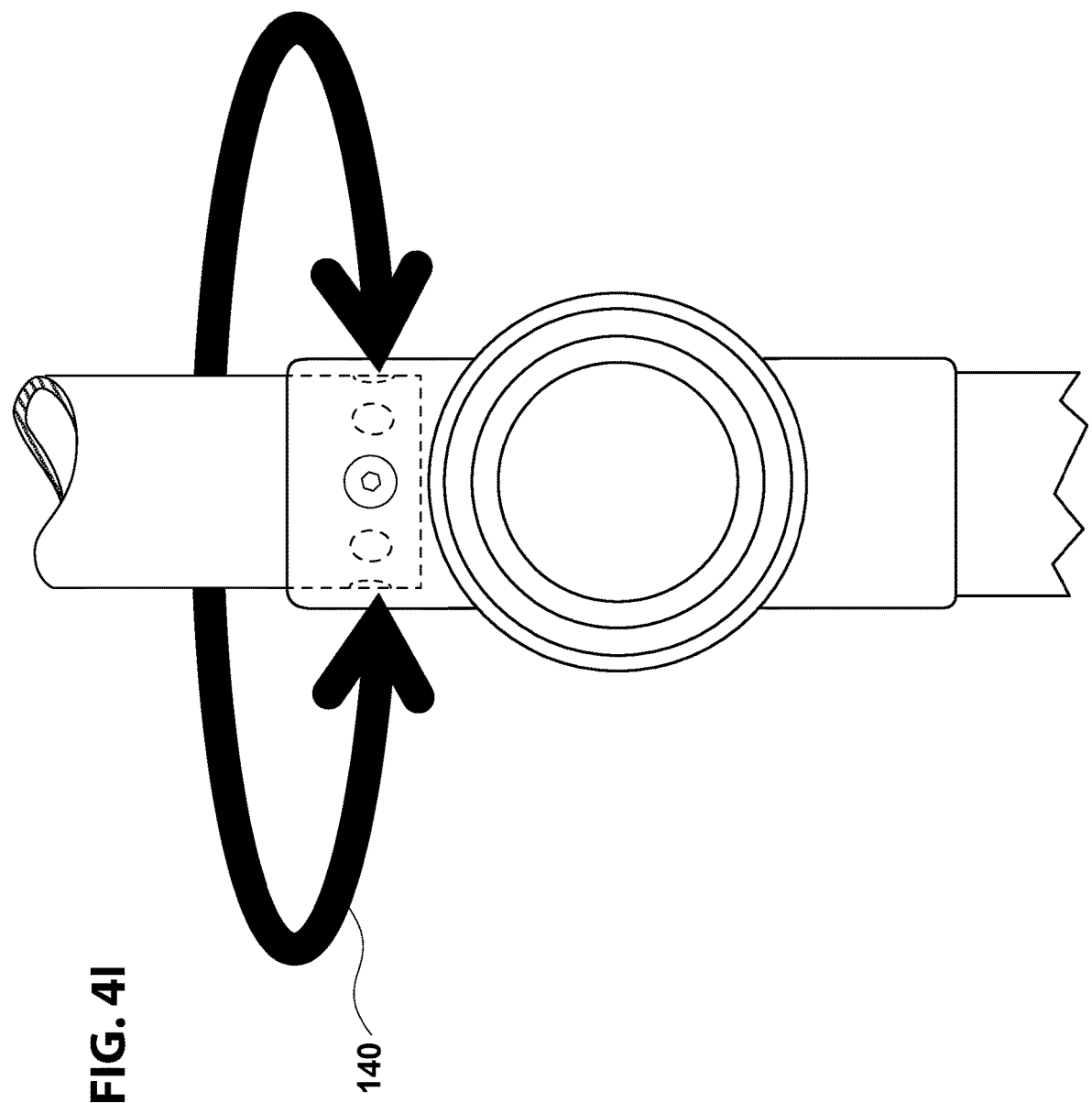
Figure 5A:
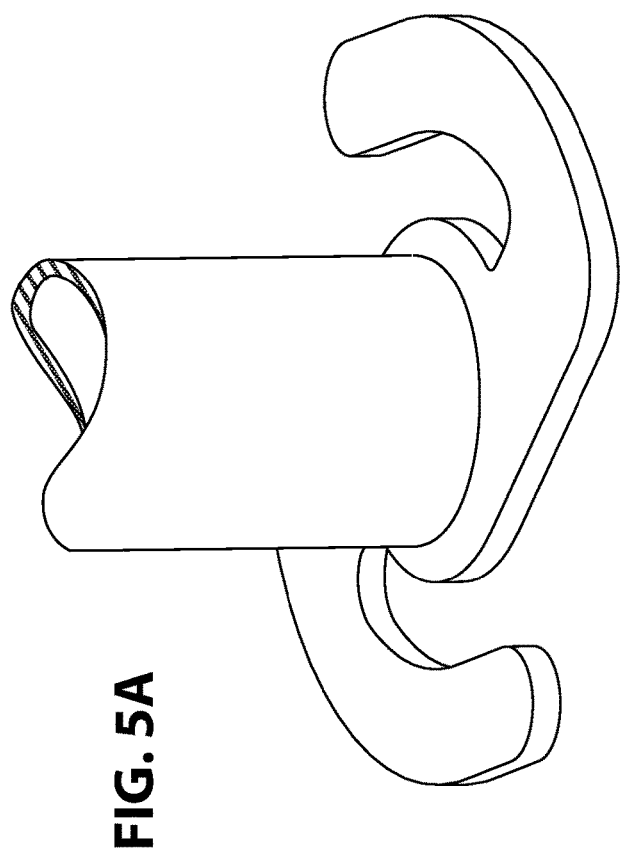
Figure 5B:
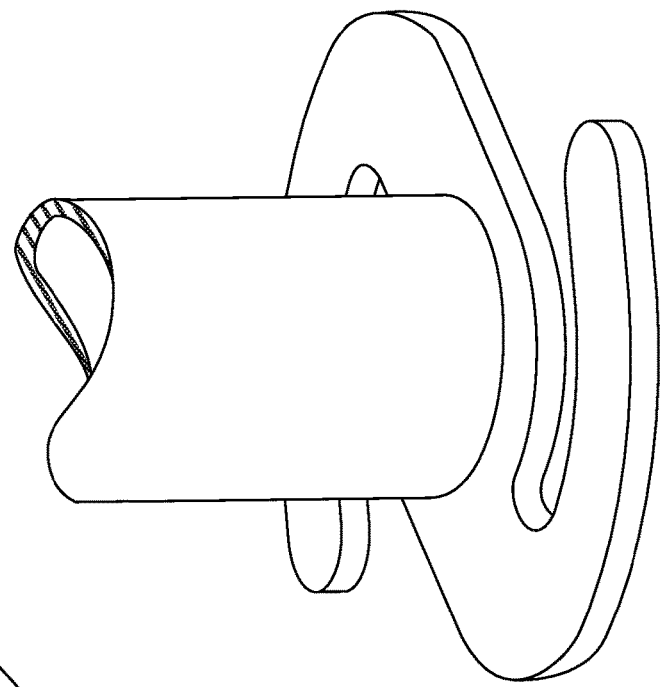
Figure 5D:
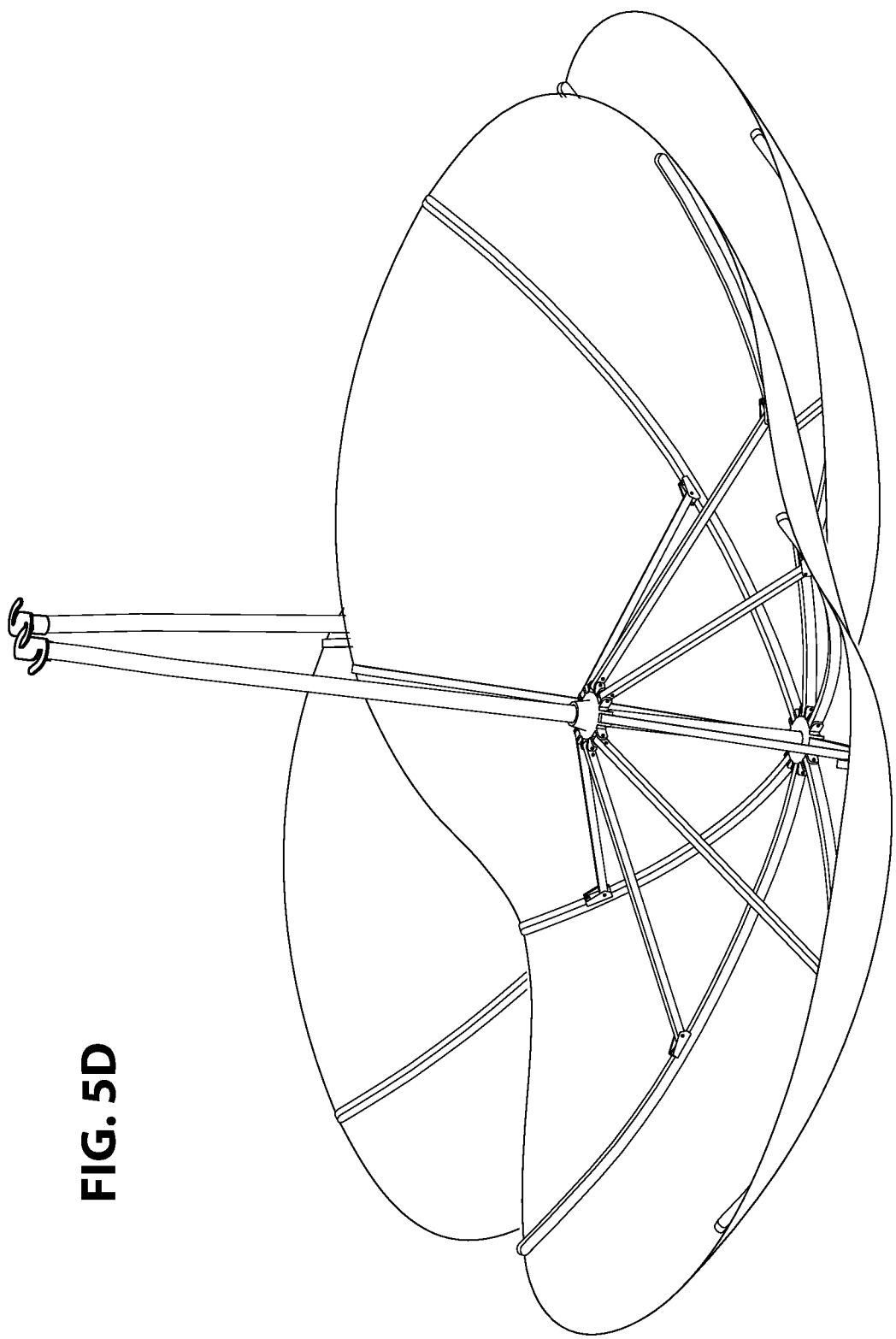
Figure 6A:
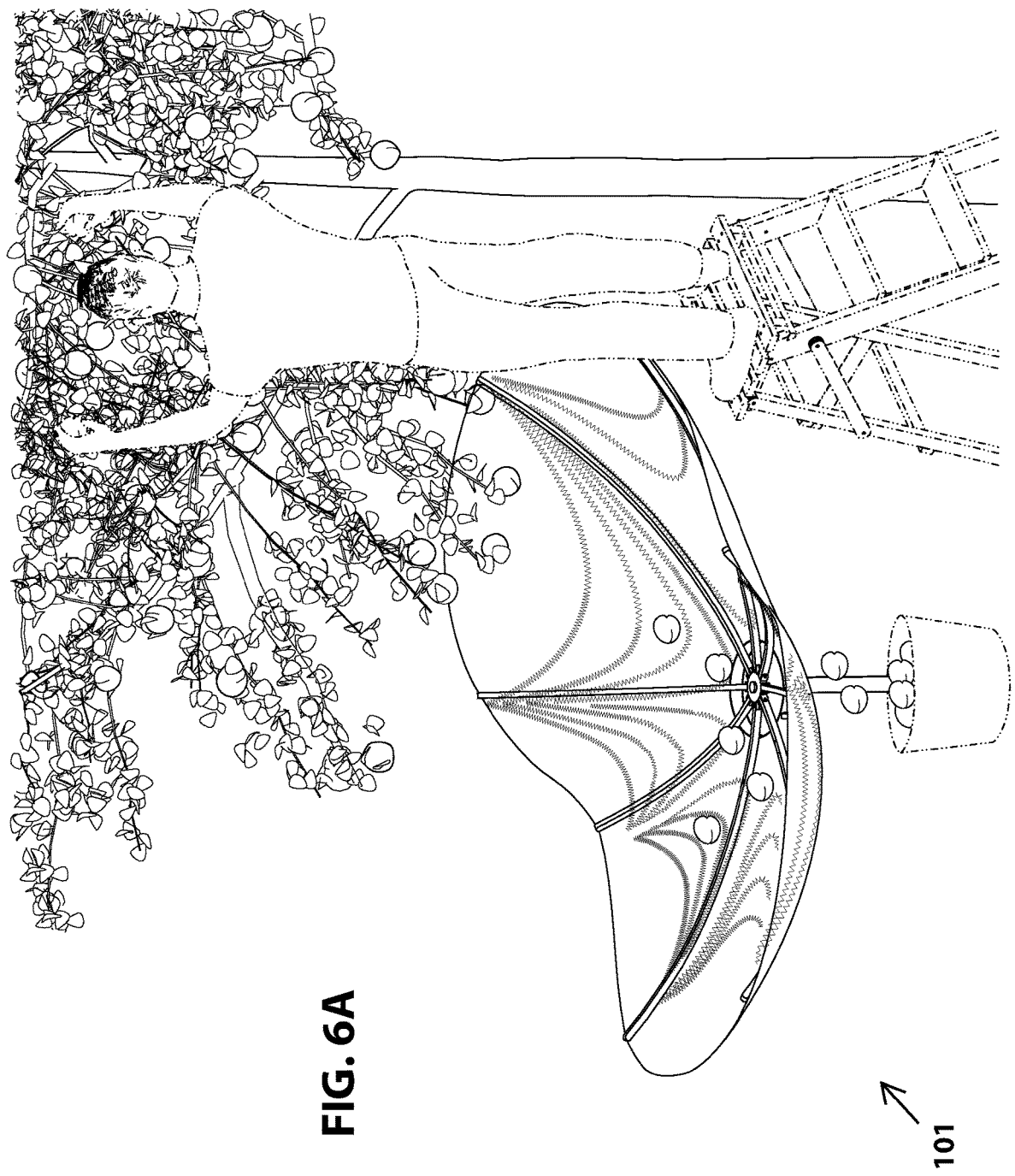
FIG. 6A and FIG. 6B illustrate perspective views depicting three-hundred-and-sixty-degree-orientational water-collecting-and-decelerating fruit-nut-harvesting-and-decelerating wind-diffusing-and-redirecting discharging-nozzle carapace system 101 and three-hundred-and-sixty-degree-orientational carapace-supporting-and-securing system 106 harvesting fruit.
Figure 6B:
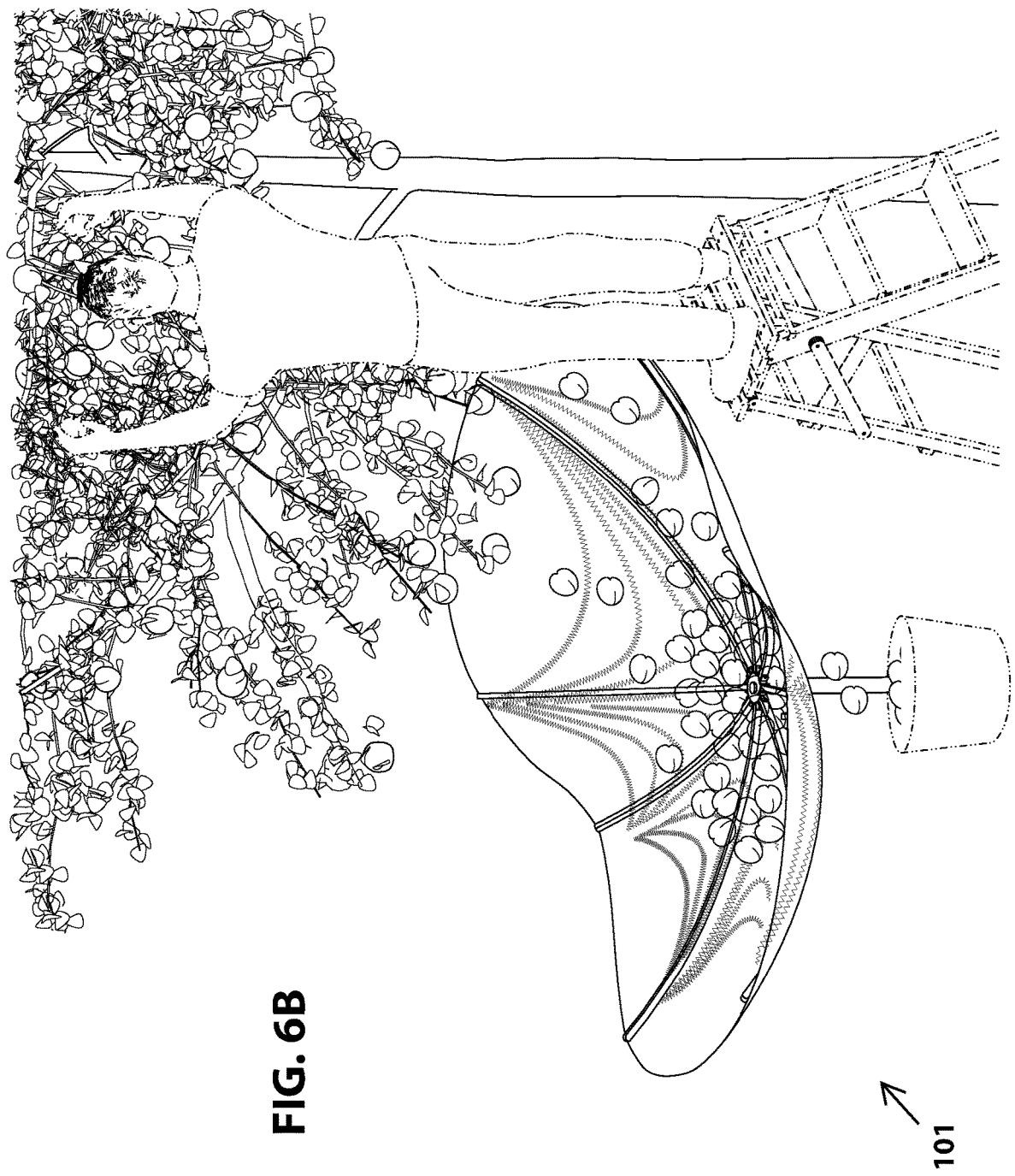
Figure 9:
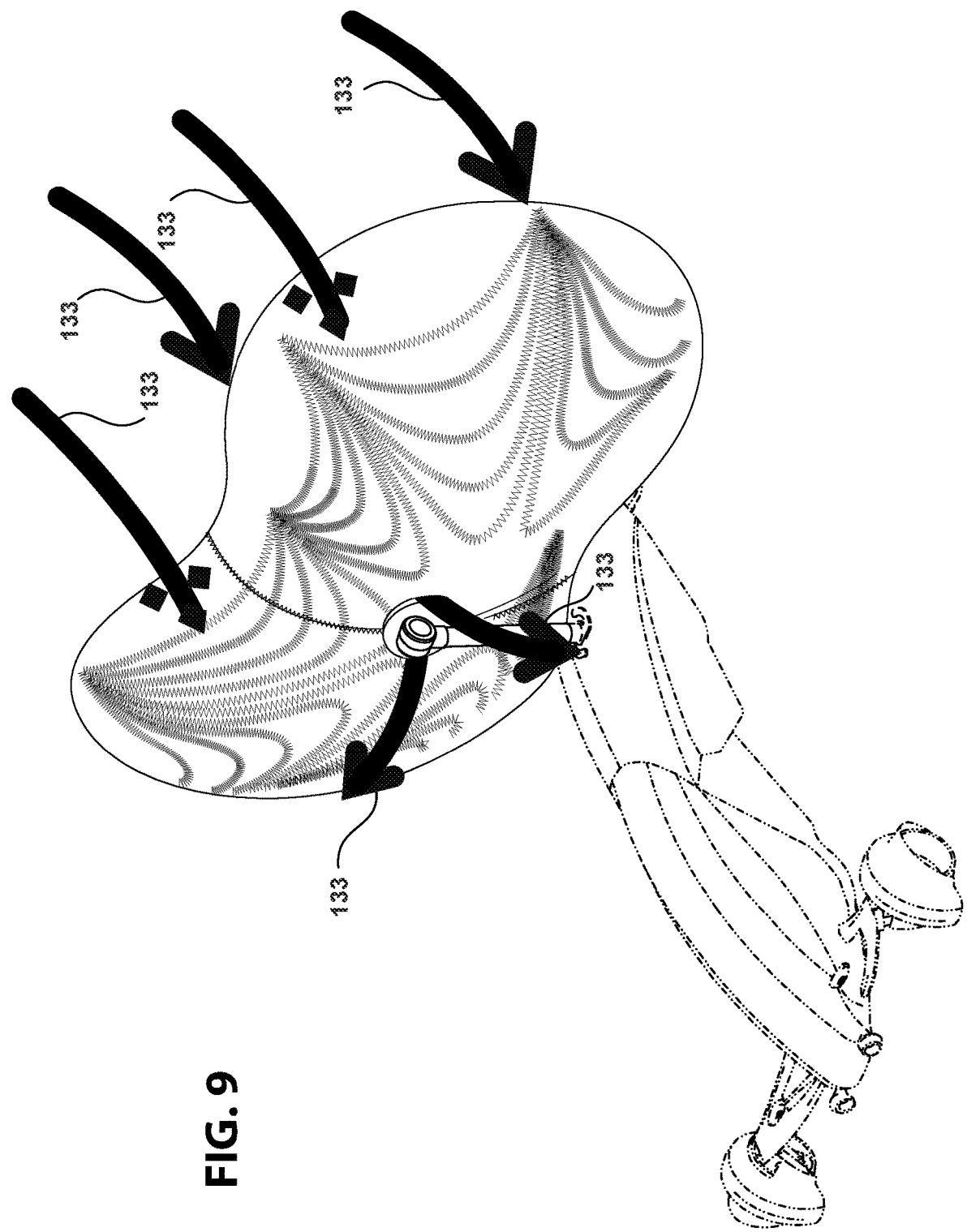
Figure 10:
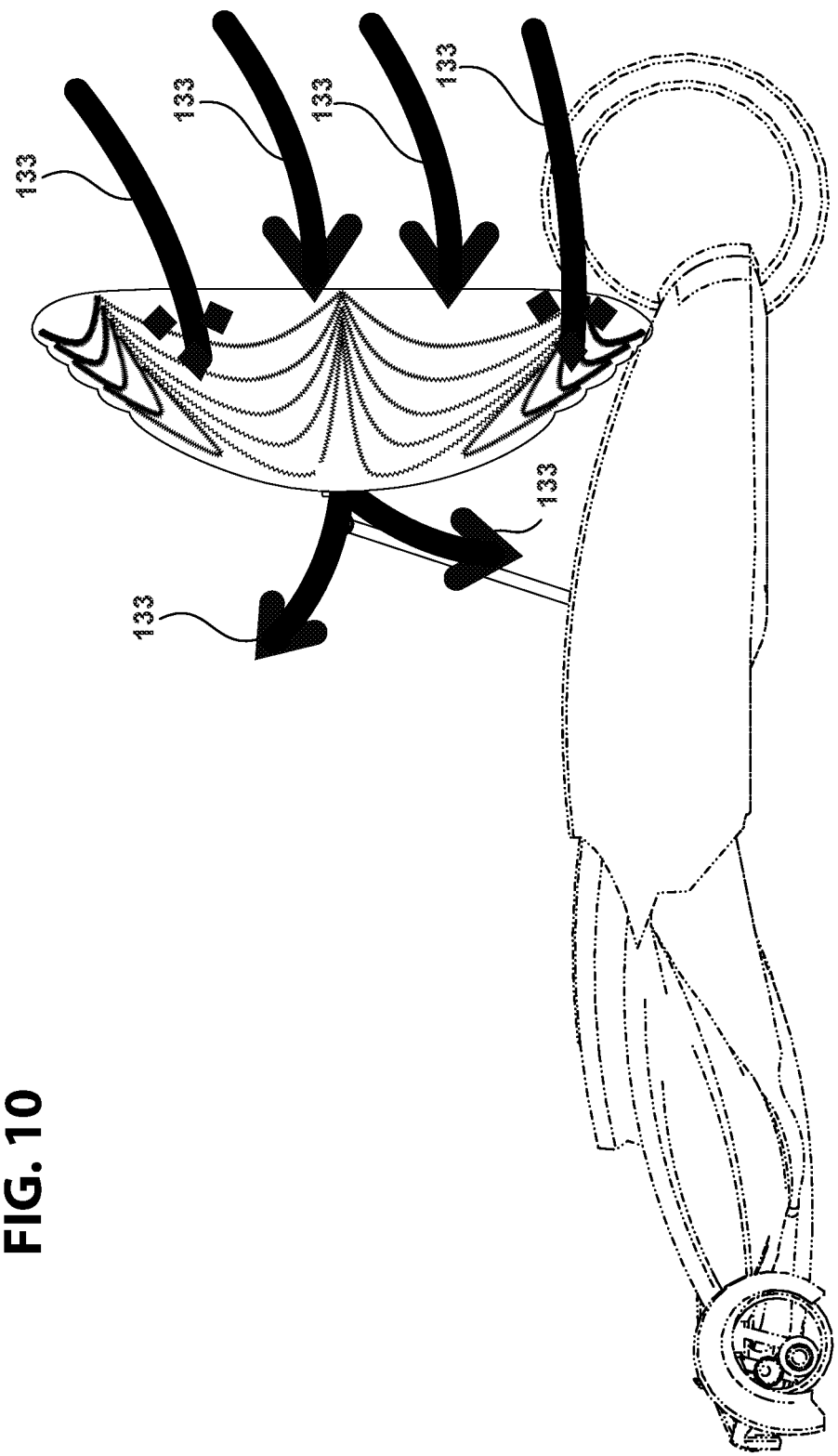
Figure 11:
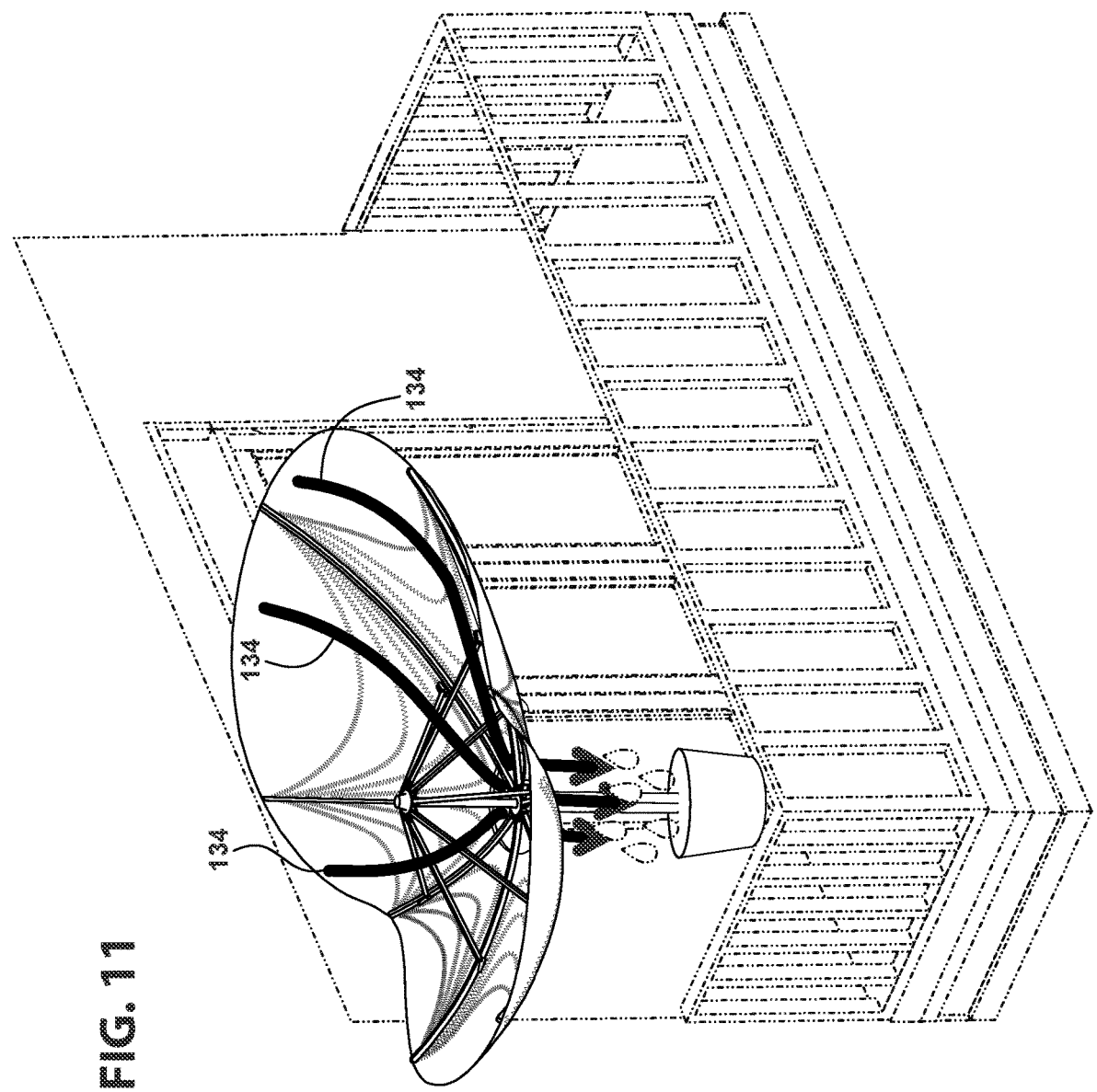
Figure 12:
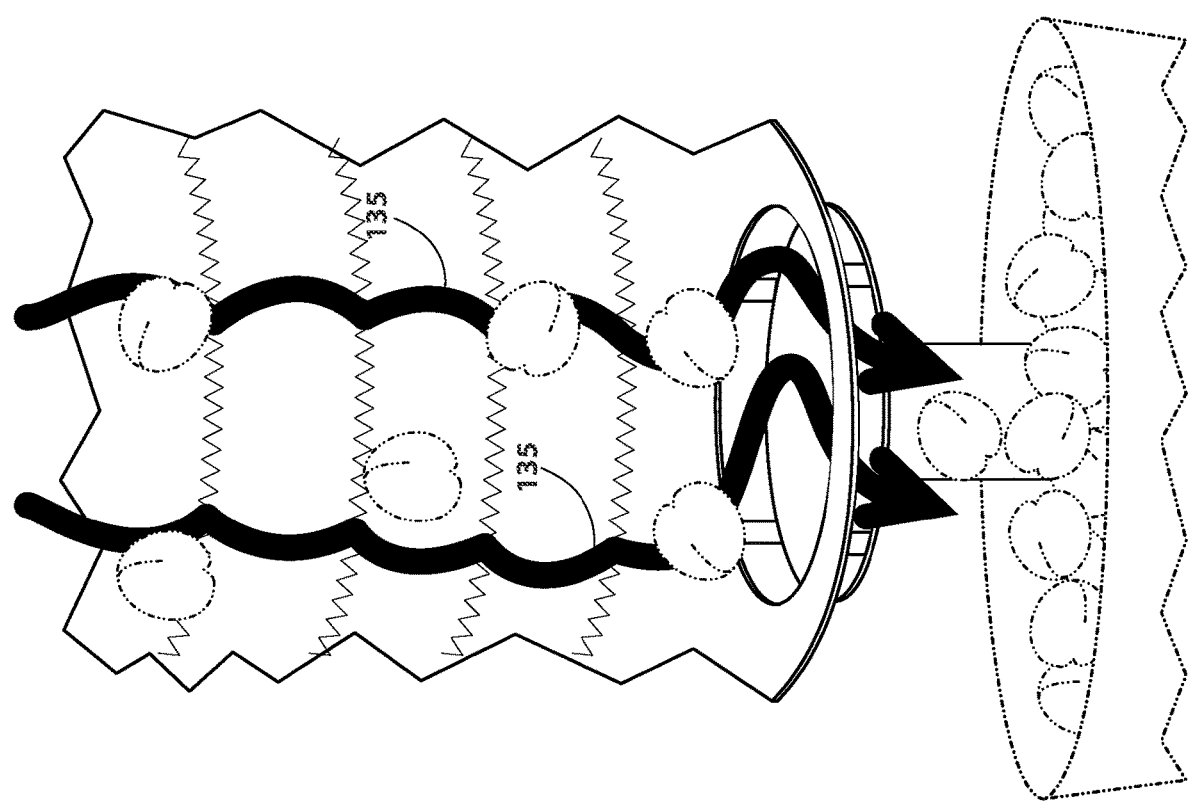
Figure 13:
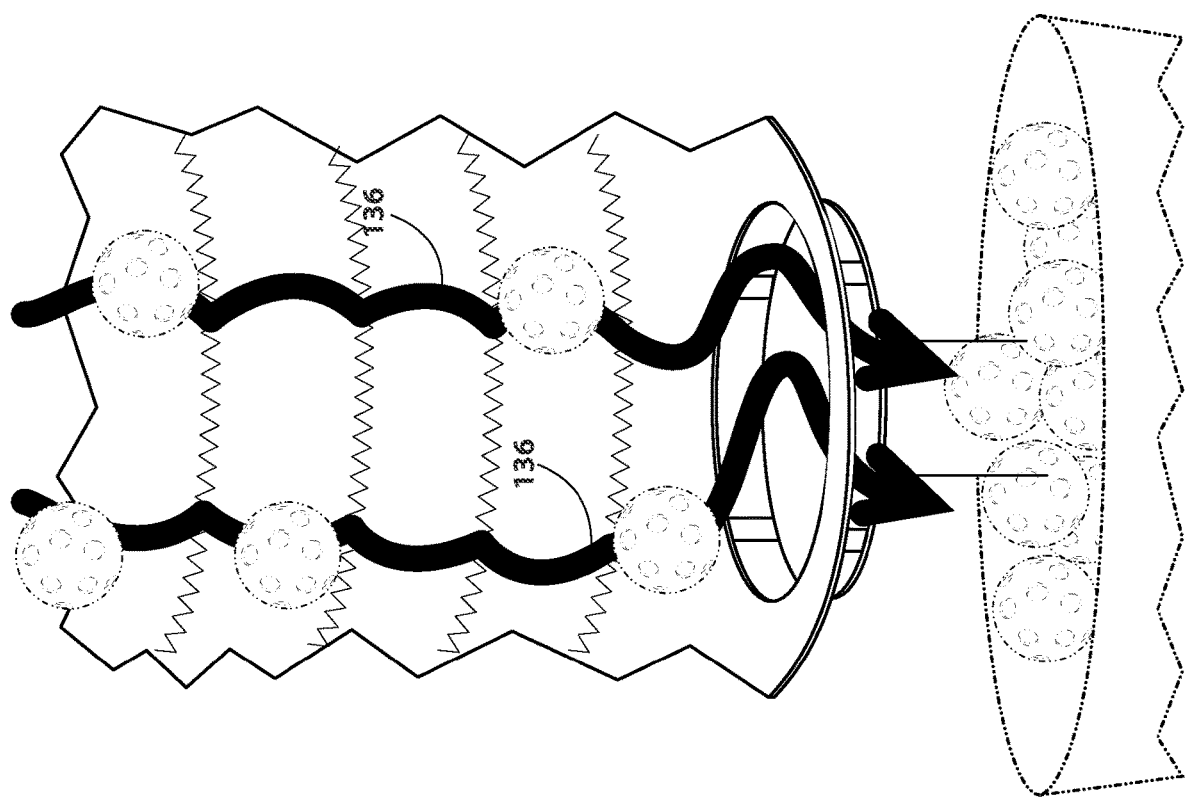
Figure 14:
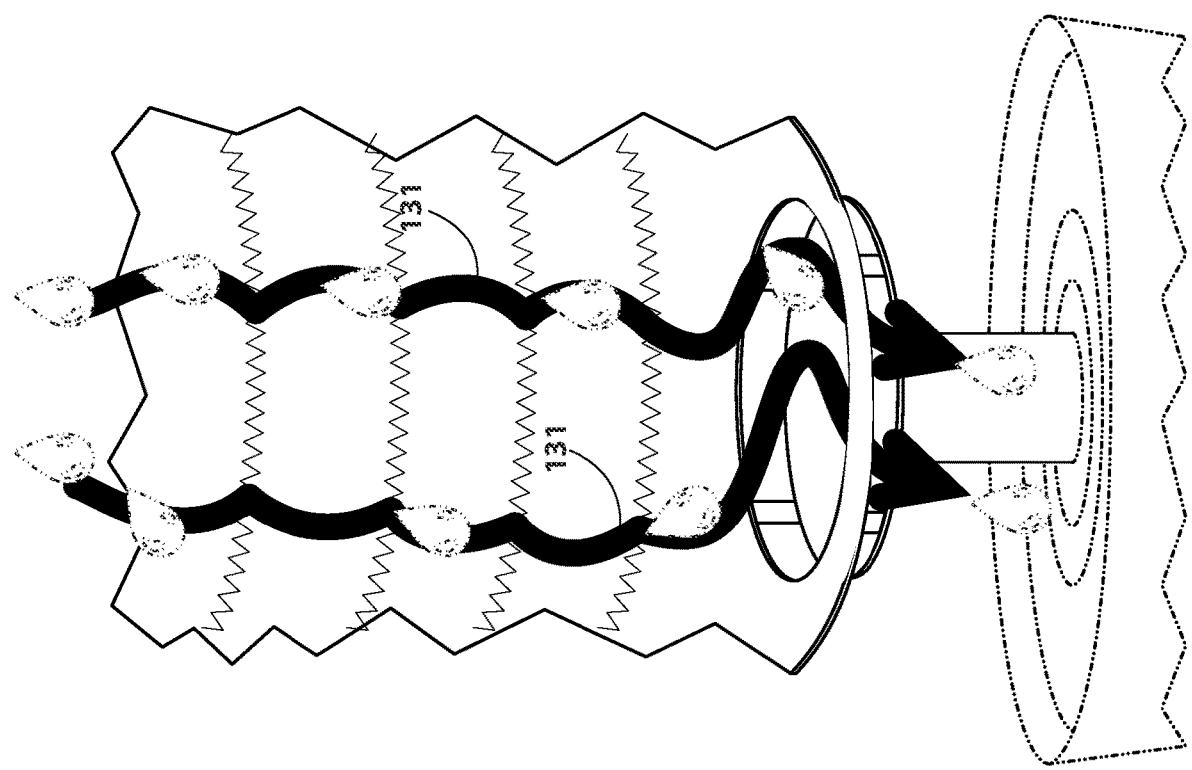
Figure 15:
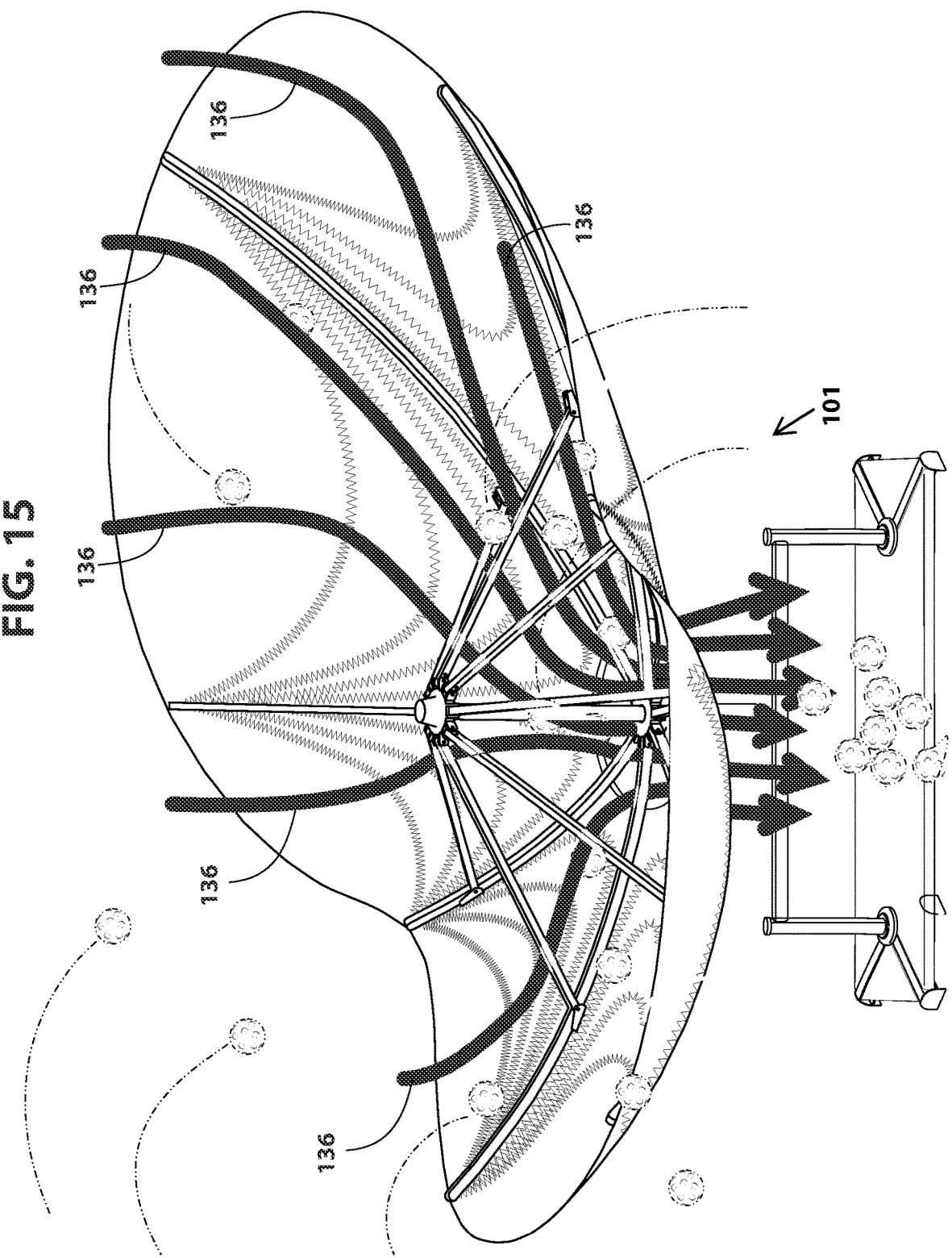
Figure 16:
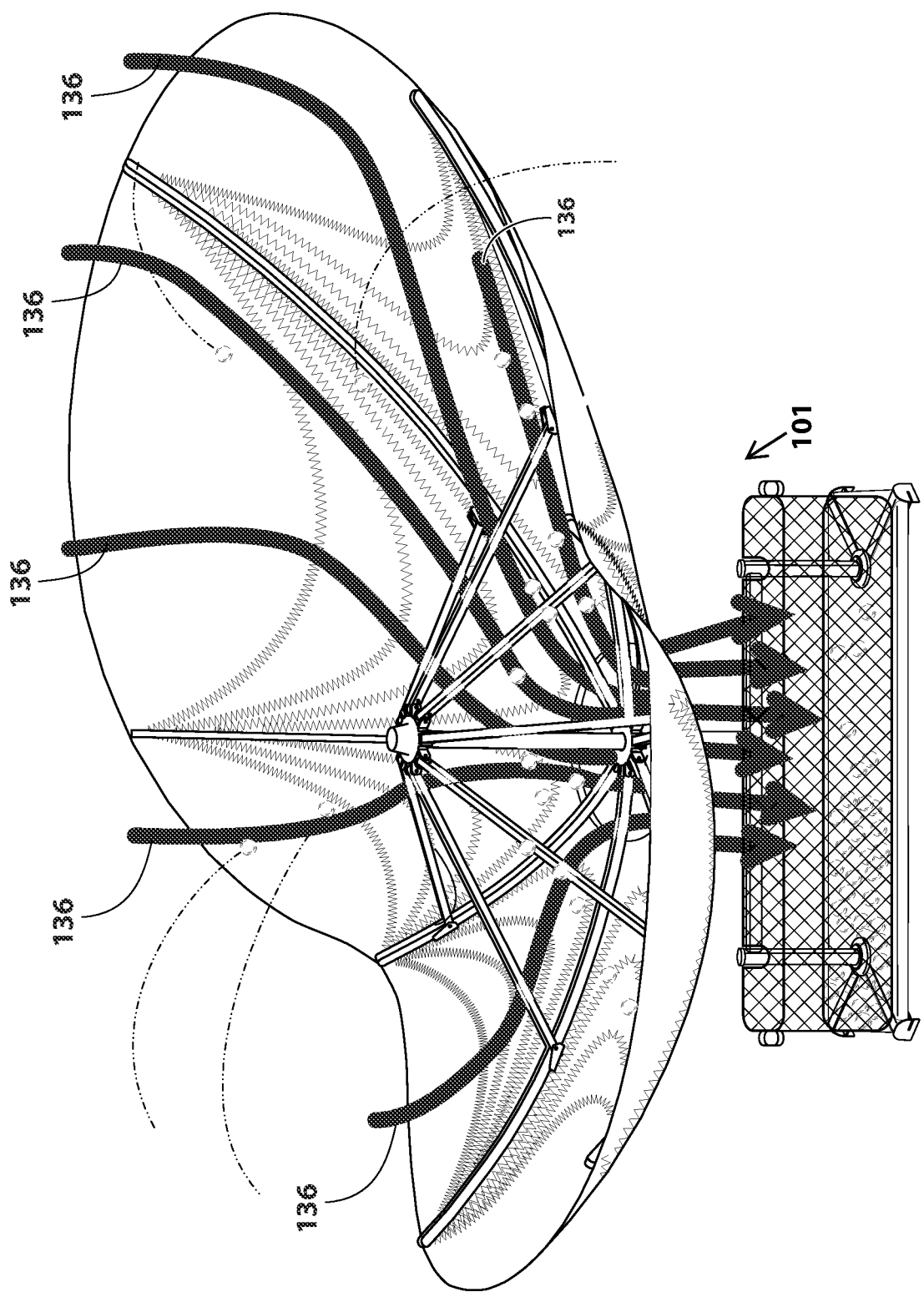
Figure 17:
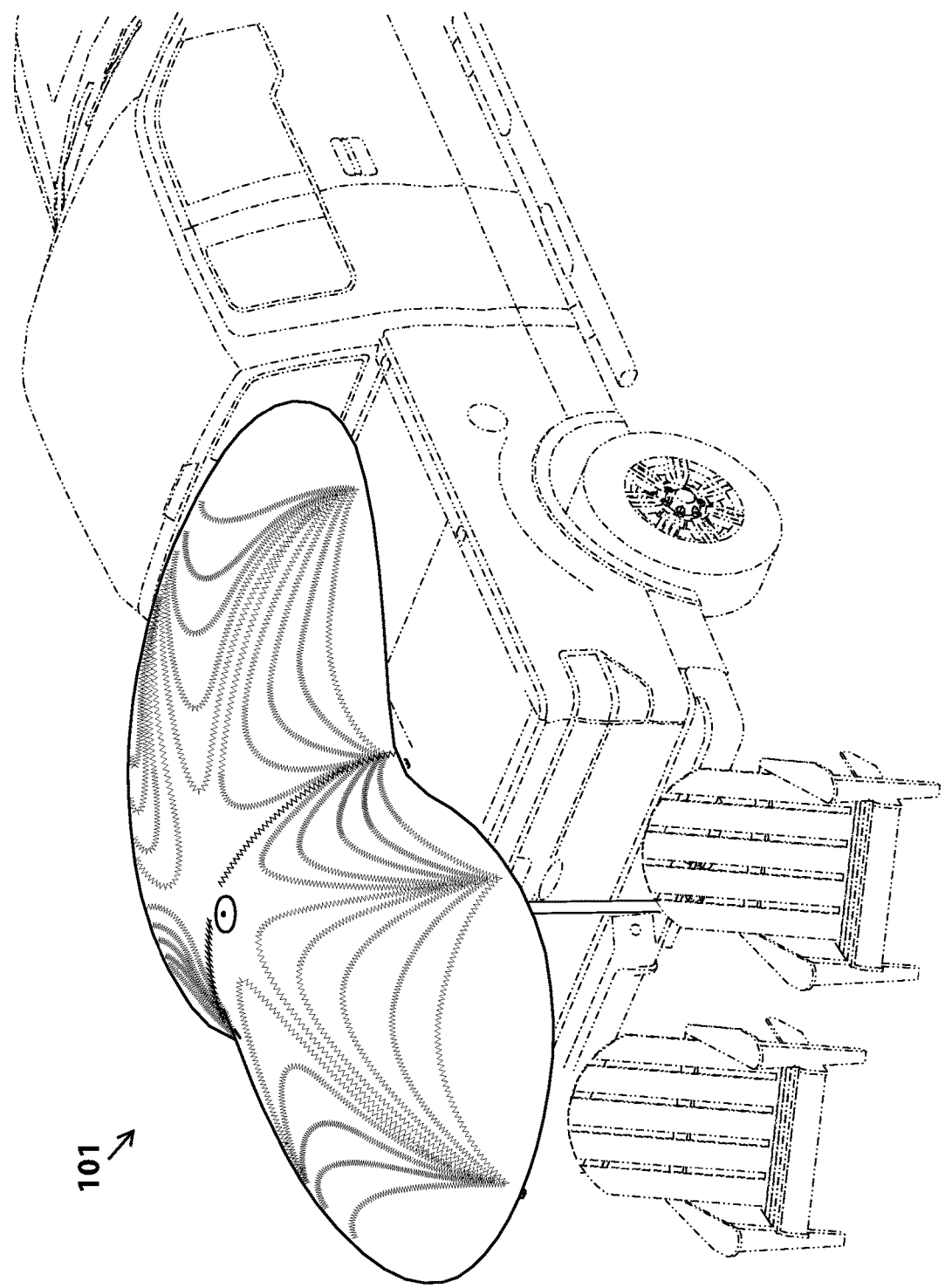
Figure 18:
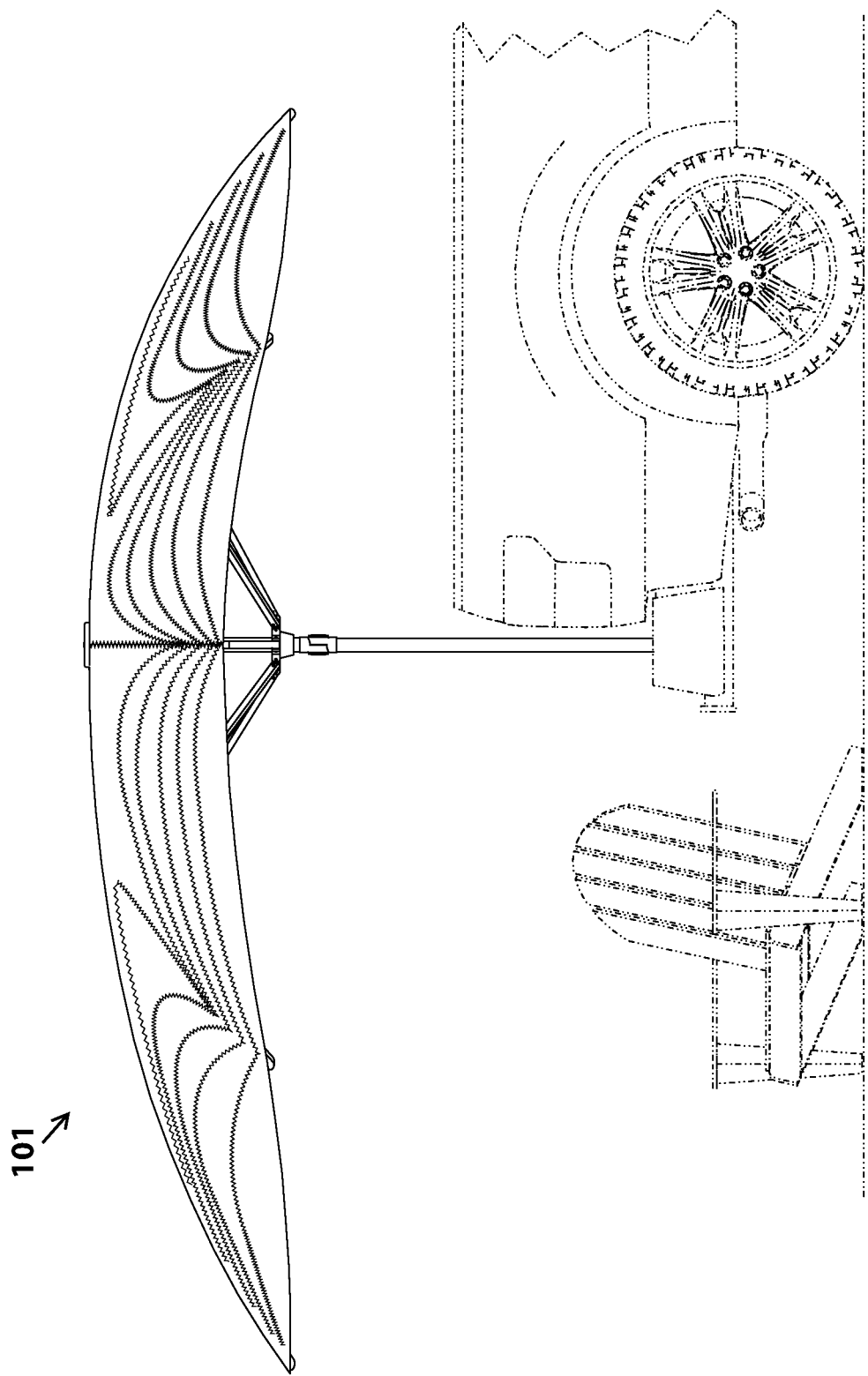
Figure 19:
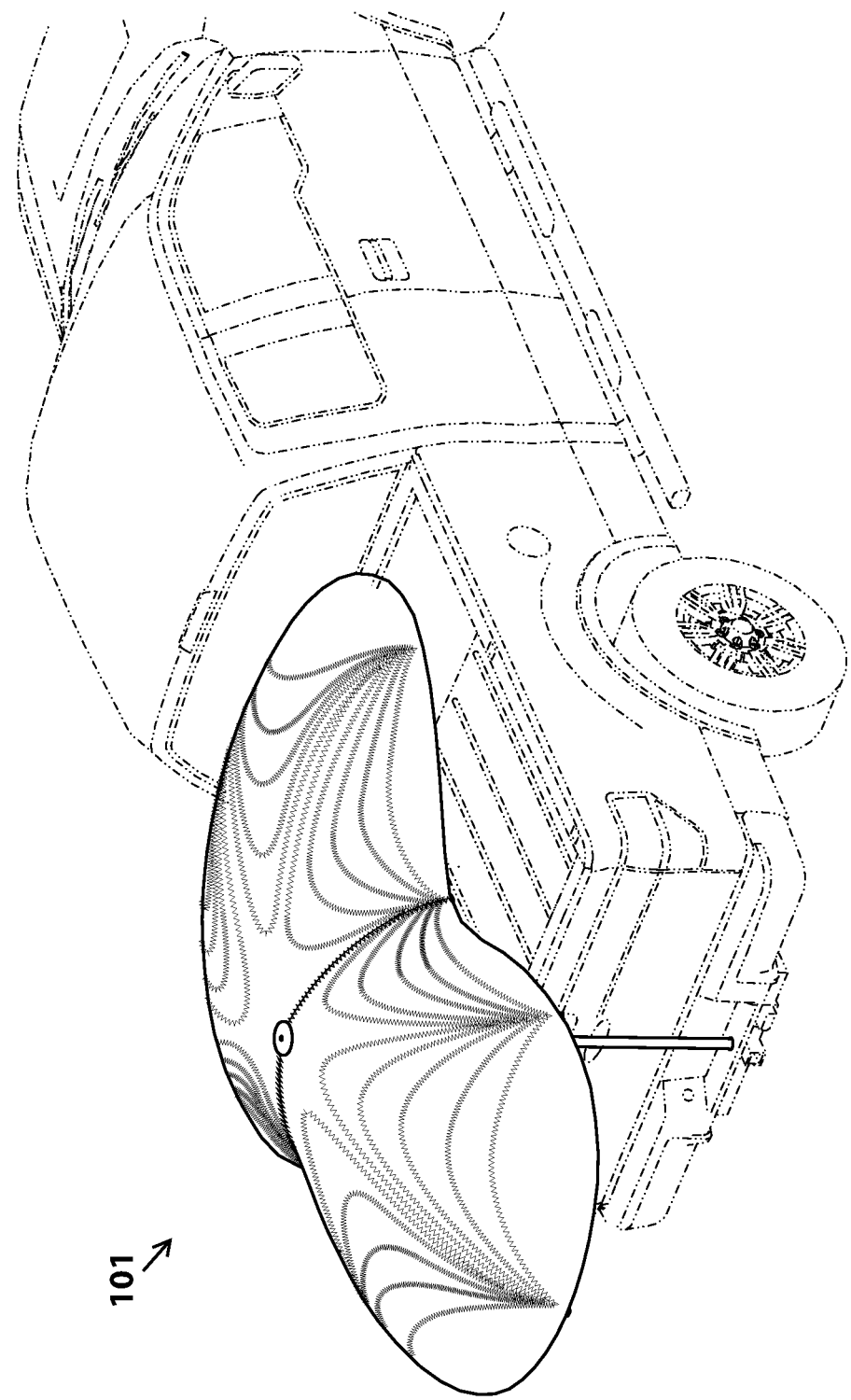
Figure 20:
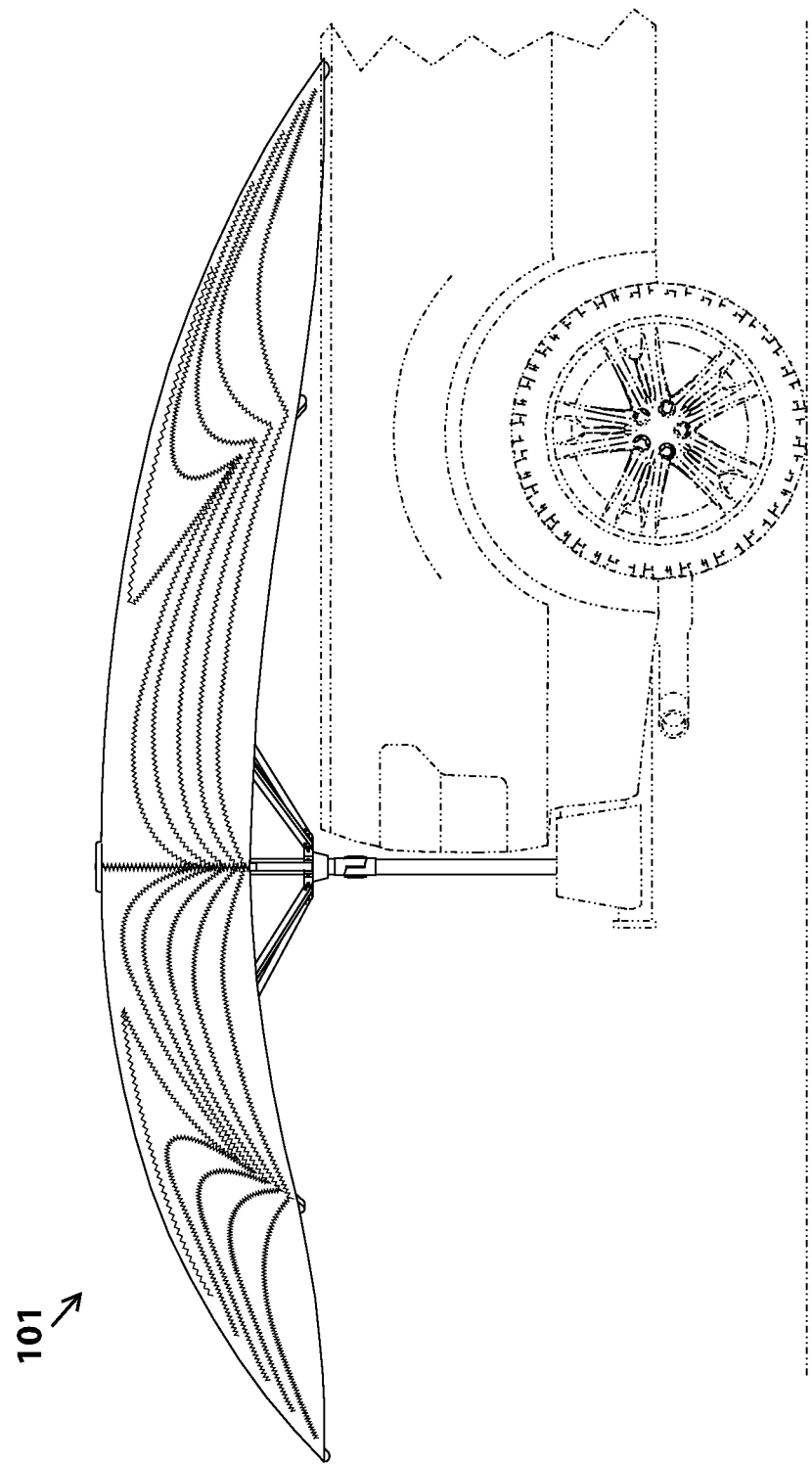
Figure 21:
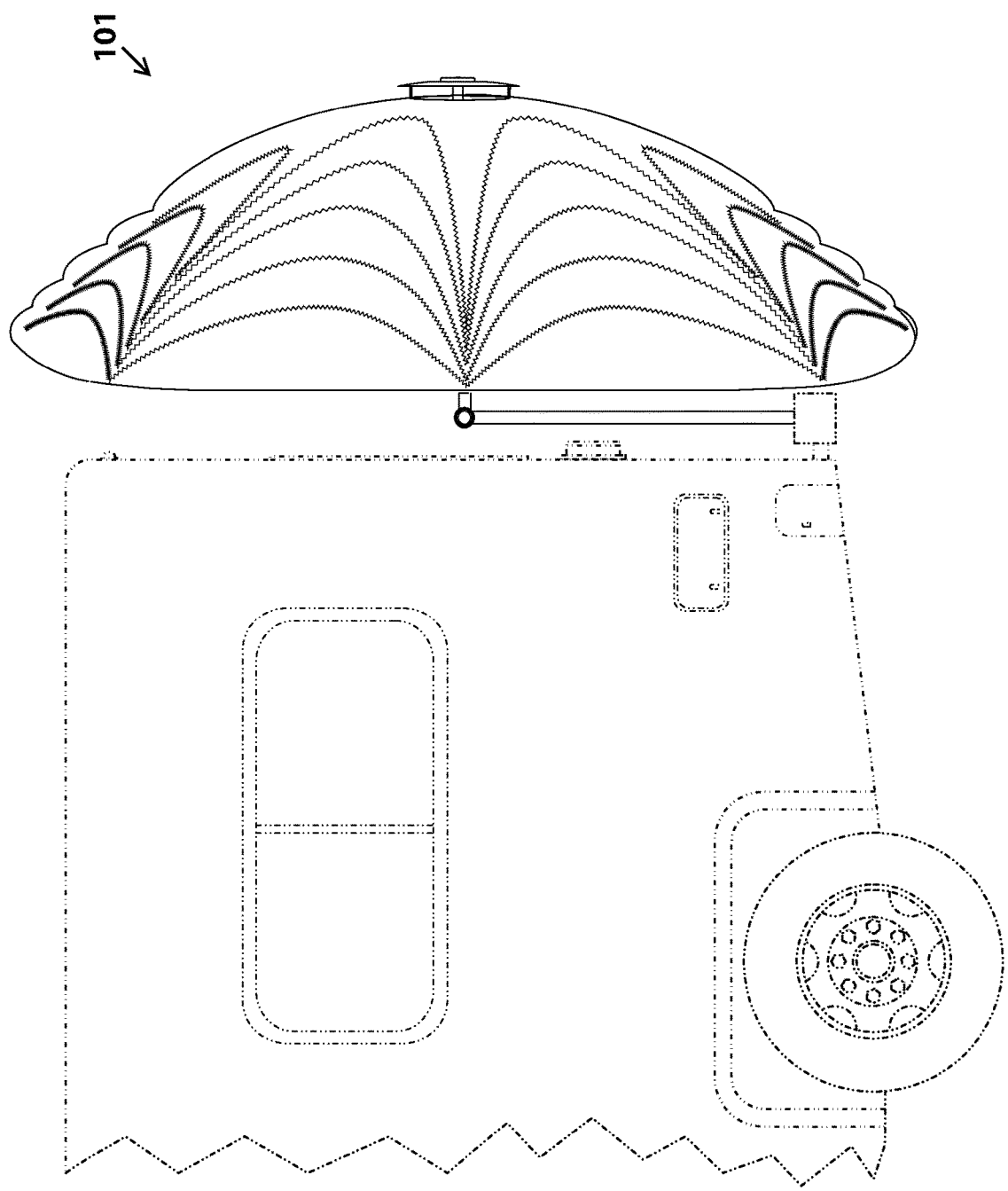
Figure 22:
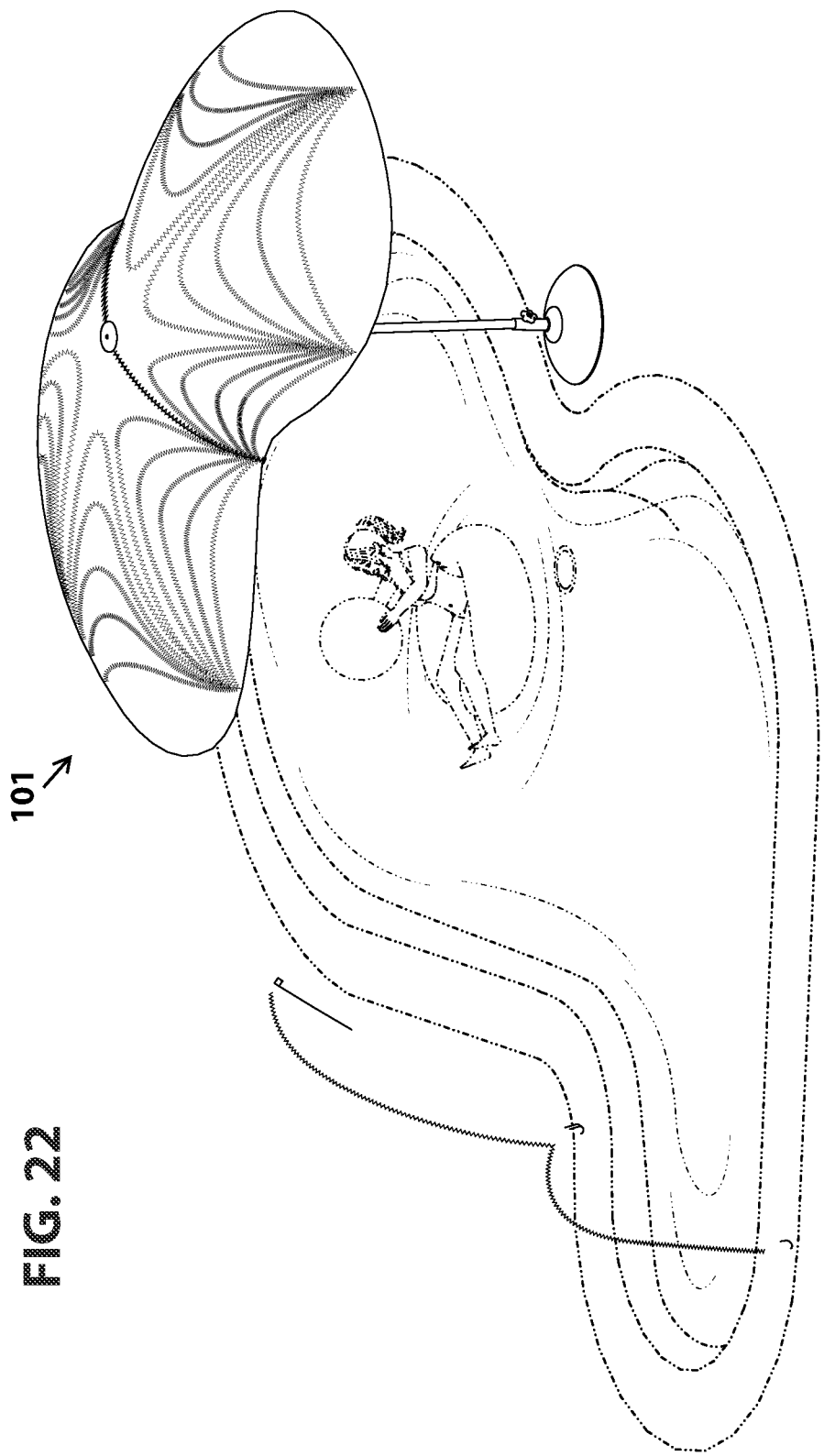
Figure 23:
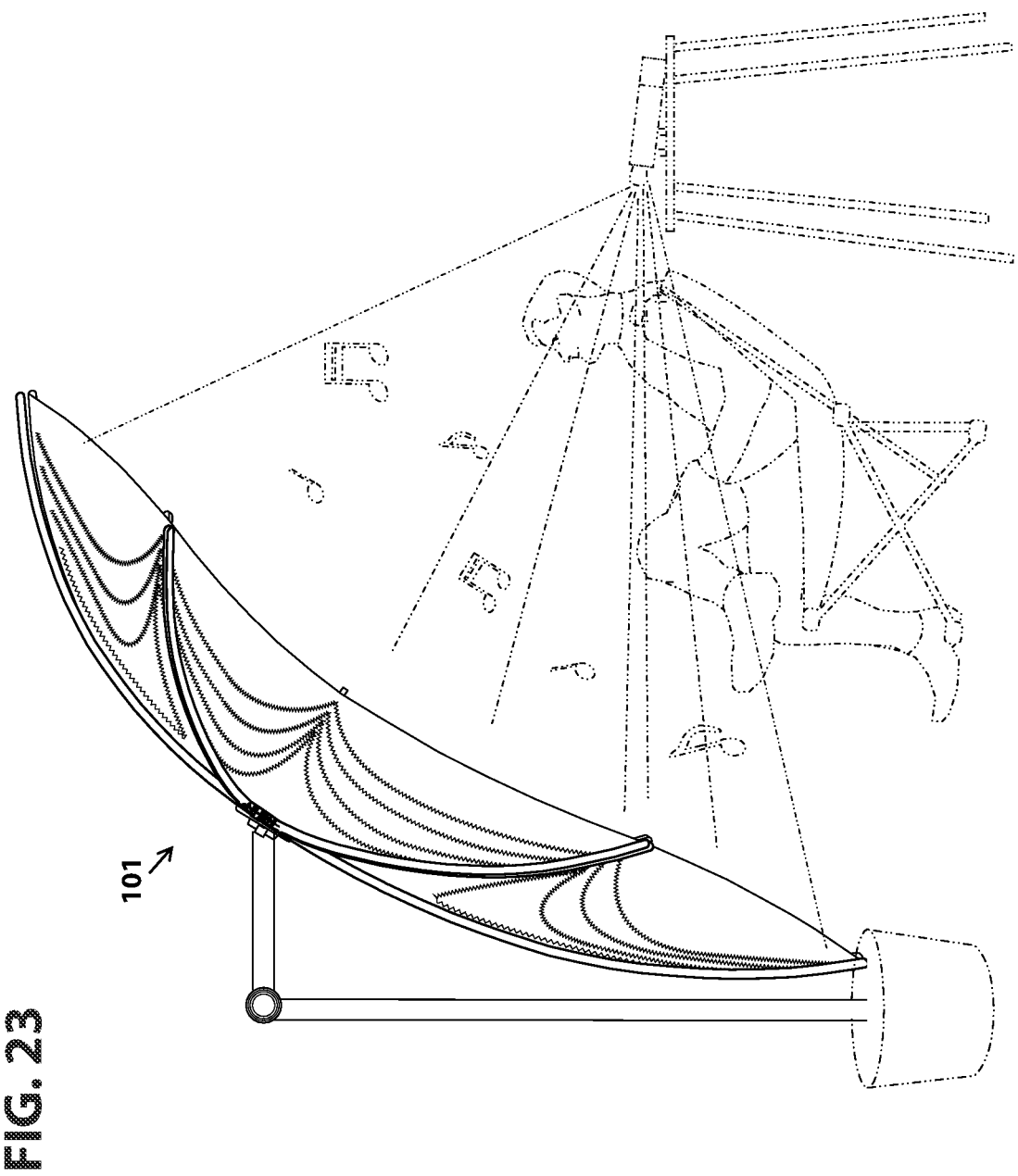
Figure 24:
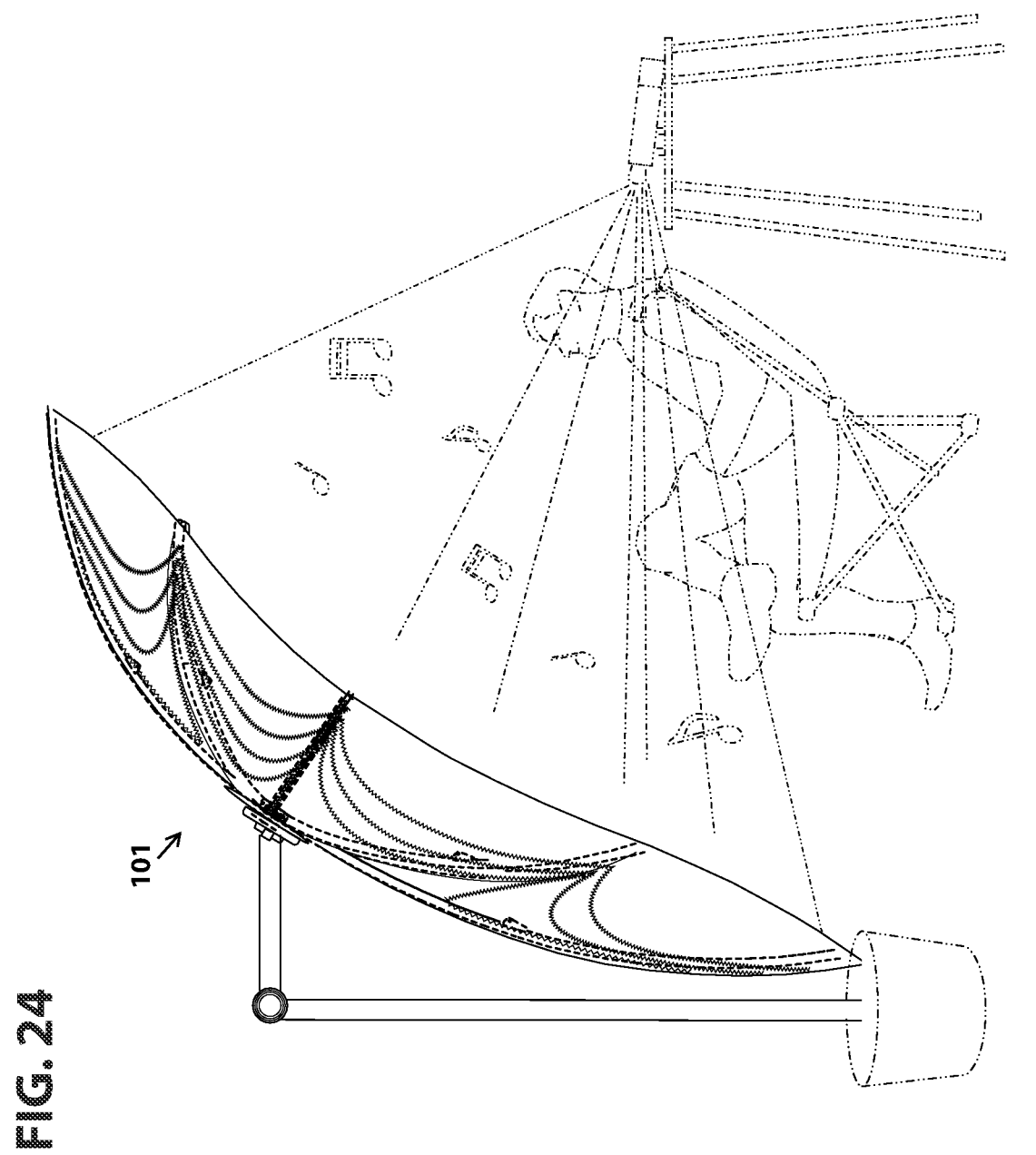
Figure 25:
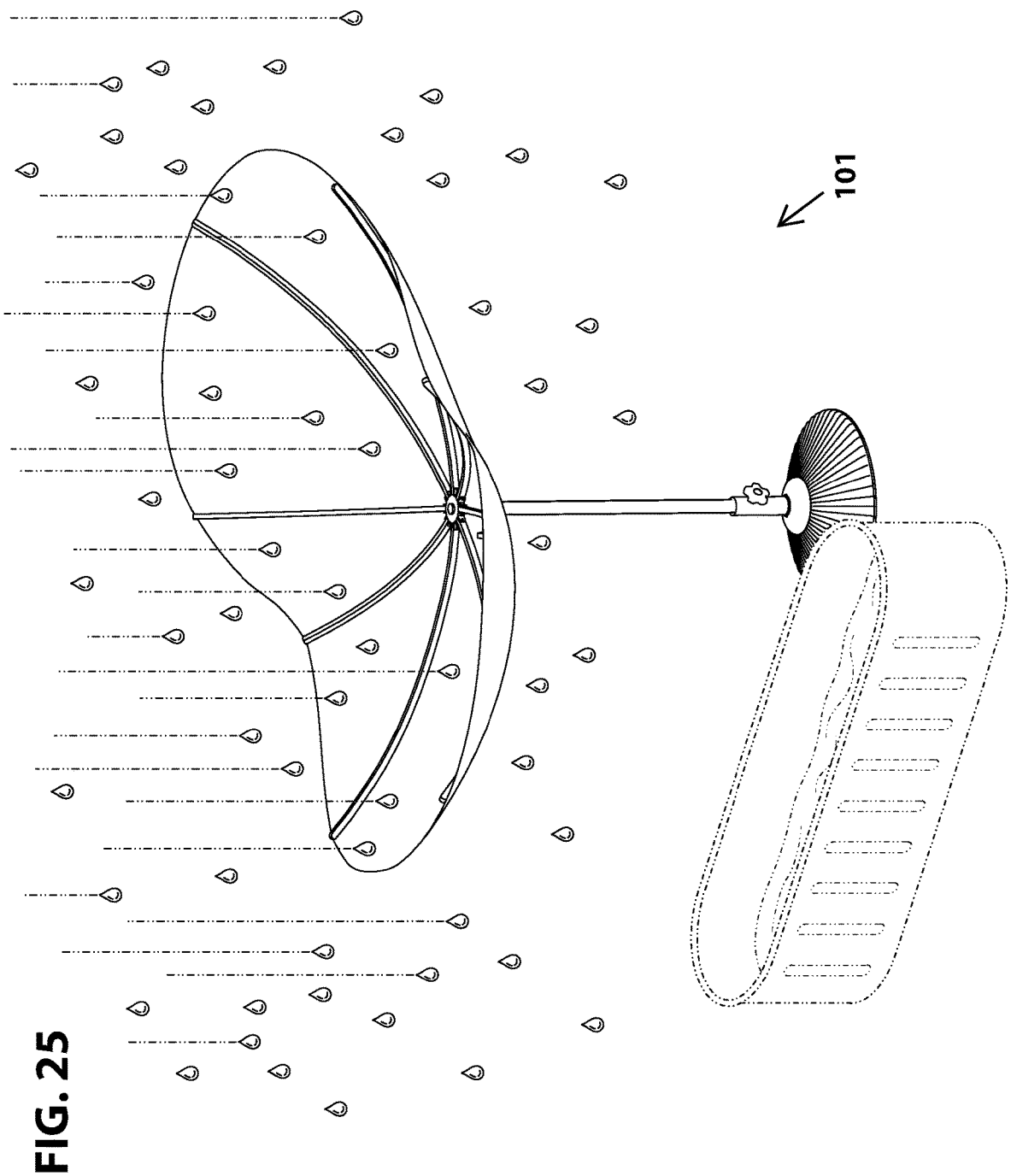
Figure 26:
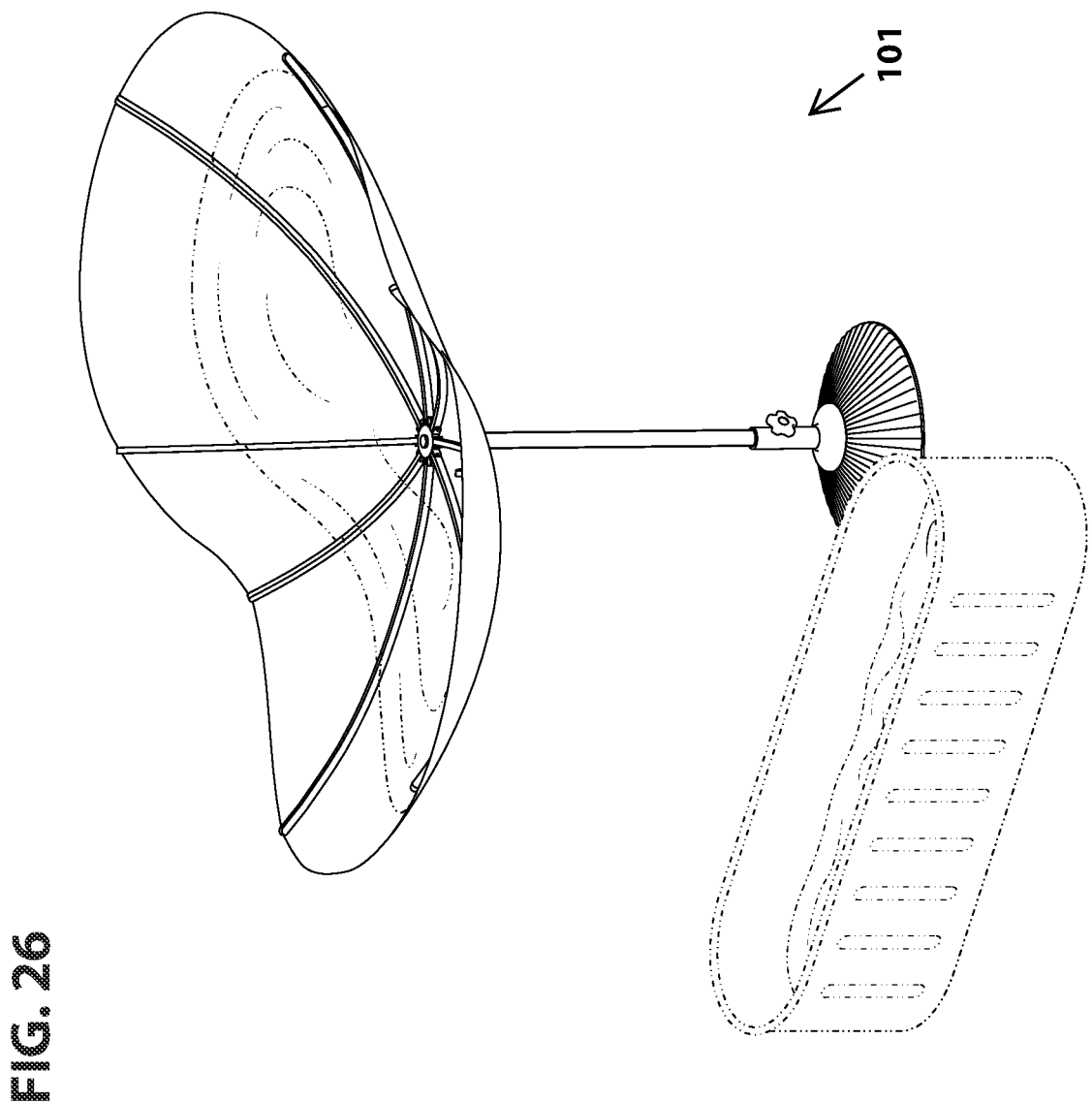
Figure 27:
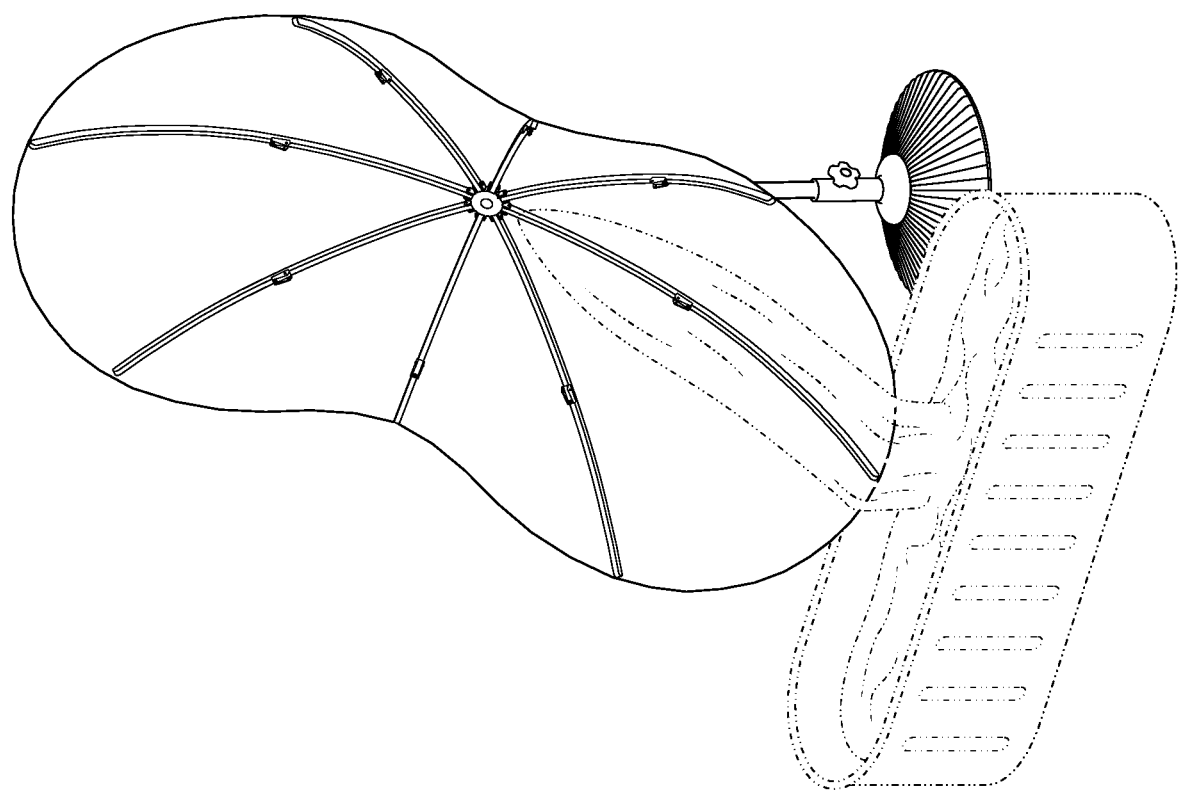
Figure 28:
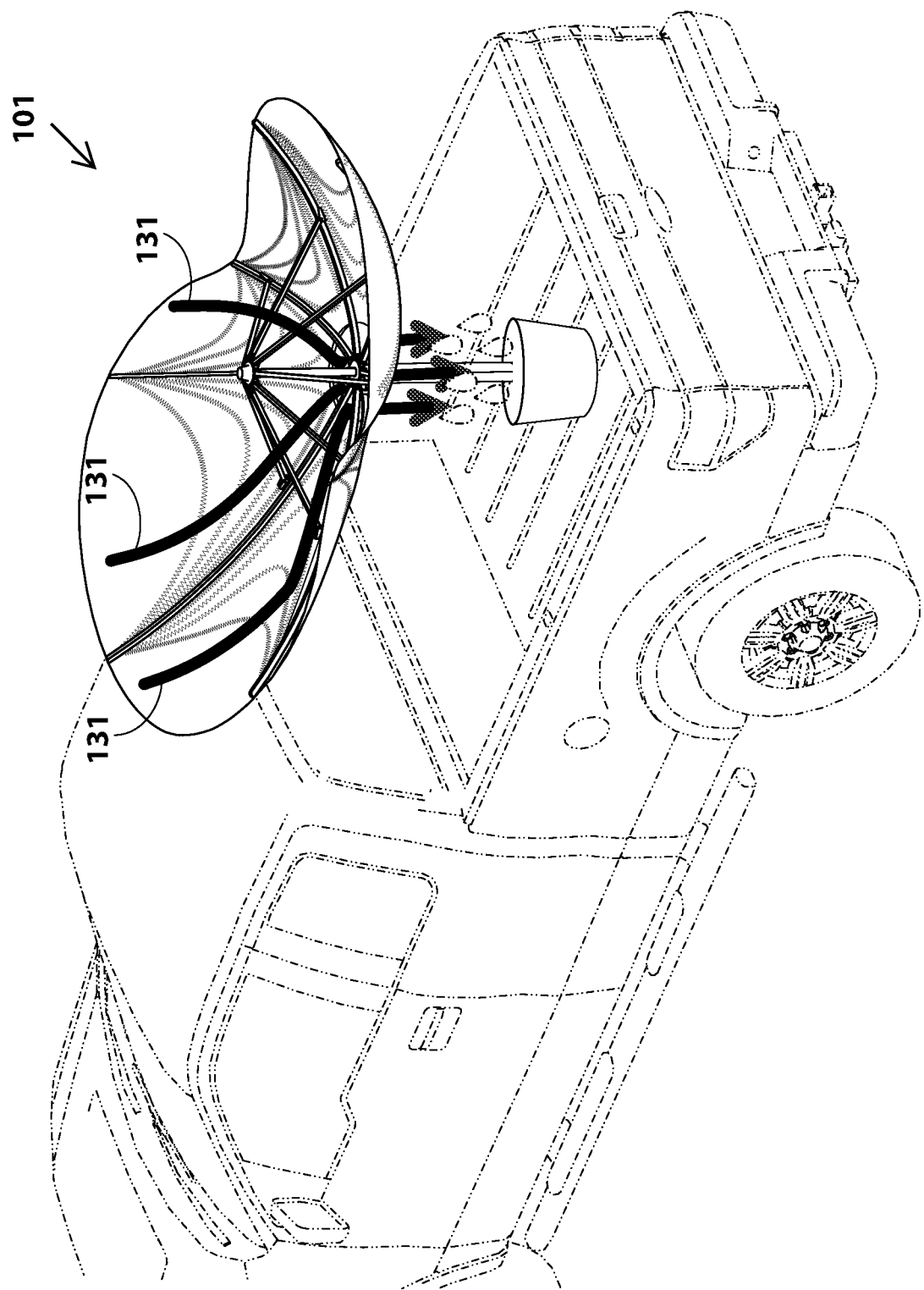
Figure 29:
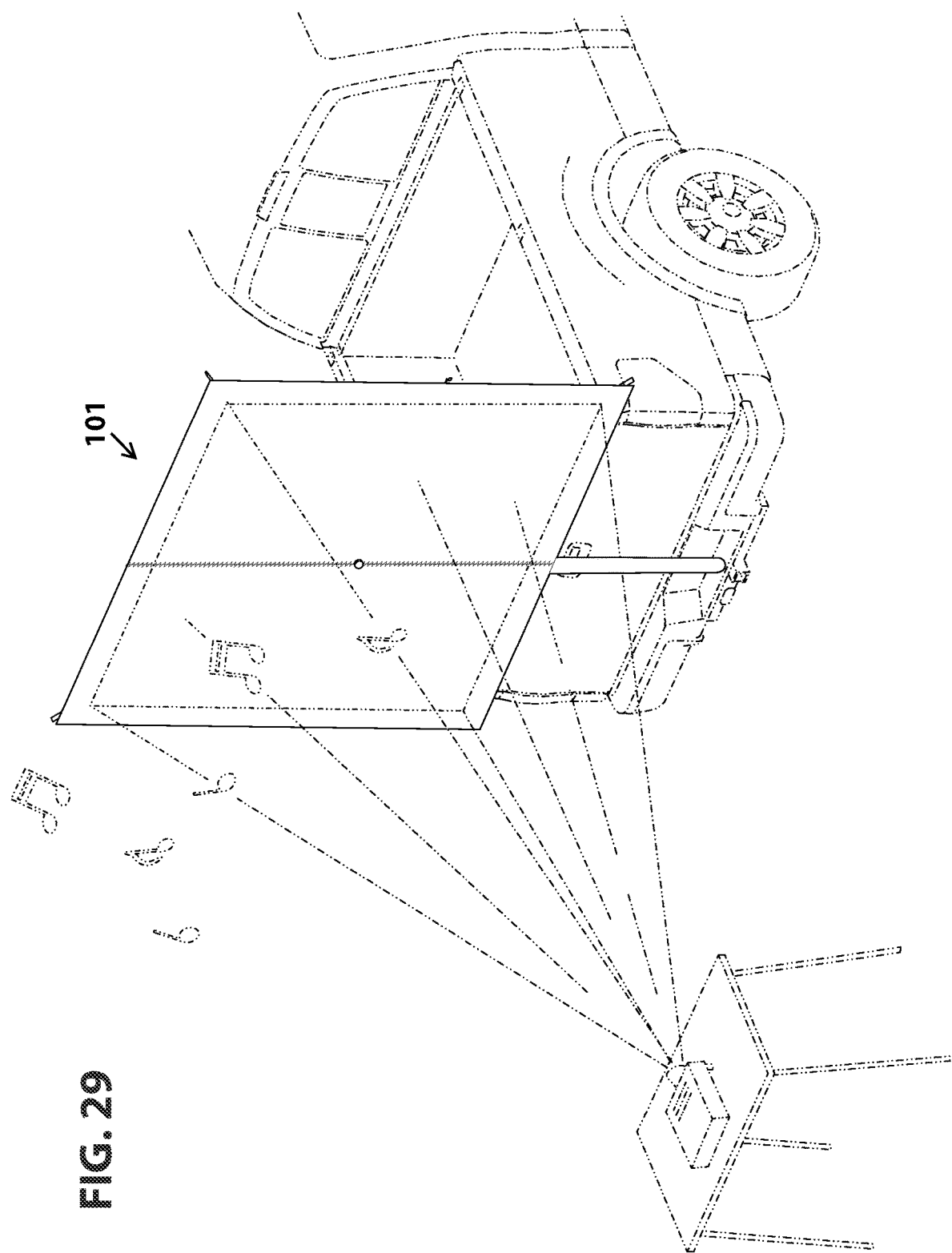
Figure 30:
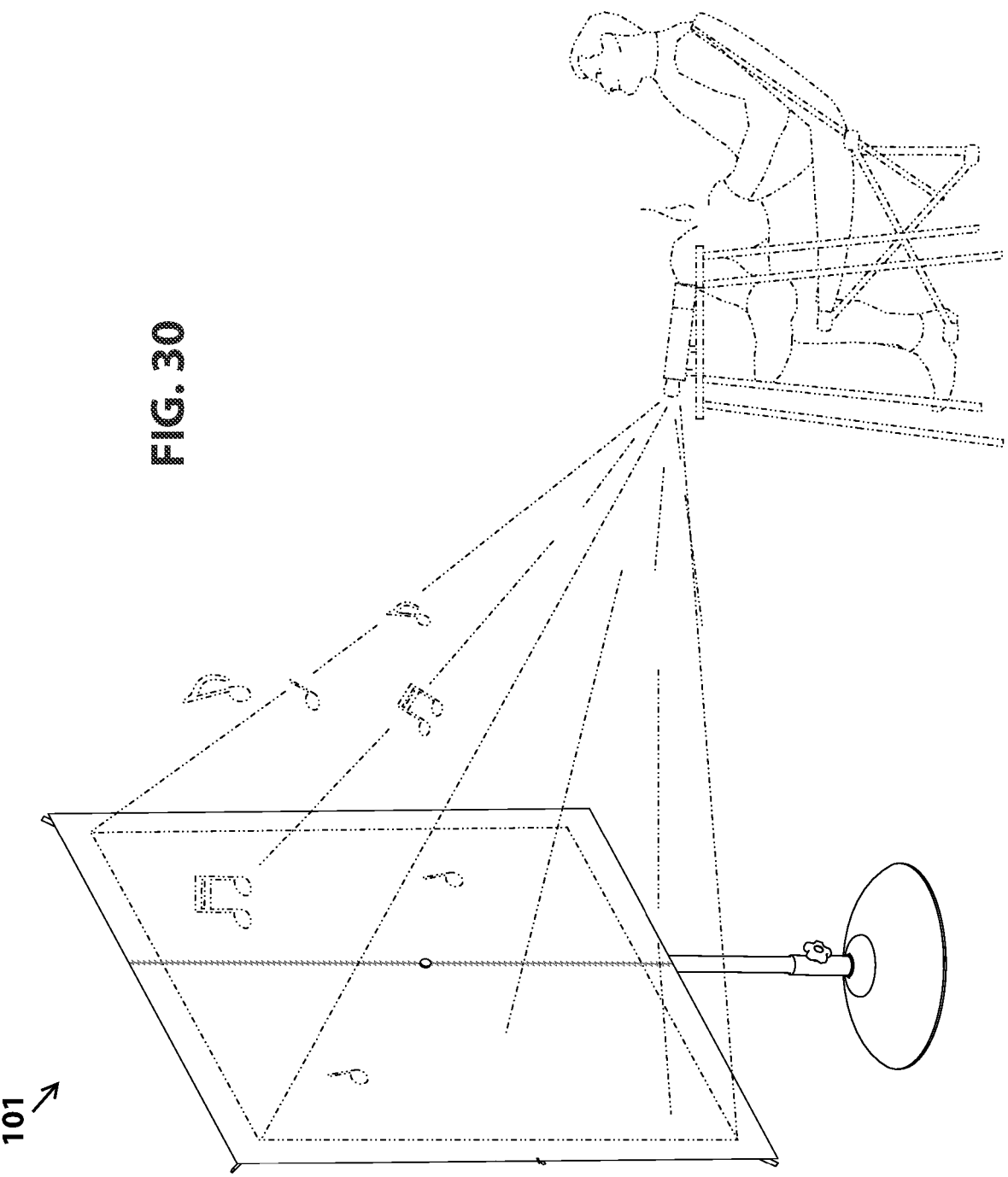
Figure 31:
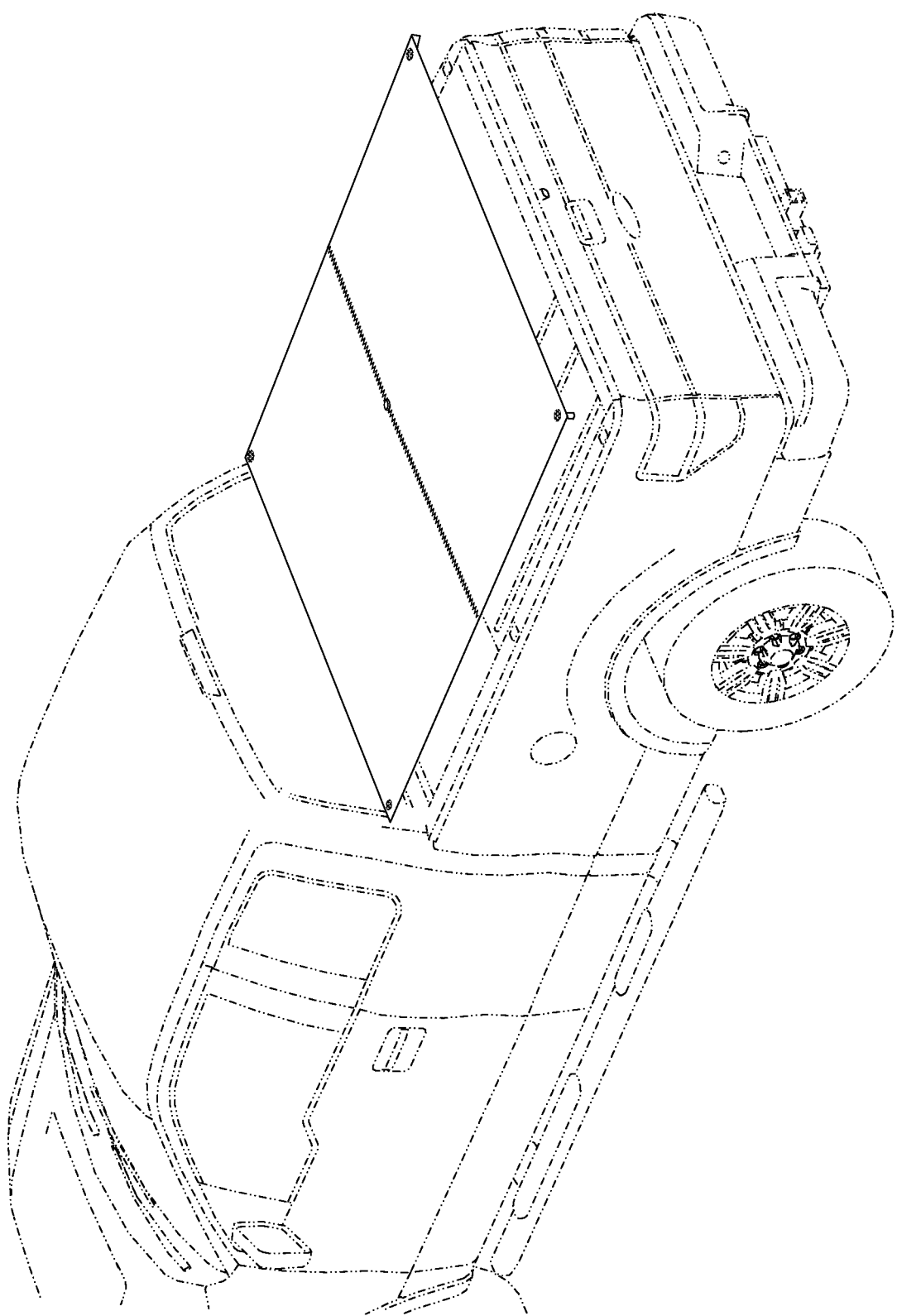
Figure 32:
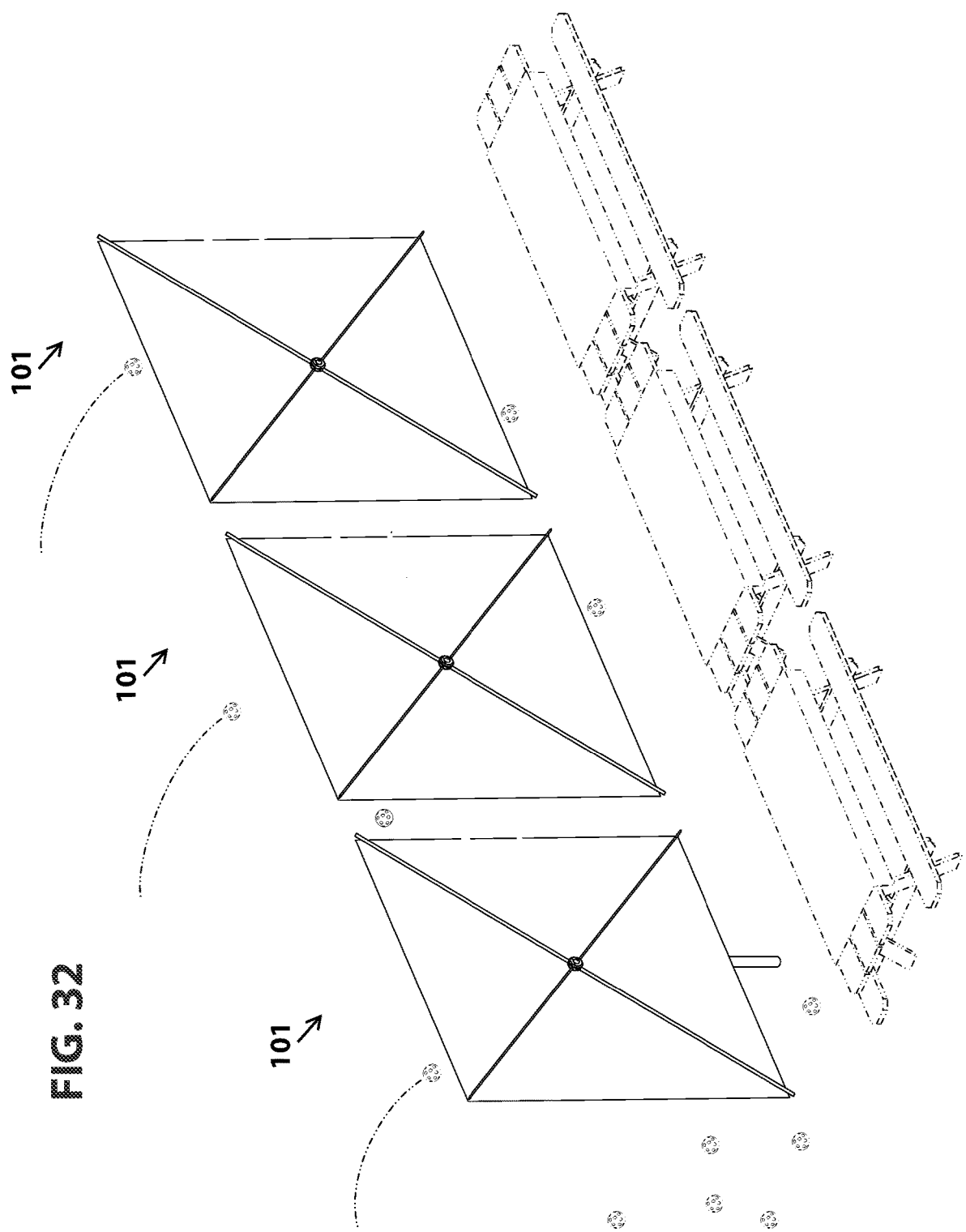
Figure 33:
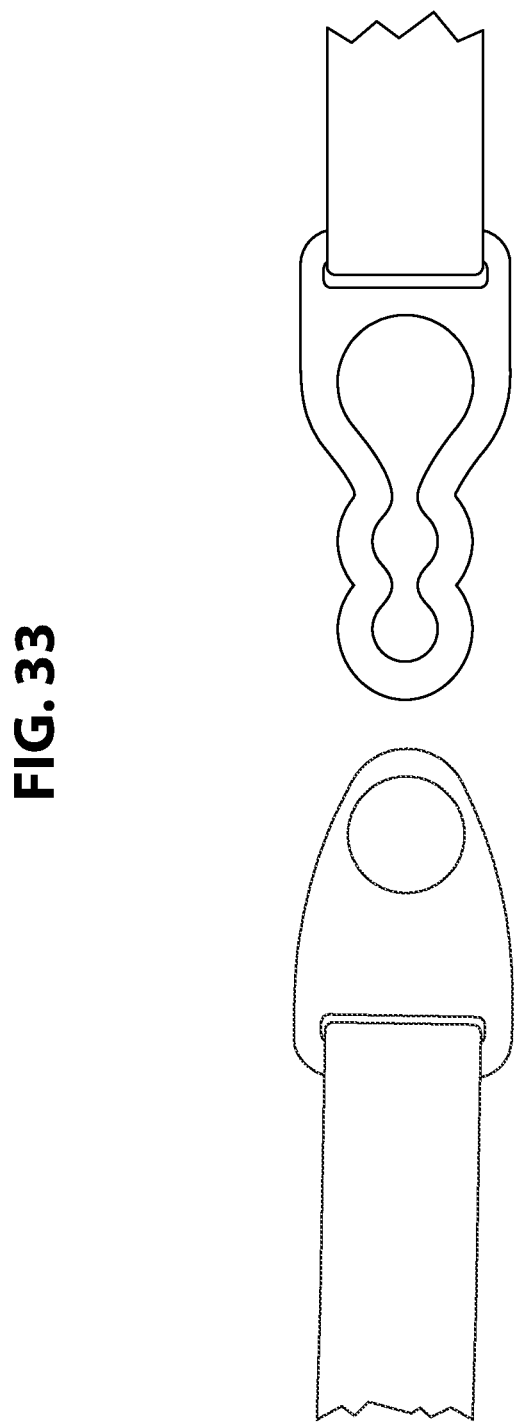
FIG. 33, FIG. 34, FIG. 35, FIG. 36, and FIG. 37 illustrate perspective views depicting equivalent variations of the slide-lock buckle eyelet 115, slide-lock buckle button 116, and storage strap 117, respectively.
Figure 34:
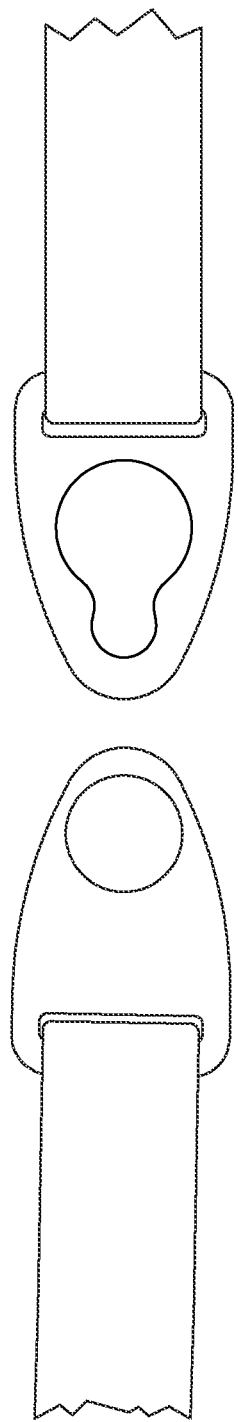
Figure 36:
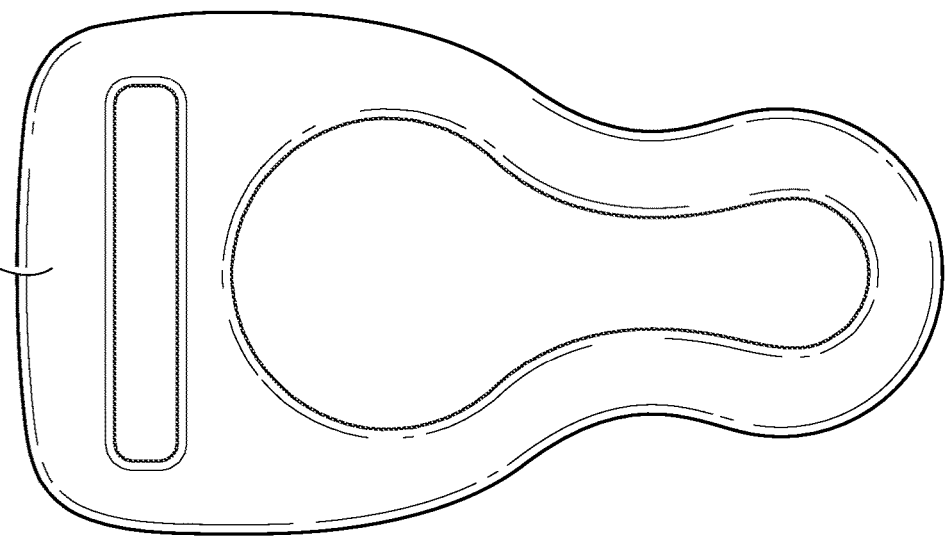
Figure 35:
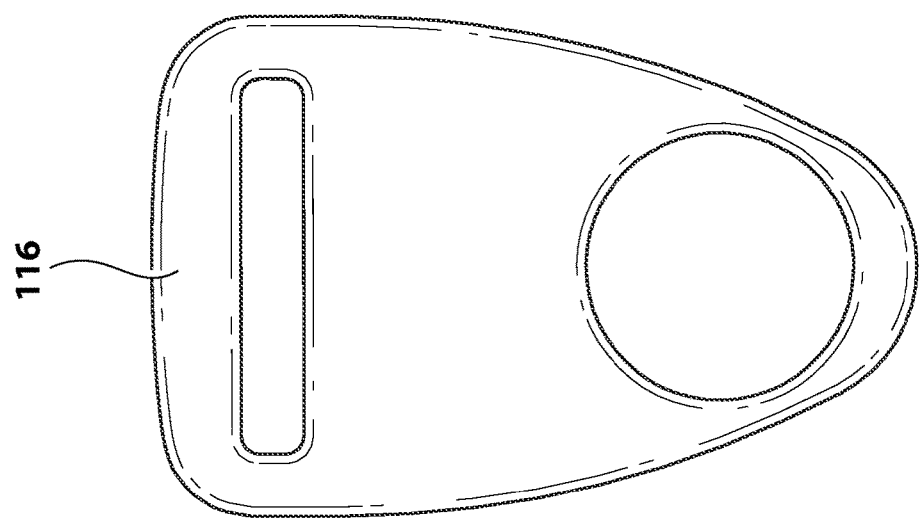
Figure 37:
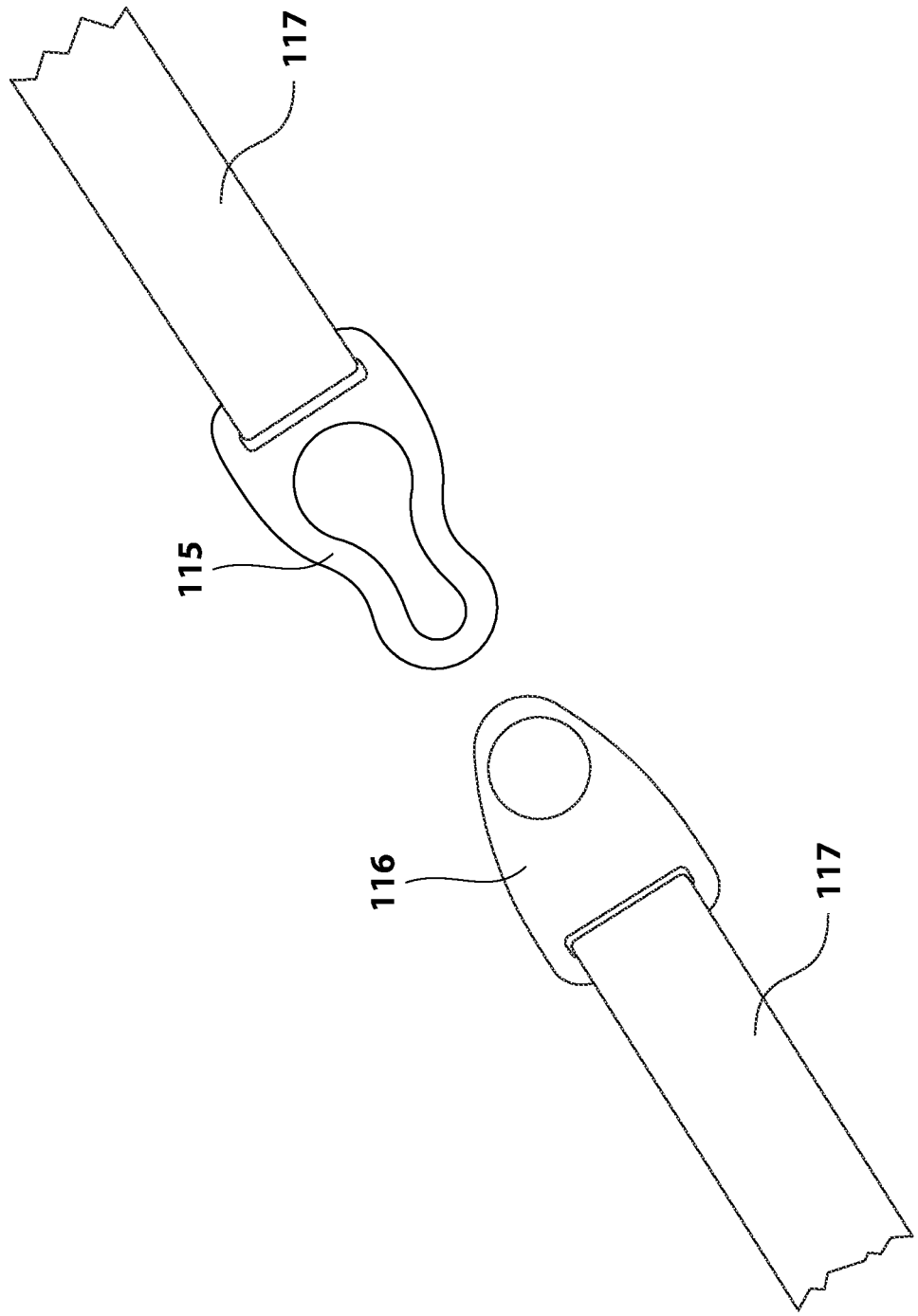
Figure 40:
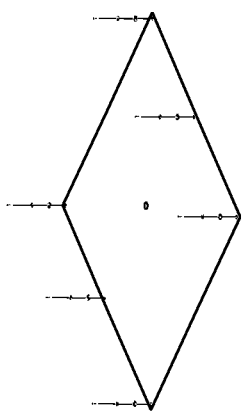
FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, and FIG. 53, illustrate perspective views depicting equivalent variations of the three-hundred-and-sixty-degree-orientational carapace-supporting-and-securing system 106.
Figure 43:
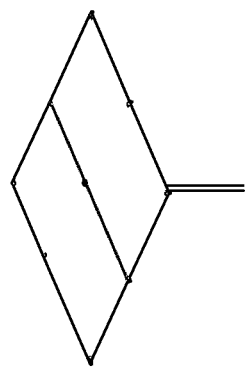
Figure 39:
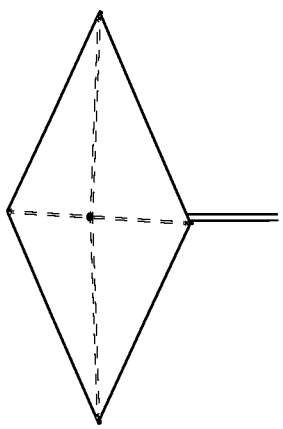
Figure 42:
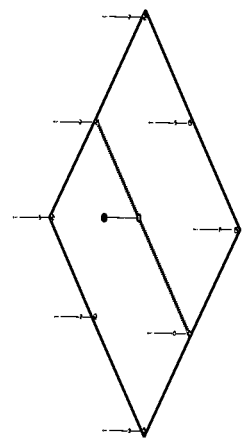
Figure 38:
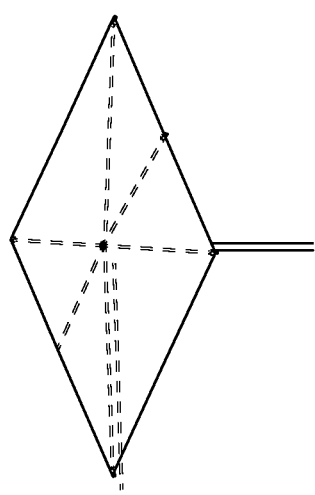
Figure 41:
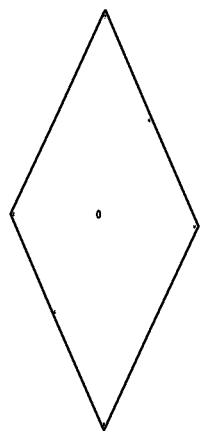
Figure 46:
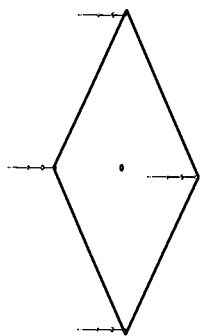
Figure 49:
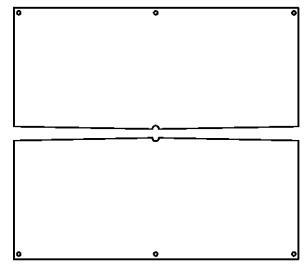
Figure 45:
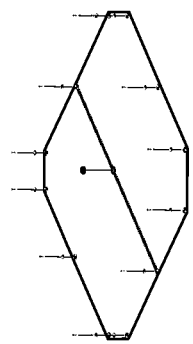
Figure 48:
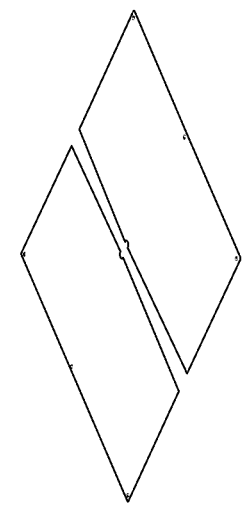
Figure 44:
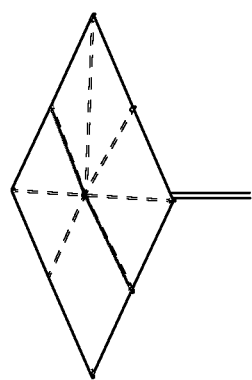
Figure 47:
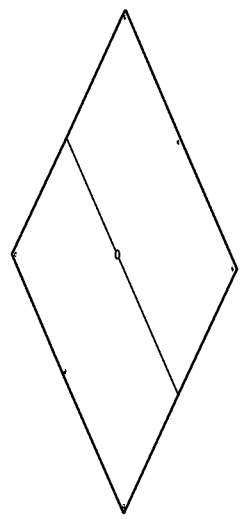
Figure 52:
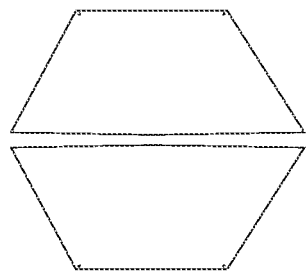
Figure 51:
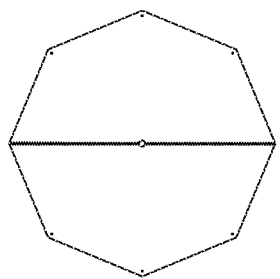
Figure 50:
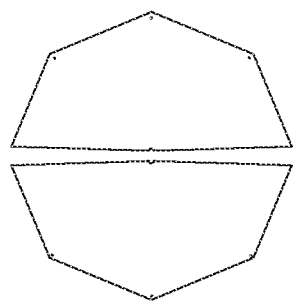

The five-device-in-one water-collecting-and-decelerating fruit-and-nut-collecting-and-decelerating wind-diffusing-and-redirecting multi-function-transversable-ridge-and-seam multi-function-twist-locking-base carapace comprises:
1) Three-hundred-and-sixty-degree-orientational water-collecting-and-decelerating fruit-nut-harvesting-and-decelerating wind-diffusing-and-redirecting discharging-nozzle carapace system,
2) Three-hundred-and-sixty-degree-orientational carapace-supporting-and-securing system,
3) Carapace-multi-orientating snap-locking pivoting-elbow system, and
4) Multi-function carapace-supporting-stanchion twist-locking-base system.

System and Component

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 2A, FIG. 2B, FIG. 2C, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 4A, FIG. 4B, FIG. 4C, FIG. 4D, FIG. 4E, FIG. 4F, FIG. 4G, FIG. 4H, FIG. 4I, FIG. 5A, FIG. 5B, FIG. 5C, and FIG. 5D, the five-device-in-one water-collecting-and-decelerating fruit-and-nut-collecting-and-decelerating wind-diffusing-and-redirecting multi-function-transversable-ridge-and-seam multi-function-twist-locking-base carapace comprises:
1) Three-hundred-and-sixty-degree-orientational water-collecting-and-decelerating fruit-nut-harvesting-and-decelerating wind-diffusing-and-redirecting discharging-nozzle carapace system 101 comprising (or each comprising (or each comprising):
2) Water-ejecting fruit-and-nut discharging wind-diffusing crown carapace 102a,
   Water-ejecting fruit-and-nut-discharging wind-diffusing crown-carapace nozzle 102b,
3) At least one first three-hundred-and-sixty-degree-orientational-carapace panel 103a,
   At least one second three-hundred-and-sixty-degree-orientational-carapace panel 103b,
4) At least one breadth-wise carapace-panels-connecting seam 104a

At least one mid-panel water-directing water-decelerating fruit-and-nut-decelerating wind-diffusing ridge seam 104*b*, and
5) Carapace-securing perimeter holes 105;
6) Three-hundred-and-sixty-degree-orientational carapace-supporting-and-securing system 106 comprising (or each comprising):
7) Crown cap 107,
8) Arched carapace-supporting ribs 108,
9) Rib hinging intersectors 109,
10) Upper hub 110,
11) Three-hundred-sixty-degree-rotatably-locking center-support stanchion 111,
12) Shuttle hub 112,
13) Lower actuating-and-supporting ribs 113,
14) Carapace-securing perimeter screws 114,
15) Slide-lock buckle eyelet 115,
16) Slide-lock buckle button 116, and
17) Storage strap 117;
18) Carapace-multi-orienting snap-locking pivoting-elbow system 118 comprising (or each comprising):
19) Carapace-multi-orienting snap-lock housing 119,
20) Snap-lock button 120,
21) Snap-lock-button pin 121,
22) Snap-lock-button spring 122,
23) Stationary snap-lock housing 123,
24) Adjustable multi-orienting stanchion-rotation-locking holes 124, and
25) Stanchion-rotation-locking screw 125;
26) Multi-function carapace-supporting-stanchion twist-locking-base system 126 comprising (or each comprising):
27) Adjustable carapace stanchion 127,
28) Adjustable stanchion-supporting twist-locking base 128,
29) Base cover 129, and
30) Stabilizing foot 130.

Material

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 2A, FIG. 2B, FIG. 2C, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 4A, FIG. 4B, FIG. 4C, FIG. 4D, FIG. 4E, FIG. 4F, FIG. 4G, FIG. 4H, FIG. 4I, FIG. 5A, FIG. 5B, FIG. 5C, and FIG. 5D:

1) Three-hundred-and-sixty-degree-orientational water-collecting-and-decelerating fruit-nut-harvesting-and-decelerating wind-diffusing-and-redirecting discharging-nozzle carapace system 101 is (or are each) made of the combined materials of its components.
2) Water-ejecting fruit-and-nut discharging wind-diffusing crown carapace 102*a*
is (or are each) made of plastic, canvas, nylon, or fabric.
Water-ejecting fruit-and-nut-discharging wind-diffusing crown-carapace nozzle 102*b*
is (or are each) made of empty space.
3) At least one first three-hundred-and-sixty-degree-orientational-carapace panel 103*a*
is (or are each) made of plastic, canvas, nylon, or fabric.
At least one second three-hundred-and-sixty-degree-orientational-carapace panel 103*b*
is (or are each) made of plastic, canvas, nylon, or fabric.
4) At least one breadth-wise carapace-panels-connecting seam 104*a*
is (or are each) made of empty space.
At least one mid-panel water-directing water-decelerating fruit-and-nut-decelerating wind-diffusing ridge seam 104*b*
is (or are each) made of empty space.
5) Carapace-securing perimeter holes 105
is (or are each) made of empty space.
6) Three-hundred-and-sixty-degree-orientational carapace-supporting-and-securing system 106 is (or are each) made of the combined materials of its components.
7) Crown cap 107
is (or are each) made of metal and/or plastic.
8) Arched carapace-supporting ribs 108
is (or are each) made of metal and/or plastic.
9) Rib hinging intersectors 109
is (or are each) made of metal and/or plastic.
10) Upper hub 110
is (or are each) made of plastic and/or metal.
11) Three-hundred-sixty-degree-rotatably-locking center-support stanchion 111
is (or are each) made of metal and/or plastic.
12) Shuttle hub 112
is (or are each) made of metal and/or plastic.
13) Lower actuating-and-supporting ribs 113
is (or are each) made of metal and/or plastic.
14) Carapace-securing perimeter screws 114
is (or are each) made of metal and/or plastic.
15) Slide-lock buckle eyelet 115
is (or are each) made of metal and/oplastic.
16) Slide-lock buckle button 116
is (or are each) made of metal and/oplastic.
17) Storage strap 117
is (or are each) made of webbing, the equivalent, or other fabric.
18) Carapace-multi-orienting snap-locking pivoting-elbow system 118 is (or are each) made of the combined materials of its components.
19) Carapace-multi-orienting snap-lock housing 119
is (or are each) made of metal and/or plastic.
20) Snap-lock button 120
is (or are each) made of metal and/or plastic.
21) Snap-lock-button pin 121
is (or are each) made of metal and/or plastic.
22) Snap-lock-button spring 122
is (or are each) made of metal.
23) Stationary snap-lock-button housing 123
is (or are each) made of metal and/or plastic.
24) Adjustable multi-orienting stanchion-rotation-locking holes 124
is (or are each) made of empty space.
25) Stanchion-rotation-locking screw 125
is (or are each) made of metallic material.
26) Multi-function carapace-supporting-stanchion twist-locking-base system 126 is (or are each) made of the combined materials of its components.
27) Adjustable carapace stanchion 127
is (or are each) made of metal.
28) Adjustable stanchion-supporting twist-locking base 128
is (or are each) made of metal.
29) Base cover 129
is (or are each) made of metal.
30) Stabilizing foot 130.
is (or are each) made of metal and/or plastic.

Shape

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 2A, FIG. 2B, FIG. 2C, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 4A, FIG. 4B, FIG. 4C, FIG. 4D, FIG. 4E, FIG. 4F, FIG. 4G, FIG. 4H, FIG. 4I, FIG. 5A, FIG. 5B, FIG. 5C, and FIG. 5D:

1) Three-hundred-and-sixty-degree-orientational water-collecting-and-decelerating fruit-nut-harvesting-and-decelerating wind-diffusing-and-redirecting discharging-nozzle carapace system 101 is (or are each) formed into the combined shapes of its components.
2) Water-ejecting fruit-and-nut discharging wind-diffusing crown carapace 102*a*
    is (or are each) formed into a dome shape.
    Water-ejecting fruit-and-nut-discharging wind-diffusing crown-carapace nozzle 102*b*
    is (or are each) formed into an opening shape.
3) At least one first three-hundred-and-sixty-degree-orientational-carapace panel 103*a*
    is (or are each) formed into half of a figure-8 shape.
    At least one second three-hundred-and-sixty-degree-orientational-carapace panel 103*b*
    is (or are each) formed into half of a figure-8 shape.
4) At least one breadth-wise carapace-panels-connecting seam 104*a*
    is (or are each) formed into a zig-zag shape.
    At least one mid-panel water-directing water-decelerating fruit-and-nut-decelerating wind-diffusing ridge seam 104*b*
    is (or are each) formed into a zig-zag shape.
5) Carapace-securing perimeter holes 105
    is (or are each) formed into a round shape.
6) Three-hundred-and-sixty-degree-orientational carapace-supporting-and-securing system 106 is (or are each) formed into the combined shapes of its components.
7) Crown cap 107
    is (or are each) formed into a disk shape.
8) Arched carapace-supporting ribs 108
    is (or are each) formed into curved tube with a rectangular cross-section.
9) Rib hinging intersectors 109
    is (or are each) formed into a rounded-rectangular shape with an oval-shaped cross-section.
10) Upper hub 110
    is (or are each) formed into a circular shape with multi-notched outer perimeter.
11) Three-hundred-sixty-degree-rotatably-locking center-support stanchion 111
    is (or are each) formed into a tube shape.
12) Shuttle hub 112
    is (or are each) formed into cylindrical shape with tube interior.
13) Lower actuating-and-supporting ribs 113
    is (or are each) formed into tube with an oval cross-section.
14) Carapace-securing perimeter screws 114
    is (or are each) formed into a screw shape.
15) Slide-lock buckle eyelet 115
    is (or are each) formed into a circular shape.
16) Slide-lock buckle button 116
    is (or are each) formed into a circular shape.
17) Storage strap 117
    is (or are each) formed into a strap shape.
18) Carapace-multi-orienting snap-locking pivoting-elbow system 118 is formed into the combined shapes of its components.
19) Carapace-multi-orienting snap-lock housing 119
    is (or are each) formed into cylindrical shape with a tube top.
20) Snap-lock button 120
    is (or are each) formed into a cylindrical shape.
21) Snap-lock-button pin 121
    is (or are each) formed into cylindrical shape.
22) Snap-lock-button spring 122
    is (or are each) formed into screw a spring shape.
23) Stationary snap-lock-button housing 123
    is (or are each) formed into a cylindrical shape with a tube bottom.
24) Adjustable multi-orienting stanchion-rotation-locking holes 124
    is (or are each) formed into a circular shape.
25) Stanchion-rotation-locking screw 125
    is (or are each) formed into a cylindrical shape.
26) Multi-function carapace-supporting-stanchion twist-locking-base system 126 is (or are each) formed into the combined shapes of its components.
27) Adjustable carapace stanchion 127
    is (or are each) formed into a tube shape.
28) Adjustable stanchion-supporting twist-locking base 128
    is (or are each) formed into an elongated cylinder shape.
29) Base cover 129
    is (or are each) formed into a handle shape.
30) Stabilizing foot 130
    is (or are each) formed into a cone shape.
    Connection
    Referring to FIG. 1A, FIG. 1B, FIG. 1C, FIG. 1D, FIG. 1E, FIG. 1F, FIG. 1G, FIG. 1H, FIG. 1I, FIG. 1J, FIG. 2A, FIG. 2B, FIG. 2C, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 4A, FIG. 4B, FIG. 4C, FIG. 4D, FIG. 4E, FIG. 4F, FIG. 4G, FIG. 4H, FIG. 4I, FIG. 5A, FIG. 5B, FIG. 5C, and FIG. 5D:
1) Three-hundred-and-sixty-degree-orientational water-collecting-and-decelerating fruit-nut-harvesting-and-decelerating wind-diffusing-and-redirecting discharging-nozzle carapace system 101 is (or are respectively) connected by the combined connections of its components.
2) Water-ejecting fruit-and-nut discharging wind-diffusing crown carapace 102*a*
    is (or are respectively)
    attached to crown cap 107.
    Water-ejecting fruit-and-nut-discharging wind-diffusing crown-carapace nozzle 102*b*
    is (or are respectively)
    formed between inner perimeter edges of at least one first three-hundred-and-sixty-degree-orientational-carapace panel 103*a* and at least one second three-hundred-and-sixty-degree-orientational-carapace panel 103*b*.
3) At least one first three-hundred-and-sixty-degree-orientational-carapace panel 103*a*
    is (or are respectively)
    sewn together to at least one second three-hundred-and-sixty-degree-orientational-carapace panel 103*b* by at least one breadth-wise carapace-panel-connecting seam 104*a* and stretched over three-hundred-and-sixty-degree-orientational carapace-supporting-and-securing system 106.
    At least one second three-hundred-and-sixty-degree-orientational-carapace panel 103*b*
    is (or are respectively)
    sewn together to at least one first three-hundred-and-sixty-degree-orientational-carapace panel 103*a* by at least one breadth-wise carapace-panel-connecting seam 104*a* and stretched over three-hundred-and-sixty-degree-orientational carapace-supporting-and-securing system 106.

4) At least one breadth-wise carapace-panels-connecting seam 104*a*
    is (or are respectively)
        stitched between at least one first three-hundred-and-sixty-degree-orientational-carapace panel 103*a* and at least one second three-hundred-and-sixty-degree-orientational-carapace panel 103*b*.
    At least one mid-panel water-directing water-decelerating fruit-and-nut-decelerating wind-diffusing ridge seam 104*b*
    is (or are respectively)
        stitched into at least one first three-hundred-and-sixty-degree-orientational-carapace panel 103*a* and at least one second three-hundred-and-sixty-degree-orientational-carapace panel 103*b*.
5) Carapace-securing perimeter holes 105
    is (or are respectively)
        punched into carapace-perimeter-securing-screw holes 120.
6) Three-hundred-and-sixty-degree-orientational carapace-supporting-and-securing system 106 is (or are respectively) connected by the combined connections of its components.
7) Crown cap 107
    is (or are respectively)
        attached atop upper hub 110.
8) Arched carapace-supporting ribs 108
    is (or are respectively)
        hingedly attached to upper hub 110 and rib hinging intersectors 109.
9) Rib hinging intersectors 109
    is (or are respectively)
        hingedly attached to arched carapace-supporting ribs 108 and
        lower actuating-and-supporting ribs 113.
10) Upper hub 110
    is (or are respectively)
        mounted atop three-hundred-sixty-degree-rotatably-locking center-support stanchion 111 and hingedly attached to arched carapace-supporting ribs 108.
11) Three-hundred-sixty-degree-rotatably-locking center-support stanchion 111
    is (or are respectively)
        attached through upper hub 110, shuttle hub 112, and rotatably attached to carapace-tilting-and-multi-orienting snap-lock housing 119.
12) Shuttle hub 112
    is (or are respectively)
        slidably attached to Three-hundred-sixty-degree-rotatably-locking center-support stanchion 111 and hingedly attached to lower actuating-and-supporting ribs 113.
13) Lower actuating-and-supporting ribs 113
    is (or are respectively)
        hingedly attached between rib hinging intersectors 109 and shuttle hub 115.
14) Carapace-perimeter-securing-screws 114
    is (or are respectively)
        screwed through carapace-securing perimeter holes 105 into the arched carapace-supporting ribs 108.
15) Slide-lock buckle eyelet 115
    is (or are respectively)
        attached to storage strap 117.
16) Slide-lock buckle button 116
    is (or are respectively)
        attached to storage strap 117.
17) Storage strap 117
    is (or are respectively)
        attached to slide-lock buckle eyelet 115 and slide-lock buckle button 116.
18) Carapace-multi-orienting snap-locking pivoting-elbow system 118 is (or are respectively) connected by the combined connections of its components.
19) Carapace-multi-orienting snap-lock housing 119
    is (or are respectively)
        screwed atop adjustable carapace stanchion 127.
20) Snap-lock button 120
    is (or are respectively)
        inserted into carapace-tilting-and-multi-orienting snap-lock housing 119.
21) Snap-lock-button pin 121
    is (or are respectively)
        attached to snap-lock button 120.
22) Snap-lock-button spring 122
    is (or are respectively)
        slid over snap-lock-button pin 121.
23) Stationary snap-lock-button housing 123
    is (or are respectively)
        attached atop adjustable carapace stanchion 127.
24) Adjustable multi-orienting rotation-locking holes 124
    is (or are respectively)
        drilled out of multi-height-adjustable carapace stanchion 129.
25) Stanchion-rotation-locking screw 125
    is (or are respectively)
        inserted through adjustable multi-orienting rotation-locking holes 124.
26) Multi-function carapace-supporting-stanchion twist-locking-base system 126 is (or are respectively) connected by the combined connections of its components.
27) Adjustable carapace stanchion 127
    is (or are respectively)
        screwed to stationary snap-lock-button housing 123.
28) Adjustable stanchion-supporting twist-locking base 128
    is (or are respectively)
        attached to adjustable carapace stanchion 127.
29) Base cover 129
    is (or are respectively)
        seated on adjustable stanchion-supporting twist-locking base 128.
30) Stabilizing foot 130
    is (or are respectively)
        twist-locked to adjustable stanchion-supporting twist-locking base 128.
    Function
    Referring to FIG. 6A, FIG. 6B, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, and FIG. 28:
1) Three-hundred-and-sixty-degree-orientational water-collecting-and-decelerating fruit-nut-harvesting-and-decelerating wind-diffusing-and-redirecting discharging-nozzle carapace system 101 is (or are respectively) for performing the combined functions of its components.
2) Water-ejecting fruit-and-nut discharging wind-diffusing crown carapace 102*a*
    is (or are respectively) for:
        a) Diverting rainwater out water-ejecting fruit-and-nut-discharging wind-diffusing crown-carapace nozzle 102*b*
            in the direction of arrow 131
            (see FIG. 1B and FIG. 1C);
        b) Decelerating rainwater flow to prevent splashing
            in the direction of arrow 131
            (see FIG. 1B and FIG. 1C);

c) Diffusing wind when acting as a carapace;
d) Diffusing and preventing wind from lifting the five-device-in-one water-collecting-and-decelerating fruit-and-nut-collecting-and-decelerating wind-diffusing-and-redirecting multi-function-transversable-ridge-and-seam multi-function-twist-locking-base carapace; and
e) Redirecting wind
to cool users.

Water-ejecting fruit-and-nut-discharging wind-diffusing crown-carapace nozzle 102*b*
is (or are respectively) for:
a) Ejecting collected-and-decelerated rainwater into containers
in the direction of arrow 131
(see FIG. 1B and FIG. 1C);
b) Discharging harvested-and-decelerated fruits and nuts into containers;
c) Redirecting wind to power marine kayaks
in the direction of arrow 132
(see FIG. 3A and FIG. 3B);
d) Redirecting wind to power land-yachts
in the direction of arrow 133
(see FIG. 3C and FIG. 3D);
e) Diffusing wind to prevent wind from lifting the five-device-in-one water-collecting-and-decelerating fruit-and-nut-collecting-and-decelerating wind-diffusing-and-redirecting multi-function-transversable-ridge-and-seam multi-function-twist-locking-base carapace; and
f) Redirecting wind
to cool users.

3) At least one first three-hundred-and-sixty-degree-orientational-carapace panel 103*a*
is (or are respectively) for:
a) Forming a cistern for irrigation
in the direction of arrow 134
(see FIG. 3G);
b) Forming a water-diverting gutter;
c) Forming a falling-fruit-catching device
in the directions of arrows 135
(see FIG. 3H);
d) Forming a falling-nut-catching device;
e) Forming a ball-or-badminton-shuttlecock-catching device
in the directions of arrows 136
(see FIG. 3K and FIG. 3L);
f) Forming a ball-blocking device;
g) Forming a ball-deflecting device;
h) Forming a free-standing projector screen;
i) Forming a truck-bed tonneau cover when attached to a utility hole of a truck bed side
to secure items within said truck bed;
j) Forming a shade cover when attached to a utility hole of a truck bed side
to provide shade to occupants; and
k) Forming a tow-hitch-mountable projector screen.

At least one second three-hundred-and-sixty-degree-orientational-carapace panel 103*b*
is (or are respectively) for:
a) Forming a cistern for irrigation
in the direction of arrow 134
(see FIG. 3G);
b) Forming a water-diverting gutter;
c) Forming a falling-fruit-catching device
in the direction of arrow 135
(see FIG. 3H);
d) Forming a falling-nut-catching device
in the direction of arrow 136
(see FIG. 3K and FIG. 3L);
e) Forming a ball-or-badminton-shuttlecock-catching device;
f) Forming a ball-blocking device;
g) Forming a ball-deflecting device;
h) Forming a free-standing projector screen; and
i) Forming a truck-bed tonneau cover when attached to a utility hole of a truck bed side
to secure items within said truck bed;
j) Forming a shade cover when attached to a utility hole of a truck bed side
to provide shade to occupants; and
k) Forming a tow-hitch-mountable projector screen.

4) At least one breadth-wise carapace-panel-connecting seam 104*a*
is (or are respectively) for:
a) Converging rain water therein,
to repeatedly change the direction of rain water to decelerate the flowing speed of rain water to reduce water splash to avoid damaging irrigated vegetables in the direction of arrow 131
(see FIG. 1B and FIG. 1C); and
b) Converging harvested fruits therein,
to repeatedly change the direction of harvested fruits to decelerate the rolling speed of harvested fruits to reduce fruit bruises to avoid throwing away bruised fruits in the direction of arrow 135
(see FIG. 3H);
c) Converging harvested nuts therein,
to repeatedly change the direction of harvested nuts to decelerate the rolling speed of harvested nuts to reduce nut bruises to avoid throwing away bruised nuts;
d) Converging catched balls therein,
to repeatedly change the direction of catched balls to decelerate the rolling speed of catched balls to reduce ball damages to avoid throwing away damaged balls in the direction of arrow 136
(see FIG. 3K and FIG. 3L);
e) Directing collected water away from patios and balconies
to keep said patios and balconies dry;
f) Distributing collected water onto crops when attached to the utility holes of a pickup truck
to keep said crops irrigated;
g) Directing harvested fruit to a storage container
to collect harvested fruit and
to save time and labor;
h) Directing harvested nuts to a storage container
to collect harvested nuts and
to save time and labor;
i) Directing directing catched balls to a storage container
to collect catched balls and
to save time and labor.

At least one mid-panel water-directing water-decelerating fruit-and-nut-decelerating wind-diffusing ridge seam 104*b*
is (or are respectively) for:
a) Converging rain water therein,
to repeatedly change the direction of rain water to decelerate the flowing speed of rain water to reduce water splash to avoid damaging irrigated vegetables in the direction of arrow 131
(see FIG. 1B and FIG. 1C); and b) Converging harvested fruits therein,
   to repeatedly change the direction of harvested fruits
      to decelerate the rolling speed of harvested fruits
      to reduce fruit bruises to avoid throwing away bruised fruits in the direction of arrow 135
   (see FIG. 3H);
c) Converging harvested nuts therein,
   to repeatedly change the direction of harvested nuts
      to decelerate the rolling speed of harvested nuts to reduce nut bruises to avoid throwing away bruised nuts;
d) Converging catched balls therein,
   to repeatedly change the direction of catched balls to decelerate the rolling speed of catched balls to reduce ball damages to avoid throwing away damaged balls in the direction of arrow 136
   (see FIG. 3k and FIG. 3L);
e) Directing collected water away from patios and balconies
   to keep said patios and balconies dry;
f) Distributing collected water onto crops when attached to the utility holes of a pickup truck
   to keep said crops irrigated;
g) Directing harvested fruit to a storage container
   to collect harvested fruit and
   to save time and labor;
h) Directing harvested nuts to a storage container
   to collect harvested nuts and
   to save time and labor;
i) Directing directing catched balls to a storage container
   to collect catched balls and
   to save time and labor.
5) Carapace-securing perimeter holes 105 respectively
   is (or are respectively) for:
      Providing holes through which carapace-perimeter-securing-screws 114 attach at least one first three-hundred-and-sixty-degree-orientational-carapace panel 103a and at least one second three-hundred-and-sixty-degree-orientational-carapace panel 103b to arched carapace-supporting ribs 108
      (see FIG. 1B, and FIG. 2E).
6) Three-hundred-and-sixty-degree-orientational carapace-supporting-and-securing system 106 is (or are respectively) for performing the combined functions of its components.
7) Crown cap 107
   is (or are respectively) for:
      Providing a smooth domed surface to prevent rainwater from entering the carapace.
8) Arched carapace-supporting ribs 108
   is (or are respectively) for:
      a) Providing support for at least on first three-hundred-and-sixty-degree-orientational-carapace panel 103a and at least one second three-hundred-and-sixty-degree-orientational-carapace panel 103b;
         (see FIG. 1B, FIG. 1C, and FIG. 1E);
      b) Providing structure to support three-hundred-and-sixty-degree-orientational water-collecting-and-decelerating fruit-nut-harvesting-and-decelerating wind-diffusing-and-redirecting discharging-nozzle carapace system 101 from multiple positions along the outer perimeter; and
      c) Providing structure to tilt three-hundred-and-sixty-degree-orientational water-collecting-and-decelerating fruit-nut-harvesting-and-decelerating wind-diffusing-and-redirecting discharging-nozzle carapace system 101 in multiple degrees from side to side (see FIG. 2C, FIG. 2D, and FIG. 2E).
9) Rib hinging intersectors 109 respectively
   is (or are respectively) for:
      Hingedly connecting arched carapace-supporting ribs 108 to lower actuating-and-supporting ribs 113
      (see FIG. 2A and FIG. 2B).
10) Upper hub 110
    is (or are respectively) for:
       Hingedly attaching multiple arched carapace-supporting ribs 108 at a center point of upper hub 110 radius.
11) Three-hundred-sixty-degree-rotatably-locking center-support stanchion 111
    is (or are respectively) for:
       Providing vertical structural support between upper hub 110 and shuttle hub 115.
12) Shuttle hub 112
    is (or are respectively) for:
       Hingedly attaching multiple interchangeable splines 108 at a center point of shuttle hub 115 radius.
13) Lower actuating-and-supporting ribs 113 respectively
    is (or are respectively) for:
       a) Supporting arched carapace-supporting ribs 108 (see FIG. 2C, FIG. 2D, and FIG. 2E);
       b) Providing means to arched carapace-supporting ribs 108 for deployment and contraction of three-hundred-and-sixty-degree-orientational interchangeable-spline system 106
          (see FIG. 2C, FIG. 2D, and FIG. 2E); and
       c) Providing structure to deploy three-hundred-and-sixty-degree-orientational interchangeable-spline system 106 into an erect and locked position.
14) Carapace-perimeter-securing-screws 114 respectively
    is (or are respectively) for:
       Hingedly securing interchangeable splines 108 to upper hub 110, and shuttle hub 115 to spline-actuating-and-supporting ribs 116, respectively.
15) Slide-lock buckle eyelet 115
    is (or are respectively) for:
       Securing the five-device-in-one water-collecting-and-decelerating fruit-and-nut-collecting-and-decelerating wind-diffusing-and-redirecting multi-function-transversable-ridge-and-seam multi-function-twist-locking-base carapace when collapsed.
16) Slide-lock buckle button 116
    is (or are respectively) for:
       Securing the five-device-in-one water-collecting-and-decelerating fruit-and-nut-collecting-and-decelerating wind-diffusing-and-redirecting multi-function-transversable-ridge-and-seam multi-function-twist-locking-base carapace when collapsed.
17) Storage strap 117
    is (or are respectively) for:
       Securing the five-device-in-one water-collecting-and-decelerating fruit-and-nut-collecting-and-decelerating wind-diffusing-and-redirecting multi-function-transversable-ridge-and-seam multi-function-twist-locking-base carapace when collapsed.
18) Carapace-multi-orienting snap-locking pivot-elbow system 118 is (or are respectively) for performing the combined functions of its components.
19) Carapace-multi-orienting snap-lock housing 119
    is (or are respectively) for:
       Housing snap-lock button 120, snap-lock-button pin 121, and snap-lock-button spring 122.

20) Snap-lock button 120
   is (or are respectively) for:
   Lockingly allowing the pivoting of carapace-multi-orienting snap-lock housing 119
   in the direction of arrow 137
   (see FIG. 4D).
21) Snap-lock-button pin 121
   is (or are respectively) for:
   Lockingly allowing the pivoting of carapace-multi-orienting snap-lock housing 119 when snap-lock button 120 is depressed.
   in the direction of arrow 137
   (see FIG. 4D).
22) Snap-lock-button spring 122
   is (or are respectively) for:
   Springingly allowing the actuating of snap-lock button 120.
   in the direction of arrow 137
   (see FIG. 4D).
23) Stationary snap-lock-button housing 123
   is (or are respectively) for:
   a) Providing a cavity wherein snap-lock-button pin 121 and snap-lock-button spring 122 are housed; and
   b) Providing a stationary pivot point where carapace-multi-orienting snap-lock housing 119 to pivot
   in the direction of arrow 138
   (see FIG. 4E).
24) Adjustable multi-orienting stanchion-rotation-locking holes 124
   is (or are respectively) for:
   a) Providing means to vertically adjust, at certain predetermined positions, the rotation of carapace-multi-orienting snap-lock housing 119
   in the direction of arrow 139
   (see FIG. 4H and FIG. 4I); and
   b) Providing location to insert stanchion-rotation-locking screw 125.
25) Stanchion-rotation-locking screw 125
   is (or are respectively) for:
   Providing means to laterally and rotationaly adjust, at certain predetermined positions, carapace-multi-orienting snap-lock housing 119
   in the direction of arrow 139
   (see FIG. 4H and FIG. 4I).
26) Multi-function carapace-supporting-stanchion twist-locking-base system 126 is (or are respectively) for performing the combined functions of its components.
27) Adjustable carapace stanchion 127
   is (or are respectively) for:
   Providing structure for the five-device-in-one water-collecting-and-decelerating fruit-and-nut-collecting-and-decelerating wind-diffusing-and-redirecting multi-function-transversable-ridge-and-seam multi-function-twist-locking-base carapace.
28) Adjustable stanchion-supporting twist-locking base 128
   is (or are respectively) for:
   a) Twist-locking with an additional adjustable stanchion-supporting twist-locking base 128 from an additional five-device-in-one water-collecting-and-decelerating fruit-and-nut-collecting-and-decelerating wind-diffusing-and-redirecting multi-function-transversable-ridge-and-seam multi-function-twist-locking-base carapace to enable increased volumes for collecting rainwater, or harvesting fruit, or harvesting nuts;
   b) Twist-locking with an additional adjustable stanchion-supporting twist-locking base 128 from an additional five-device-in-one water-collecting-and-decelerating fruit-and-nut-collecting-and-decelerating wind-diffusing-and-redirecting multi-function-transversable-ridge-and-seam multi-function-twist-locking-base carapace to provide versatility with arranging multiple five-device-in-one single-seam three-hundred-and-sixty-degree-orientational spline-interchanging carapaces together;
   c) Attaching to a wind-powered boat or other wind-powered vehicle to allow the five-device-in-one water-collecting-and-decelerating fruit-and-nut-collecting-and-decelerating wind-diffusing-and-redirecting multi-function-transversable-ridge-and-seam multi-function-twist-locking-base carapace to act as a carapace;
   d) Attaching to a truck bed
     to allow the five-device-in-one water-collecting-and-decelerating fruit-and-nut-collecting-and-decelerating wind-diffusing-and-redirecting multi-function-transversable-ridge-and-seam multi-function-twist-locking-base carapace to collect water, or harvest fruits or harvest nuts;
   e) Attaching to a truck bed to act as a tonneau cover
     to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide protection to bed contents;
   f) Attaching to a bumper
     to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide shade, wind protection, and rain protection;
   g) Attaching to a bumper
     to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide a projector screen;
   h) Attaching to a balcony
     to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide shade, wind protection, and rain protection;
   i) Attaching to a marine-kayak chassis
     to redirect wind to power marine kayaks; and
   j) Attaching to a land-yacht chassis
     to redirect wind to power land-yachts.
129) Base cover 129
   is (or are respectively) for:
   Covering adjustable stanchion-supporting twist-locking base 128.
130) Stabilizing foot 130
   is (or are respectively) for:
   Providing a stable base for the five-device-in-one water-collecting-and-decelerating fruit-and-nut-collecting-and-decelerating wind-diffusing-and-redirecting multi-function-transversable-ridge-and-seam multi-function-twist-locking-base carapace (see FIG. 20).

Variation

Figure 54:
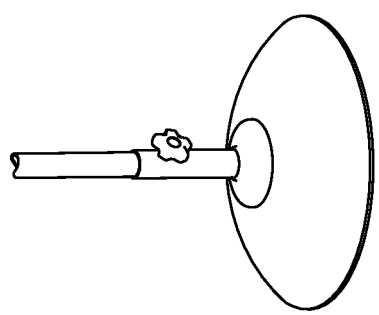
FIG. 54 illustrates a perspective view depicting base cover 129, and stabilizing foot 130.
Figure 53:
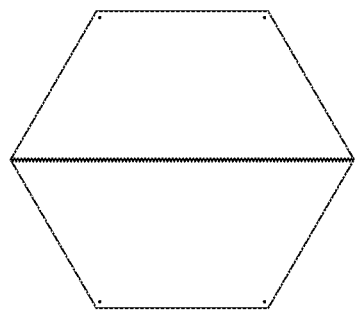

Referring to FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65, FIG. 66, FIG. 67, FIG. 68, FIG. 69, FIG. 70, FIG. 71, FIG. 72, FIG. 73, FIG. 74, FIG. 75, and FIG. 76:

Any component of the five-device-in-one water-collecting-and-decelerating fruit-and-nut-collecting-and-decelerating wind-diffusing-and-redirecting multi-function-transversable-ridge-and-seam multi-function-twist-locking-base carapace can have any shape and size. Any component of the five-device-in-one water-collecting-and-decelerating fruit-and-nut-collecting-and-decelerating wind-diffusing-and-redirecting multi-function-transversable-ridge-and-seam multi-function-twist-locking-base carapace can be made of any material or any combination of any materials. Any component of the five-device-in-one water-collecting-and-decelerating fruit-and-nut-collecting-and-decelerating wind-diffusing-and-redirecting multi-function-transversable-ridge-and-seam multi-function-twist-locking-base carapace can be made of any flexible, semi-flexible, bendable, semi-bendable, rigid, or semi-rigid material(s). For example, FIG. 29, FIG. 30, FIG. 31, and FIG. 32 illustrate perspective views depicting equivalent variations of the five-device-in-one water-collecting-and-decelerating fruit-and-nut-collecting-and-decelerating wind-diffusing-and-redirecting multi-function-transversable-ridge-and-seam multi-function-twist-locking-base carapace. For example, FIG. 33, FIG. 34, FIG. 35, FIG. 36, and FIG. 37 illustrate perspective views depicting equivalent variations of the slide-lock buckle eyelet 115, slide-lock buckle button 116, and storage strap 117, respectively. For example, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, and FIG. 53, illustrate perspective views depicting equivalent variations of the three-hundred-and-sixty-degree-orientational carapace-supporting-and-securing system 106. For example, FIG. 54 illustrates a perspective view depicting base cover 129 and stabilizing foot 130.

Major Advantages of the Invention

The present invention substantially departs from the conventional concepts and methods of the prior art. In doing so, the present invention provides a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having many unique and significant features, functions, and advantages, which overcome all the disadvantages of the prior art, as follows:

1) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
    water-ejecting fruit-and-nut discharging wind-diffusing crown carapace 102*a*.
    Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
    a) Capable of diverting rainwater out water-ejecting fruit-and-nut-discharging wind-diffusing crown-carapace nozzle 102*b*
        in the direction of arrow 131
        (see FIG. 1B and FIG. 1C);
    b) Capable of decelerating rainwater flow to prevent splashing
        in the direction of arrow 131
        (see FIG. 1B and FIG. 1C);
    c) Capable of diffusing wind when acting as a carapace;
    d) Capable of diffusing and preventing wind from lifting a five-device-in-one water-collecting-and-decelerating fruit-and-nut-collecting-and-decelerating wind-diffusing-and-redirecting multi-function-transversable-ridge-and-seam multi-function-twist-locking-base carapace; and
    e) Capable of redirecting wind
        to cool users.
2) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
    water-ejecting fruit-and-nut-discharging wind-diffusing crown-carapace nozzle 102*b*.
    Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
    a) Capable of ejecting collected-and-decelerated rainwater into containers
        in the direction of arrow 131
        (see FIG. 1B and FIG. 1C);
    b) Capable of discharging harvested-and-decelerated fruits and nuts into containers;
    c) Capable of redirecting wind to power marine kayaks
        in the direction of arrow 132
        (see FIG. 3A and FIG. 3B);
    d) Capable of redirecting wind to power land-yachts
        in the direction of arrow 133
        (see FIG. 3C and FIG. 3D);
    e) Capable of diffusing and preventing wind from lifting a five-device-in-one water-collecting-and-decelerating fruit-and-nut-collecting-and-decelerating wind-diffusing-and-redirecting multi-function-transversable-ridge-and-seam multi-function-twist-locking-base carapace;
    f) Capable of redirecting wind
        to cool users.
3) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
    at least one first three-hundred-and-sixty-degree-orientational-carapace panel 103*a*.
    Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
- a) Capable of being cut from a single piece of fabric in the direction of arrow 131;
- b) Capable of being sewn to at least one second three-hundred-and-sixty-degree-orientational-carapace panel 103b by at least one breadth-wise carapace-panel-connecting seam 104a;
- c) Capable of acting as a water-collecting apparatus;
- d) Capable of acting as a projector screen;
- e) Capable of acting a shade when attached to a pickup truck;
- f) Capable of acting as tonneau cover for a pickup truck;
- g) Capable of acting as a privacy screen;
- h) Capable of acting as a shade for multiple areas when attached to a patio table; and
- i) Capable of acting as a pool shade.

4) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
at least one second three-hundred-and-sixty-degree-orientational-carapace panel 103b.

Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
- a) Capable of being cut from a single piece of fabric in the direction of arrow 131;
- b) Capable of being sewn to at least one second three-hundred-and-sixty-degree-orientational-carapace panel 103b by at least one breadth-wise carapace-panel-connecting seam 104a;
- c) Capable of acting as a water-collecting apparatus;
- d) Capable of acting as a projector screen;
- e) Capable of acting a shade when attached to a pickup truck;
- f) Capable of acting as tonneau cover for a pickup truck;
- g) Capable of acting as a privacy screen;
- h) Capable of acting as a shade for multiple areas when attached to a patio table; and
- i) Capable of acting as a pool shade.

5) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
at least one breadth-wise carapace-panel-connecting seam 104a.

Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
- a) Capable of sewingly connecting at least one first three-hundred-and-sixty-degree-orientational-carapace panel 103a and at least one second three-hundred-and-sixty-degree-orientational-carapace panel 103b; and
- b) Capable of lockingly attaching at least one first three-hundred-and-sixty-degree-orientational-carapace panel 103a and at least one second three-hundred-and-sixty-degree-orientational-carapace panel 103b to each other in a single seam.

6) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
at least one mid-panel water-directing water-decelerating fruit-and-nut-decelerating wind-diffusing ridge seam 104b.

Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
- a) Capable of directing water along the surface of at least one first three-hundred-and-sixty-degree-orientational-carapace panel 103a and at least one second three-hundred-and-sixty-degree-orientational-carapace panel 103b to exit out water-ejecting fruit-and-nut discharging wind-diffusing crown-carapace nozzle 102b;
- b) Capable of decelerating rainwater flow to prevent splashing;
- c) Capable of decelerating fruits or nuts when harvesting each to prevent damage to fruits and nuts;
- d) Capable of diffusing wind when acting as a wind screen; and
- e) Capable of diffusing wind when acting as a carapace.

7) It is an object of the new invention to provide a method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace, having
adjustable stanchion-supporting twist-locking base 128.

Therefore, the method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace:
- a) Capable of twist-locking with an additional adjustable stanchion-supporting twist-locking base 128 from an additional five-device-in-one water-collecting-and-decelerating fruit-and-nut-collecting-and-decelerating wind-diffusing-and-redirecting multi-function-transversable-ridge-and-seam multi-function-twist-locking-base carapace
to enable increased volumes for collecting rainwater, or harvesting fruit, or harvesting nuts;
- b) Capable of twist-locking with an additional adjustable stanchion-supporting twist-locking base 128 from an additional five-device-in-one water-collecting-and-decelerating fruit-and-nut-collecting-and-decelerating wind-diffusing-and-redirecting multi-function-transversable-ridge-and-seam multi-function-twist-locking-base carapace to provide versatility with arranging multiple five-device-in-one single-seam three-hundred-and-sixty-degree-orientational spline-interchanging carapaces together;

c) Capable of attaching to a wind-powered boat or other wind-powered vehicle
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to act as a carapace;

d) Capable of attaching to a truck bed
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to collect water, or harvest fruits or harvest nuts;

e) Capable of attaching to a truck bed to act as a tonneau cover
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide protection to bed contents;

f) Capable of attaching to a bumper
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide shade, wind protection, and rain protection;

g) Capable of attaching to a bumper
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide a projector screen;

h) Capable of attaching to a balcony
to allow the five-device-in-one water-collecting-and-decelerating fruit-and-nut-collecting-and-decelerating wind-diffusing-and-redirecting multi-function-transversable-ridge-and-seam multi-function-twist-locking-base carapace to provide shade, wind protection, and rain protection;

i) Capable of securing adjustable carapace stanchion 127 to stabilizing foot 130;

j) Capable of attaching to a marine-kayak chassis
to redirect wind to power marine kayaks; and k) Capable of attaching to a land-yacht chassis
to redirect wind to power land-yachts.

What is claimed is:

1. A method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace,
said five-device-in-one water-collecting-and-decelerating fruit-and-nut-collecting-and-decelerating wind-diffusing-and-redirecting multi-function-transversable-ridge-and-seam multi-function-twist-locking-base carapace comprising:

at least one first three-hundred-and-sixty-degree-orientational-carapace panel having a first-panel inner perimeter edge,
for forming a cistern for irrigation,
for forming a water-diverting gutter,
for forming a falling-fruit-catching device,
for forming a falling-nut-catching device,
for forming a ball-or-badminton-shuttlecock-catching device,
for forming a ball-blocking device,
for forming a ball-deflecting device,
for forming a free-standing projector screen,
for forming a truck-bed tonneau cover when attached to a utility hole of a truck bed side to secure items within said truck bed,
for acting as a shade cover when attached to a utility hole of a truck bed side to provide shade to occupants, and
for acting as a tow-hitch-mountable projector screen;

at least one second three-hundred-and-sixty-degree-orientational-carapace panel having a second-panel inner perimeter edge,
said at least one second three-hundred-and-sixty-degree-orientational-carapace panel sewn to said at least one first three-hundred-and-sixty-degree-orientational-carapace panel,
said at least one second three-hundred-and-sixty-degree-orientational-carapace panel for forming a cistern for irrigation,
for forming a water-diverting gutter,
for forming a falling-fruit-catching device,
for forming a falling-nut-catching device,
for forming a ball-or-badminton-shuttlecock-catching device,
for forming a ball-blocking device,
for forming a ball-deflecting device,
for forming a free-standing projector screen,
for forming a truck-bed tonneau cover when attached to a utility hole of a truck bed side to secure items within said truck bed,
for forming a shade cover when attached to a utility hole of a truck bed side to provide shade to occupants, and
for forming a tow-hitch-mountable projector screen;

a water-ejecting fruit-and-nut-discharging wind-diffusing crown-carapace nozzle formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel,
said water-ejecting fruit-and-nut-discharging wind-diffusing crown-carapace nozzle
for ejecting collected-and-decelerated rainwater into containers,
for discharging harvested-and-decelerated fruits and nuts into containers,
for redirecting wind to power marine kayaks,
for redirecting wind to power land-yachts,
for diffusing and preventing wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace, for redirecting wind to cool users;
at least one breadth-wise carapace-panel-connecting seam
formed between said at least one first three-hundred-and-sixty-degree-orientational-carapace panel and said at least one second three-hundred-and-sixty-degree-orientational-carapace panel,
said at least one breadth-wise carapace-panel-connecting seam
for converging rain water therein,
to repeatedly change the direction of rain water to decelerate the flowing speed of rain water to reduce water splash to avoid damaging irrigated vegetables,
for converging harvested fruits therein,
to repeatedly change the direction of harvested fruits to decelerate the rolling speed of harvested fruits to reduce fruit bruises to avoid throwing away bruised fruits,
for converging harvested nuts therein,
to repeatedly change the direction of harvested nuts to decelerate the rolling speed of harvested nuts to reduce nut bruises to avoid throwing away bruised nuts,
for converging catched balls therein,
to repeatedly change the direction of caught balls to decelerate the rolling speed of caught balls to reduce ball damages to avoid throwing away damaged balls,
for directing collected-and-decelerated water away from patios and balconies
to keep said patios and balconies dry,
for distributing collected-and-decelerated water onto crops when attached to the utility holes of a pickup truck
to keep said crops irrigated,
for directing harvested-decelerated fruit to a storage container
to collect said harvested fruit and
to save time and labor,
for directing harvested-decelerated nuts to a storage container
to collect said harvested nuts and
to save time and labor,
for directing caught-decelerated balls to a storage container
to collect said caught balls and
to save time and labor;
at least one mid-panel water-directing water-decelerating fruit-and-nut-decelerating wind-diffusing ridge seam
formed between said at least one first three-hundred-and-sixty-degree-orientational-carapace panel and said at least one second three-hundred-and-sixty-degree-orientational-carapace panel,
said at least one mid-panel water-directing water-decelerating fruit-and-nut-decelerating wind-diffusing ridge seams
for converging rain water therein,
to repeatedly change the direction of rain water to decelerate the flowing speed of rain water to reduce water splash to avoid damaging irrigated vegetables,
for converging harvested fruits therein,
to repeatedly change the direction of harvested fruits to decelerate the rolling speed of harvested fruits to reduce fruit bruises to avoid throwing away bruised fruits,
for converging harvested nuts therein,
to repeatedly change the direction of harvested nuts to decelerate the rolling speed of harvested nuts to reduce nut bruises to avoid throwing away bruised nuts,
for converging caught balls therein,
to repeatedly change the direction of caught balls to decelerate the rolling speed of caught balls to reduce ball damages to avoid throwing away damaged balls,
for directing collected-and-decelerated water away from patios and balconies to keep said patios and balconies dry,
for distributing collected-and-decelerated water onto crops when attached to the utility holes of a pickup truck
to keep said crops irrigated,
for directing harvested-decelerated fruit to a storage container
to collect said harvested fruit and
to save time and labor,
for directing harvested-decelerated nuts to a storage container
to collect said harvested nuts and
to save time and labor,
for directing caught-decelerated balls to a storage container to collect said caught balls and
to save time and labor;
an upper hub;
a plurality of rib-hinging intersectors;
a plurality of arched carapace-supporting ribs
hingedly attached to said upper hub and said rib hinging intersectors,
said arched carapace-supporting ribs
attached to said at least one first three-hundred-and-sixty-degree-orientational-carapace panel and said at least one second three-hundred-and-sixty-degree-orientational-carapace panel;
an adjustable stanchion-supporting twist-locking base
for twist-locking with an additional adjustable stanchion-supporting twist-locking base from an additional five-device-in-one carapace
to enable increased volumes for collecting rainwater, or harvesting fruit, or harvesting nuts,
for twist-locking with an additional adjustable stanchion-supporting twist-locking base from an additional five-device-in-one carapace
to provide versatility with arranging multiple five-device-in-one carapaces together,
for attaching to a wind-powered boat or other wind-powered vehicle
to allow said five-device-in-one carapace to act as a carapace,
for attaching to a truck bed
to allow said five-device-in-one carapace to collect water, or harvest fruits or harvest nuts,
for attaching to a truck bed to act as a tonneau cover
to allow said five-device-in-one carapace to provide protection to bed contents,
for attaching to a bumper
to allow said five-device-in-one carapace to provide shade, wind protection, and rain protection,
for attaching to a bumper
to allow said five-device-in-one carapace to provide a projector screen, for attaching to a balcony
to allow said five-device-in-one carapace to provide shade, wind protection, and rain protection,
for attaching to a marine-kayak chassis
to redirect wind to power marine kayaks, and
for attaching to a land-yacht chassis
to redirect wind to power land-yachts;
a three-hundred-sixty-degree-rotatably-locking center-support stanchion attached to said upper hub and said adjustable stanchion-supporting twist-locking base;
a shuttle hub
slidably attached to said three-hundred-sixty-degree-rotatably-locking center-support stanchion; and
a plurality of actuating-and-supporting ribs
hingedly attached between said rib-hinging intersectors and said shuttle hub,
said actuating-and-supporting ribs
for supporting said arched carapace-supporting ribs, and
for actuating said arched carapace-supporting ribs
to deploy and to contract said arched carapace-supporting ribs;
said method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace comprising the steps of:
sewing said at least one first three-hundred-and-sixty-degree-orientational-carapace panel and said at least one second three-hundred-and-sixty-degree-orientational-carapace panel together
such that
said at least one breadth-wise carapace-panels-connecting seam and said at least one mid-panel water-directing water-decelerating fruit-and-nut-decelerating wind-diffusing ridge seams
are formed between said at least one first three-hundred-and-sixty-degree-orientational-carapace panel and said at least one second three-hundred-and-sixty-degree-orientational-carapace panel
for converging rain water therein
to repeatedly change the direction of rain water to decelerate the flowing speed of rain water to reduce water splash to avoid damaging irrigated vegetables,
for converging harvested fruits therein
to repeatedly change the direction of harvested fruits to decelerate the rolling speed of harvested fruits to reduce fruit bruises to avoid throwing away bruised fruits,
for converging harvested nuts therein
to repeatedly change the direction of harvested nuts to decelerate the rolling speed of harvested nuts to reduce nut bruises to avoid throwing away bruised nuts,
for converging catched balls therein
to repeatedly change the direction of caught balls to decelerate the rolling speed of caught balls to reduce ball damages to avoid throwing away damaged balls,
for directing rain water therealong,
for directing harvested fruits therealong,
for directing harvested nuts therealong,
for directing game balls therealong,
for forming a collecting cistern to collect rain water to irrigate garden,
for forming a diverting gutter to collect rain water to discharge said rain water away from house balcony and foundation,
for forming a collecting device to collect harvested fruits to save labor and time,
for forming a collecting device to collect harvested nuts to save labor and time,
for forming a collecting device to collect game balls to save labor and time,
for forming a tonneau cover for a truck bed,
for forming a shade cover,
for forming a free-standing projector screen,
for forming a hitch-mountable projector screen, and
for forming a sports-ball blocking device,
and such that
said water-ejecting fruit-and-nut discharging wind-diffusing crown-carapace nozzle is formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel
for ejecting collected-and-decelerated rainwater into containers,
for discharging harvested-and-decelerated fruits and nuts into containers,
for redirecting wind to power land-yachts,
for diffusing wind to prevent wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace,
for redirecting wind to cool users;
attaching said at least one first three-hundred-and-sixty-degree-orientational-carapace panel to said arched carapace-supporting ribs
for converging rain water therein,
for converging harvested fruits therein,
for converging harvested nuts therein,
for converging caught balls therein,
for redirecting wind to power wind-powered boat or other wind-powered vehicle,
for redirecting wind to power marine kayaks,
for redirecting wind to power land-yachts,
for guiding rain water
down and along said three-hundred-sixty-degree-rotatably-locking center-support stanchion,
for guiding fruits
down and along said three-hundred-sixty-degree-rotatably-locking center-support stanchion,
for guiding nuts
down and along said three-hundred-sixty-degree-rotatably-locking center-support stanchion,
for guiding balls
down and along said three-hundred-sixty-degree-rotatably-locking center-support stanchion;
attaching said at least one second three-hundred-and-sixty-degree-orientational-carapace panel to arched carapace-supporting ribs
for converging rain water therein,
for converging harvested fruits therein,
for converging harvested nuts therein,
for converging caught balls therein,
for redirecting wind to power wind-powered boat or other wind-powered vehicle,
for redirecting wind to power marine kayaks, for redirecting wind to power land-yachts,
for guiding rain water
down and along said three-hundred-sixty-degree-rotatably-locking center-support stanchion,
for guiding fruits
down and along said three-hundred-sixty-degree-rotatably-locking center-support stanchion,
for guiding nuts
down and along said three-hundred-sixty-degree-rotatably-locking center-support stanchion,
for guiding balls
down and along said three-hundred-sixty-degree-rotatably-locking center-support stanchion; and
twist-locking said adjustable stanchion-supporting twist-locking base to
another adjustable stanchion-supporting twist-locking base
for enabling said five-device-in-one carapace to increase volumes for collecting rainwater, or harvesting fruit, or harvesting nuts,
for enabling said five-device-in-one carapace to provide versatility with arranging multiple five-device-in-one carapaces together,
a wind-powered boat
for enabling said five-device-in-one carapace to redirect wind to power said wind-powered boat,
a wind-powered vehicle
for enabling said five-device-in-one carapace to redirect wind to power said wind-powered vehicle,
a wind-powered marine kayak
for enabling said five-device-in-one carapace to redirect wind to power said wind-powered marine kayak,
a wind-powered land-yacht
for enabling said five-device-in-one carapace to redirect wind to power said wind-powered land-yacht,
a utility hole of a truck
for enabling said five-device-in-one carapace to function as a tonneau cover,
a bumper of a truck
for enabling said five-device-in-one carapace to function as a projector screen, or
a hand rail of a balcony
for enabling said five-device-in-one carapace to provide shade, wind protection, and rain protection.

2. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said at least one first three-hundred-and-sixty-degree-orientational-carapace panel is made of plastic material.

3. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said at least one first three-hundred-and-sixty-degree-orientational-carapace panel is made of canvas, nylon, or fabric material.

4. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said at least one second three-hundred-and-sixty-degree-orientational-carapace panel is made of plastic material.

5. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said at least one second three-hundred-and-sixty-degree-orientational-carapace panel is made of canvas, nylon, or fabric material.

6. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said at least one breadth-wise carapace-panels-connecting seam has a curved shape.

7. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said at least one mid-panel water-directing water-decelerating fruit-and-nut-decelerating wind-diffusing ridge seams
each have a curved shape.

8. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said arched carapace-supporting ribs
are each made of metal.

9. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 1,
wherein
said arched carapace-supporting ribs
are each made of plastic.

10. A method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace,
said five-device-in-one water-collecting-and-decelerating fruit-and-nut-collecting-and-decelerating wind-diffusing-and-redirecting multi-function-transversable-ridge-and-seam multi-function-twist-locking-base carapace comprising:
at least one first three-hundred-and-sixty-degree-orientational-carapace panel having a first-panel inner perimeter edge,
for forming a cistern for irrigation,
for forming a water-diverting gutter,
for forming a falling-fruit-catching device,
for forming a falling-nut-catching device,
for forming a ball-or-badminton-shuttlecock-catching device,
for forming a ball-blocking device, for forming a ball-deflecting device,
for forming a free-standing projector screen,
for forming a truck-bed tonneau cover when attached to a utility hole of a truck bed side
to secure items within said truck bed,
for acting as a shade cover when attached to a utility hole of a truck bed side
to provide shade to occupants, and
for acting as a tow-hitch-mountable projector screen;
at least one second three-hundred-and-sixty-degree-orientational-carapace panel having a second-panel inner perimeter edge,
said at least one second three-hundred-and-sixty-degree-orientational-carapace panel sewn to said at least one first three-hundred-and-sixty-degree-orientational-carapace panel,
said at least one second three-hundred-and-sixty-degree-orientational-carapace panel for forming a cistern for irrigation,
for forming a water-diverting gutter,
for forming a falling-fruit-catching device,
for forming a falling-nut-catching device,
for forming a ball-or-badminton-shuttlecock-catching device,
for forming a ball-blocking device,
for forming a ball-deflecting device,
for forming a free-standing projector screen,
for forming a truck-bed tonneau cover when attached to a utility hole of a truck bed side
to secure items within said truck bed,
for forming a shade cover when attached to a utility hole of a truck bed side
to provide shade to occupants, and
for forming a tow-hitch-mountable projector screen;
a water-ejecting fruit-and-nut-discharging wind-diffusing crown-carapace nozzle formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel,
said water-ejecting fruit-and-nut-discharging wind-diffusing crown-carapace nozzle
for ejecting collected-and-decelerated rainwater into containers,
for discharging harvested-and-decelerated fruits and nuts into containers,
for redirecting wind to power marine kayaks,
for redirecting wind to power land-yachts,
for diffusing and preventing wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace,
for redirecting wind to cool users;
at least one breadth-wise carapace-panel-connecting seam
formed between said at least one first three-hundred-and-sixty-degree-orientational-carapace panel and said at least one second three-hundred-and-sixty-degree-orientational-carapace panel,
said at least one breadth-wise carapace-panel-connecting seam
for converging rain water therein,
to repeatedly change the direction of rain water to decelerate the flowing speed of rain water to reduce water splash to avoid damaging irrigated vegetables,
for converging harvested fruits therein,
to repeatedly change the direction of harvested fruits to decelerate the rolling speed of harvested fruits to reduce fruit bruises to avoid throwing away bruised fruits,
for converging harvested nuts therein,
to repeatedly change the direction of harvested nuts to decelerate the rolling speed of harvested nuts to reduce nut bruises to avoid throwing away bruised nuts,
for converging catched balls therein,
to repeatedly change the direction of caught balls to decelerate the rolling speed of caught balls to reduce ball damages to avoid throwing away damaged balls,
for directing collected-and-decelerated water away from patios and balconies to keep said patios and balconies dry,
for distributing collected-and-decelerated water onto crops when attached to the utility holes of a pickup truck to keep said crops irrigated,
for directing harvested-decelerated fruit to a storage container
to collect said harvested fruit and
to save time and labor,
for directing harvested-decelerated nuts to a storage container
to collect said harvested nuts and
to save time and labor,
for directing caught-decelerated balls to a storage container
to collect said catched caught and
to save time and labor;
at least one mid-panel water-directing water-decelerating fruit-and-nut-decelerating wind-diffusing ridge seam
formed between said at least one first three-hundred-and-sixty-degree-orientational-carapace panel and said at least one second three-hundred-and-sixty-degree-orientational-carapace panel,
said at least one mid-panel water-directing water-decelerating fruit-and-nut-decelerating wind-diffusing ridge seams
for converging rain water therein,
to repeatedly change the direction of rain water to decelerate the flowing speed of rain water to reduce water splash to avoid damaging irrigated vegetables,
for converging harvested fruits therein,
to repeatedly change the direction of harvested fruits to decelerate the rolling speed of harvested fruits to reduce fruit bruises to avoid throwing away bruised fruits,
for converging harvested nuts therein,
to repeatedly change the direction of harvested nuts to decelerate the rolling speed of harvested nuts to reduce nut bruises to avoid throwing away bruised nuts,
for converging catched balls therein,
to repeatedly change the direction of caught balls to decelerate the rolling speed of caught balls to reduce ball damages to avoid throwing away damaged balls, for directing collected-and-decelerated water away
from patios and balconies
to keep said patios and balconies dry,
for distributing collected-and-decelerated water onto
crops when attached to the utility holes of a pickup
truck
to keep said crops irrigated,
for directing harvested-decelerated fruit to a storage
container to collect said harvested fruit and
to save time and labor,
for directing harvested-decelerated nuts to a storage
container
to collect said harvested nuts and
to save time and labor,
for directing caught-decelerated balls to a storage container
to collect said caught balls and
to save time and labor;
an upper hub;
a plurality of rib-hinging intersectors;
a plurality of arched carapace-supporting ribs
hingedly attached to said upper hub and said rib hinging intersectors,
said arched carapace-supporting ribs
attached to said at least one first three-hundred-and-sixty-degree-orientational-carapace panel and said at least one second three-hundred-and-sixty-degree-orientational-carapace panel;
a three-hundred-sixty-degree-rotatably-locking center-support stanchion attached to said upper hub and said adjustable stanchion-supporting twist-locking base;
a shuttle hub
slidably attached to said three-hundred-sixty-degree-rotatably-locking center-support stanchion; and
a plurality of actuating-and-supporting ribs
hingedly attached between said rib-hinging intersectors and said shuttle hub,
said actuating-and-supporting ribs
for supporting said arched carapace-supporting ribs, and
for actuating said arched carapace-supporting ribs
to deploy and to contract said arched carapace-supporting ribs;
said method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace comprising the steps of:
sewing said at least one first three-hundred-and-sixty-degree-orientational-carapace panel and said at least one second three-hundred-and-sixty-degree-orientational-carapace panel together
such that
said at least one breadth-wise carapace-panels-connecting seam and said at least one mid-panel water-directing water-decelerating fruit-and-nut-decelerating wind-diffusing ridge seams
are formed between said at least one first three-hundred-and-sixty-degree-orientational-carapace panel and said at least one second three-hundred-and-sixty-degree-orientational-carapace panel
for converging rain water therein
to repeatedly change the direction of rain water to decelerate the flowing speed of rain water to reduce water splash to avoid damaging irrigated vegetables,
for converging harvested fruits therein
to repeatedly change the direction of harvested fruits to decelerate the rolling speed of harvested fruits to reduce fruit bruises to avoid throwing away bruised fruits,
for converging harvested nuts therein
to repeatedly change the direction of harvested nuts to decelerate the rolling speed of harvested nuts to reduce nut bruises to avoid throwing away bruised nuts,
for converging caught balls therein
to repeatedly change the direction of caught balls to decelerate the rolling speed of caught balls to reduce ball damages to avoid throwing away damaged balls,
for directing rain water therealong,
for directing harvested fruits therealong,
for directing harvested nuts therealong,
for directing game balls therealong,
for forming a collecting cistern to collect rain water to irrigate garden,
for forming a diverting gutter to collect rain water
to discharge said rain water away from house balcony and foundation,
for forming a collecting device to collect harvested fruits
to save labor and time,
for forming a collecting device to collect harvested nuts
to save labor and time,
for forming a collecting device to collect game balls
to save labor and time,
for forming a tonneau cover for a truck bed,
for forming a shade cover,
for forming a free-standing projector screen,
for forming a hitch-mountable projector screen, and
for forming a sports-ball blocking device,
and such that
said water-ejecting fruit-and-nut discharging wind-diffusing crown-carapace nozzle is formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel
for ejecting collected-and-decelerated rainwater into containers,
for discharging harvested-and-decelerated fruits and nuts into containers,
for redirecting wind to power land-yachts,
for diffusing wind to prevent wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace,
for redirecting wind to cool users;
attaching said at least one first three-hundred-and-sixty-degree-orientational-carapace panel to said arched carapace-supporting ribs
for converging rain water therein,
for converging harvested fruits therein,
for converging harvested nuts therein,
for converging caught balls therein,
for redirecting wind to power wind-powered boat or other wind-powered vehicle,
for redirecting wind to power marine kayaks,
for redirecting wind to power land-yachts, for guiding rain water
    down and along said three-hundred-sixty-degree-rotatably-locking center-support stanchion,
for guiding fruits
    down and along said three-hundred-sixty-degree-rotatably-locking center-support stanchion,
for guiding nuts
    down and along said three-hundred-sixty-degree-rotatably-locking center-support stanchion,
for guiding balls
    down and along said three-hundred-sixty-degree-rotatably-locking center-support stanchion; and
attaching said at least one second three-hundred-and-sixty-degree-orientational-carapace panel to arched carapace-supporting ribs
for converging rain water therein,
for converging harvested fruits therein,
for converging harvested nuts therein,
for converging caught balls therein,
for redirecting wind to power wind-powered boat or other wind-powered vehicle,
for redirecting wind to power marine kayaks,
for redirecting wind to power land-yachts,
for guiding rain water
    down and along said three-hundred-sixty-degree-rotatably-locking center-support stanchion,
for guiding fruits
    down and along said three-hundred-sixty-degree-rotatably-locking center-support stanchion,
for guiding nuts
    down and along said three-hundred-sixty-degree-rotatably-locking center-support stanchion,
for guiding balls
    down and along said three-hundred-sixty-degree-rotatably-locking center-support stanchion.

11. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said at least one first three-hundred-and-sixty-degree-orientational-carapace panel is made of plastic material.

12. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said at least one first three-hundred-and-sixty-degree-orientational-carapace panel is made of canvas, nylon, or fabric material.

13. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said at least one second three-hundred-and-sixty-degree-orientational-carapace panel is made of plastic material.

14. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said at least one second three-hundred-and-sixty-degree-orientational-carapace panel is made of canvas, nylon, or fabric material.

15. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said at least one breadth-wise carapace-panels-connecting seam has a curved shape.

16. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said at least one mid-panel water-directing water-decelerating fruit-and-nut-decelerating wind-diffusing ridge seams each have a curved shape.

17. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said arched carapace-supporting ribs are each made of metal.

18. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said arched carapace-supporting ribs are each made of plastic.

19. The method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace of claim 10,
wherein
said at least one breadth-wise carapace-panels-connecting seam and
said at least one mid-panel water-directing water-decelerating fruit-and-nut-decelerating wind-diffusing ridge seams
each have a curved shape.

20. A method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace,
said five-device-in-one water-collecting-and-decelerating fruit-and-nut-collecting-and-decelerating wind-diffusing-and-redirecting multi-function-transversable-ridge-and-seam multi-function-twist-locking-base carapace comprising:
at least one first three-hundred-and-sixty-degree-orientational-carapace panel having a first-panel inner perimeter edge;
at least one second three-hundred-and-sixty-degree-orientational-carapace panel having a second-panel inner perimeter edge, said at least one second three-hundred-and-sixty-degree-orientational-carapace panel sewn to said at least one first three-hundred-and-sixty-degree-orientational-carapace panel;
a water-ejecting fruit-and-nut-discharging wind-diffusing crown-carapace nozzle formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel,
  said water-ejecting fruit-and-nut-discharging wind-diffusing crown-carapace nozzle
    for ejecting collected-and-decelerated rainwater into containers,
    for discharging harvested-and-decelerated fruits and nuts into containers,
    for redirecting wind to power marine kayaks,
    for redirecting wind to power land-yachts,
    for diffusing and preventing wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace,
    for redirecting wind to cool users;
at least one breadth-wise carapace-panel-connecting seam formed between said at least one first three-hundred-and-sixty-degree-orientational-carapace panel and said at least one second three-hundred-and-sixty-degree-orientational-carapace panel,
  said at least one breadth-wise carapace-panel-connecting seam
    for converging rain water therein,
      to repeatedly change the direction of rain water to decelerate the flowing speed of rain water to reduce water splash to avoid damaging irrigated vegetables,
    for converging harvested fruits therein,
      to repeatedly change the direction of harvested fruits to decelerate the rolling speed of harvested fruits to reduce fruit bruises to avoid throwing away bruised fruits,
    for converging harvested nuts therein,
      to repeatedly change the direction of harvested nuts to decelerate the rolling speed of harvested nuts to reduce nut bruises to avoid throwing away bruised nuts,
    for converging caught balls therein,
      to repeatedly change the direction of caught balls to decelerate the rolling speed of caught balls to reduce ball damages to avoid throwing away damaged balls,
    for directing collected-and-decelerated water away from patios and balconies
      to keep said patios and balconies dry,
    for distributing collected-and-decelerated water onto crops when attached to the utility holes of a pickup truck
      to keep said crops irrigated,
    for directing harvested-decelerated fruit to a storage container
      to collect said harvested fruit and
      to save time and labor,
    for directing harvested-decelerated nuts to a storage container
      to collect said harvested nuts and
      to save time and labor,
    for directing catched-decelerated balls to a storage container
      to collect said catched balls and
      to save time and labor;
at least one mid-panel water-directing water-decelerating fruit-and-nut-decelerating wind-diffusing ridge seam formed between said at least one first three-hundred-and-sixty-degree-orientational-carapace panel and said at least one second three-hundred-and-sixty-degree-orientational-carapace panel,
  said at least one mid-panel water-directing water-decelerating fruit-and-nut-decelerating wind-diffusing ridge seams
    for converging rain water therein,
      to repeatedly change the direction of rain water to decelerate the flowing speed of rain water to reduce water splash to avoid damaging irrigated vegetables,
    for converging harvested fruits therein,
      to repeatedly change the direction of harvested fruits to decelerate the rolling speed of harvested fruits to reduce fruit bruises to avoid throwing away bruised fruits,
    for converging harvested nuts therein,
      to repeatedly change the direction of harvested nuts to decelerate the rolling speed of harvested nuts to reduce nut bruises to avoid throwing away bruised nuts,
    for converging caught balls therein,
      to repeatedly change the direction of caught balls to decelerate the rolling speed of caught balls to reduce ball damages to avoid throwing away damaged balls,
    for directing collected-and-decelerated water away from patios and balconies
      to keep said patios and balconies dry,
    for distributing collected-and-decelerated water onto crops when attached to the utility holes of a pickup truck
      to keep said crops irrigated,
    for directing harvested-decelerated fruit to a storage container
      to collect said harvested fruit and
      to save time and labor,
    for directing harvested-decelerated nuts to a storage container
      to collect said harvested nuts and
      to save time and labor,
    for directing caught decelerated balls to a storage container
      to collect said caught balls and
      to save time and labor;
an upper hub;
a plurality of rib-hinging intersectors;
a plurality of arched carapace-supporting ribs
  hingedly attached to said upper hub and said rib hinging intersectors,
  said arched carapace-supporting ribs
  attached to said at least one first three-hundred-and-sixty-degree-orientational-carapace panel and said at least one second three-hundred-and-sixty-degree-orientational-carapace panel;
a three-hundred-sixty-degree-rotatably-locking center-support stanchion attached to said upper hub and said adjustable stanchion-supporting twist-locking base;

a shuttle hub
    slidably attached to said three-hundred-sixty-degree-rotatably-locking center-support stanchion; and
a plurality of actuating-and-supporting ribs
    hingedly attached between said rib-hinging intersectors and said shuttle hub,
    said actuating-and-supporting ribs
        for supporting said arched carapace-supporting ribs, and
        for actuating said arched carapace-supporting ribs to deploy and to contract said arched carapace-supporting ribs;
said method of manufacturing and using a five-device-in-one water-collecting-and-decelerating fruit-and-nut-collecting-and-decelerating wind-diffusing-and-redirecting multi-function-transversable-ridge-and-seam multi-function-twist-locking-base carapace comprising the steps of:
sewing said at least one first three-hundred-and-sixty-degree-orientational-carapace panel and said at least one second three-hundred-and-sixty-degree-orientational-carapace panel together
    such that
    said at least one breadth-wise carapace-panels-connecting seam and said at least one mid-panel water-directing water-decelerating fruit-and-nut-decelerating wind-diffusing ridge seams
    are formed between said at least one first three-hundred-and-sixty-degree-orientational-carapace panel and said at least one second three-hundred-and-sixty-degree-orientational-carapace panel
        for converging rain water therein
            to repeatedly change the direction of rain water to decelerate the flowing speed of rain water to reduce water splash to avoid damaging irrigated vegetables,
        for converging harvested fruits therein
            to repeatedly change the direction of harvested fruits to decelerate the rolling speed of harvested fruits to reduce fruit bruises to avoid throwing away bruised fruits,
        for converging harvested nuts therein
            to repeatedly change the direction of harvested nuts to decelerate the rolling speed of harvested nuts to reduce nut bruises to avoid throwing away bruised nuts,
        for converging caught balls therein
            to repeatedly change the direction of caught balls to decelerate the rolling speed of caught balls to reduce ball damages to avoid throwing away damaged balls,
        for directing rain water therealong,
        for directing harvested fruits therealong,
        for directing harvested nuts therealong,
        for directing game balls therealong,
        for forming a collecting cistern to collect rain water to irrigate garden,
        for forming a diverting gutter to collect rain water to discharge said rain water away from house balcony and foundation,
        for forming a collecting device to collect harvested fruits
            to save labor and time,
        for forming a collecting device to collect harvested nuts
            to save labor and time,
        for forming a collecting device to collect game balls
            to save labor and time,
        for forming a tonneau cover for a truck bed,
        for forming a shade cover,
        for forming a free-standing projector screen,
        for forming a hitch-mountable projector screen, and
        for forming a sports-ball blocking device,
    and such that
    said water-ejecting fruit-and-nut discharging wind-diffusing crown-carapace nozzle is formed between said first-panel inner perimeter edge and said second-panel inner perimeter edge of said at least one first three-hundred-and-sixty-degree-orientational-carapace panel and said at least one second three-hundred-and-sixty-degree-orientational-carapace panel
        for ejecting collected-and-decelerated rainwater into containers,
        for discharging harvested-and-decelerated fruits and nuts into containers,
        for redirecting wind to power land-yachts,
        for diffusing wind to prevent wind from lifting said five-device-in-one water-collecting-and-decelerating fruit-and-nut-collecting-and-decelerating wind-diffusing-and-redirecting multi-function-transversable-ridge-and-seam multi-function-twist-locking-base carapace,
        for redirecting wind to cool users;
attaching said at least one first three-hundred-and-sixty-degree-orientational-carapace panel to said arched carapace-supporting ribs for converging rain water therein,
    for converging harvested fruits therein,
    for converging harvested nuts therein,
    for converging caught balls therein,
    for redirecting wind to power wind-powered boat or other wind-powered vehicle,
    for redirecting wind to power marine kayaks,
    for redirecting wind to power land-yachts,
    for guiding rain water
        down and along said three-hundred-sixty-degree-rotatably-locking center-support stanchion,
    for guiding fruits
        down and along said three-hundred-sixty-degree-rotatably-locking center-support stanchion,
    for guiding nuts
        down and along said three-hundred-sixty-degree-rotatably-locking center-support stanchion,
    for guiding balls
        down and along said three-hundred-sixty-degree-rotatably-locking center-support stanchion; and
attaching said at least one second three-hundred-and-sixty-degree-orientational-carapace panel to arched carapace-supporting ribs for converging rain water therein,
    for converging harvested fruits therein,
    for converging harvested nuts therein,
    for converging catched balls therein,
    for redirecting wind to power wind-powered boat or other wind-powered vehicle,
    for redirecting wind to power marine kayaks,
    for redirecting wind to power land-yachts,
    for guiding rain water
        down and along said three-hundred-sixty-degree-rotatably-locking center-support stanchion,
    for guiding fruits
        down and along said three-hundred-sixty-degree-rotatably-locking center-support stanchion, for guiding nuts
   down and along said three-hundred-sixty-degree-
      rotatably-locking center-support stanchion,
for guiding balls
   down and along said three-hundred-sixty-degree-
      rotatably-locking center-support stanchion.

\* \* \* \* \*